(12) United States Patent
Tahara et al.

(10) Patent No.: US 7,279,855 B2
(45) Date of Patent: Oct. 9, 2007

(54) ELECTRIC DRIVE DEVICE FOR VEHICLE AND HYBRID ENGINE/MOTOR-TYPE FOUR WHEEL DRIVE DEVICE

(75) Inventors: Kazuo Tahara, Hitachi (JP); Keisuke Nishidate, Hitachi (JP); Kenichi Yoshida, Hitachinaka (JP); Hisaya Shimizu, Hitachinaka (JP); Toshiyuki Innami, Mito (JP); Shinichi Fujino, Mito (JP)

(73) Assignees: Hitachi, Ltd., Tokyo (JP); Hitachi Car Engineering Co., Ltd., Hitachinaka-shi (JP)

( * ) Notice: Subject to any disclaimer, the term of this patent is extended or adjusted under 35 U.S.C. 154(b) by 0 days.

(21) Appl. No.: 10/544,304

(22) PCT Filed: Apr. 2, 2004

(86) PCT No.: PCT/JP2004/004827

§ 371 (c)(1),
(2), (4) Date: Mar. 9, 2006

(87) PCT Pub. No.: WO2004/089681

PCT Pub. Date: Oct. 21, 2004

(65) Prior Publication Data

US 2006/0152180 A1 Jul. 13, 2006

(30) Foreign Application Priority Data

Apr. 4, 2003 (JP) ............................. 2003-101723
Apr. 4, 2003 (JP) ............................. 2003-101747

(51) Int. Cl.
*H02K 17/34* (2006.01)

(52) U.S. Cl. ..................... 318/46; 318/727; 318/778; 318/800; 318/801

(58) Field of Classification Search ................... 310/46; 363/37, 89; 322/28; 318/139, 727, 778, 318/800, 801, 376, 140
See application file for complete search history.

(56) References Cited

U.S. PATENT DOCUMENTS 5,942,818 A * 8/1999 Satoh et al. .................. 310/46

(Continued)

FOREIGN PATENT DOCUMENTS

EP    1 108 606 A2    6/2001

(Continued)

OTHER PUBLICATIONS

Japanese Office Action mailed Nov. 22, 2005 with English Translation (Eight (8) pages).

(Continued)

*Primary Examiner*—Karen Masih
(74) *Attorney, Agent, or Firm*—Crowell & Moring LLP

(57) ABSTRACT

A vehicle electric drive system and a hybrid engine-motor type vehicle drive system realizing simplification and miniaturization of electric parts and, moreover, reduction in cost while maintaining performances can be provided. A part 1 of wheels is driven by an engine. The wheels are driven by a motor as necessary. The motor, a generator, and an accessory battery are connected to each other via a voltage step-up/step-down device. The voltage step-up/step-down device has a function of stepping up power of the battery and supplying the stepping up power to the motor, and a function of stepped down power of the generator and supplying the stepped down power to the battery and the accessories.

32 Claims, 24 Drawing Sheets

U.S. PATENT DOCUMENTS

2001/0019210 A1 9/2001 Fukasaku et al.
2005/0134207 A1* 6/2005 Ishikawa .................... 318/151
2005/0286272 A1* 12/2005 Iwamoto et al. ......... 363/21.01

FOREIGN PATENT DOCUMENTS

| JP | 6-311608 A | 11/1994 |
|---|---|---|
| JP | 7-231508 | 8/1995 |
| JP | 8-237811 A | 9/1996 |
| JP | 11-332013 A | 11/1999 |
| JP | 2000-224709 | 8/2000 |
| JP | 2000-224709 A | 8/2000 |
| JP | 2000-245007 | 9/2000 |
| JP | 2000-278806 A | 10/2000 |
| JP | 2001-63392 | 3/2001 |
| JP | 2001-173024 | 6/2001 |
| JP | 2001-253256 | 9/2001 |
| JP | 2001-263266 A | 9/2001 |
| JP | 2001-333507 | 11/2001 |
| JP | 2001-352795 | 12/2001 |
| JP | 2002-171606 A | 6/2002 |
| JP | 2002-330554 | 11/2002 |
| JP | 2003-87901 A | 3/2003 |
| WO | WO 02/089310 A1 | 11/2002 |

OTHER PUBLICATIONS

Notification of Transmittal of Copies of Translation of the International Preliminary Report on Patentability (PCT/IB/338)—one (1) page, Mar. 9, 2006.

International Preliminary Report on Patentability (PCT/IB/373)—one (1) page, Mar. 9, 2006.

Written Opinion of the International Searching Authority (PCT/ISA/237)—three (3) pages, Mar. 9, 2006.

* cited by examiner

ELECTRIC DRIVE DEVICE FOR VEHICLE AND HYBRID ENGINE/MOTOR-TYPE FOUR WHEEL DRIVE DEVICE

TECHNICAL FIELD

The present invention relates to an electric drive system for a vehicle. To be more specific, it is suitable for vehicle in which a part of wheels are driven with an engine and other wheels are driven with a motor. For example, it relates to hybrid engine-electric motor type four-wheel drive system.

BACKGROUND ART

A hybrid engine-electric motor type four-wheel drive system is known in conventional vehicle drive system field. In the drive system, either a frond wheel drive-axle or a rear wheel drive-axle (here, the front wheel drive-axle is cited as an example of that, and it will be also called as "front wheels" below) is driven by an internal combustion engine, and the other (here, the rear wheel drive-axle is cited as an example of that, and it will be also called as "rear wheels" below) is driven by a motor as necessary.

Four-wheel drive mode in which both of the engine and motor are used as a power source is performed under heavy-load conditions such as starting, climbing, or the like of the vehicle. Under normal drive mode in which a load condition is relatively light (low load drive zone), two-wheel drive mode is performed only by the engine.

In the conventional hybrid-type four-wheel drive system, a DC motor or AC motor is used as a wheel-drive motor. Conventionally, a power supplies for accessories, for example, an alternator and a battery of 12V or 14V used for general vehicle-mounted electric equipments, are not used for the wheel-drive system. Instead of them, a generator only for the wheel-drive motor (for example, an alternator having a power generation output of 50V or higher) and a high-voltage battery dedicated for the motor are used as power supplies of the motor (for example, Japanese Patent Laid-Open No. 2001-253256).

This is because power supply necessary for driving the wheel drive motor cannot be secured only by the battery of 12V or 14V for accessories (for example, general electric equipments such as starter, light, and air conditioner) and an alternator corresponding to the battery.

In the case of executing electric drive of wheels at the time of starting of a vehicle, at the time of starting the engine when the engine speed is low and the generation power of the alternator for the wheel drive motor is low, the alternator enters a separate excitation mode. The field current is supplied from the high-voltage battery for the motor to an alternator field winding to increase the generation output of the alternator, and the motor is driven by the generation output. When the vehicle speed reaches predetermined speed (for example, 20 km/hour) after starting, the alternator for the wheel drive motor outputs power sufficient to drive the motor, so that the alternator uses the output power as the power supply of the field winding of itself (self excitation mode).

Japanese Patent Laid-Open No. 2000-224709 discloses a technique of mounting a generator according to a high-voltage specification and a main battery of a motor for driving wheels and an auxiliary battery for accessories, driving the motor by the power from the generator according to the high-voltage specification or the main battery, in addition, stepping down the high-voltage power (for example, 250V to 350V) by the generator to a low voltage (12V or 24V) by a DC-DC converter, and supplying the low voltage to the auxiliary battery for accessories.

Further, in this kind of hybrid-type electric four-wheel drive system, as disclosed in Japanese Patent Laid-Open No. 2001-63392, a motor with a regenerating function (motor/generator; MG) is used as driving means for one wheels (for example, rear wheels). During times of braking of the vehicle, the motor functions as the generator to perform regenerative control of charging regenerative power output from the MG into a capacitor dedicated to drive the motor. The power accumulated in the capacitor is supplied to the MG so as to perform auxiliary wheel drive control by using the MG at the time of starting and accelerating on a road having high coefficient of friction (high μ road) such as a normal road or a dry road.

DISCLOSURE OF THE INVENTION

A conventional hybrid engine-motor type vehicle drive system has to have a generator (alternator) for accessories, a generator dedicated to drive wheels, also with respect to batteries, a battery for accessories such as a lamp load etc., and a battery dedicated to a motor for driving wheels having capacity larger than that of the battery for accessories. Consequently, the number of electric parts is large and the cost is high.

Also in the case of using a capacitor as a power supply for the wheel drive motor that accumulates regenerative power, there is still a problem that the capacitor has a large size to have capacitance according to the high-voltage specification of about 250 to 300V.

If power from the battery for accessories (for example, specification of 12V) is supplied to the field winding of the generator for driving wheels at the time of starting the engine so as to realize a single battery, the following problem occurs.

For example, in the case of making the generator for driving wheels generate power by supplying power of the battery for accessories to the field windingince the field current is small, when the engine speed is low on starting of the vehicle or the like, sufficient generator output cannot be obtained. Accordingly, power of the motor for driving wheels cannot be sufficiently ensured. Even if the drive power is provided to the motor upon starting of the vehicle by using the generator for the wheel drive motor, when the engine speed is low on starting of the vehicle, the power of the motor drive cannot be sufficiently ensured.

An object of the present invention is to provide a hybrid engine-motor type vehicle drive system realizing simplification and miniaturization of electric parts and, moreover, capable of intending to reduction in cost while maintaining performances, and is to provide an electric drive system for a vehicle which can be used for the same. In particular, in a hybrid engine-motor type four-wheel drive system, an electric drive system for a vehicle realizing a single generator and a single battery is provided.

One of representative inventions of the application is basically configured as follows. The present invention of an electric drive system for a vehicle is comprised of: a generator driven by an engine for driving a vehicle; a vehicle-mounted battery used for accessories; and a motor for driving a vehicle. A drive power supply of the motor is configured by: the generator capable of outputting a drive voltage of the motor by driving of the engine without having a battery dedicated to drive the motor; and the vehicle-mounted battery for accessories capable of outputting the drive voltage of the motor via a booster as a step-up device.

Specifically, at least one of the output voltage of the generator and the output voltage of the battery is stepped up to the motor drive voltage, and the motor is driven by the step-up output voltage. Such a circuit configuration of the invention is achieved by connecting the vehicle-mounted battery to a power line between the generator and the motor via a booster.

An electric drive system for a vehicle, in which a part of wheels are driven with an engine and wheels other than engine-driven wheels are driven with a motor, is configured as follows.

The electric drive system is comprised of: a battery having a voltage level for accessories and used as the power supply for the accessories mounted on a vehicle; and a generator driven by power of the engine and serving as both of a drive power supply of the motor and a power supply of the accessories. The motor, the generator, and the battery are connected via a voltage step-up/step-down device. The voltage step-up/step-down device steps up power of the battery and supplies the step-up power to the motor according to drive conditions, or steps down power of the generator and supplies the stepped-down power to the battery and accessories. In the case of power supplying, the voltage step-up/step-down device steps up power of the battery and supplies the step-up power together with power output from the generator to the motor, or supplies only the stepped power to the motor in place of the generator.

The following invention is also provided.

A motor/generator is used as the motor for driving wheels. That is, it is driven by power supplied from a generator driven by an engine during times of motoring, or by power supplied from an electric power storage device; and it generates regenerative power during times of regeneration. Further, a voltage step-up/step-down circuit is provided for a power line between the motor and the electric power storage device. The voltage step-up/step-down circuit steps up electric energy accumulated in the electric power storage device and supplies a drive power to the motor according to drive conditions of the vehicle. The voltage step-up/step-down circuit steps down a regenerative power generated during times of regeneration of the motor and supplies to the electric power storage device.

Another typical invention is basically configured as follows. The invention is provided to an electric drive system for a vehicle in which a part of wheels are driven with an engine and other wheels are driven with a motor.

The system is comprised of: a vehicle-mounted battery; and a generator driven by power of the engine and serving as both of a drive power supply of the motor and a power supply of accessories. Wherein, the generator has both of a self excitation function and a separate excitation function, and is switched to a mode of one of the self excitation or separate excitation according to drive conditions of the vehicle. In the separate excitation mode of the generator, the power of the battery is stepped up and supplied to a field winding of the generator, and the motor is driven by generator output.

The invention also provides an electric drive system for a vehicle as follows. The invention is characterized in that, when a vehicle speed or an engine rotational speed after starting reaches a predetermined speed, the generator is switched to the self excitation mode and functions as a power supply of accessories.

Further, the invention also provides an electric drive system for a vehicle characterized in that the motor is driven by power supplied from the generator when the vehicle becomes a state of going up a hill, an output of the generator at this time is in the self excitation mode in which filed winding voltage necessary to drive the motor is obtained, and the power of the generator is stepped down and supplied to the battery and accessories.

BEST MODE FOR CARRYING OUT THE INVENTION

One of typical best modes of the present invention is an electric drive system for a vehicle, comprising: a generator driven by an engine for driving the vehicle; a vehicle-mounted battery used for accessories; and a motor for driving the vehicle. Further the is configured so that at least one of output voltage of the generator and output voltage of the battery is stepped up to drive voltage of the motor, and the motor is driven by the step-up output voltage.

Another one of typical best modes of the present invention is an electric drive system for a vehicle in which a part of wheels are driven with an engine and other wheels are driven with a motor, and the system is comprised of: a battery for accessories mounted on a vehicle; and a generator driven by power of the engine and serving as both of a drive power supply of the motor and a power supply of the accessories. Further the system is configured so that the generator has both of self excitation function and a separate excitation function, and is switched to one of the self excitation mode and the separate excitation mode according to drive conditions of the vehicle. In the separate excitation mode of the generator, the power of the battery is stepped up and supplied to the field winding of the generator, and the motor is driven by the generator output.

Embodiment 1

Figure 1:
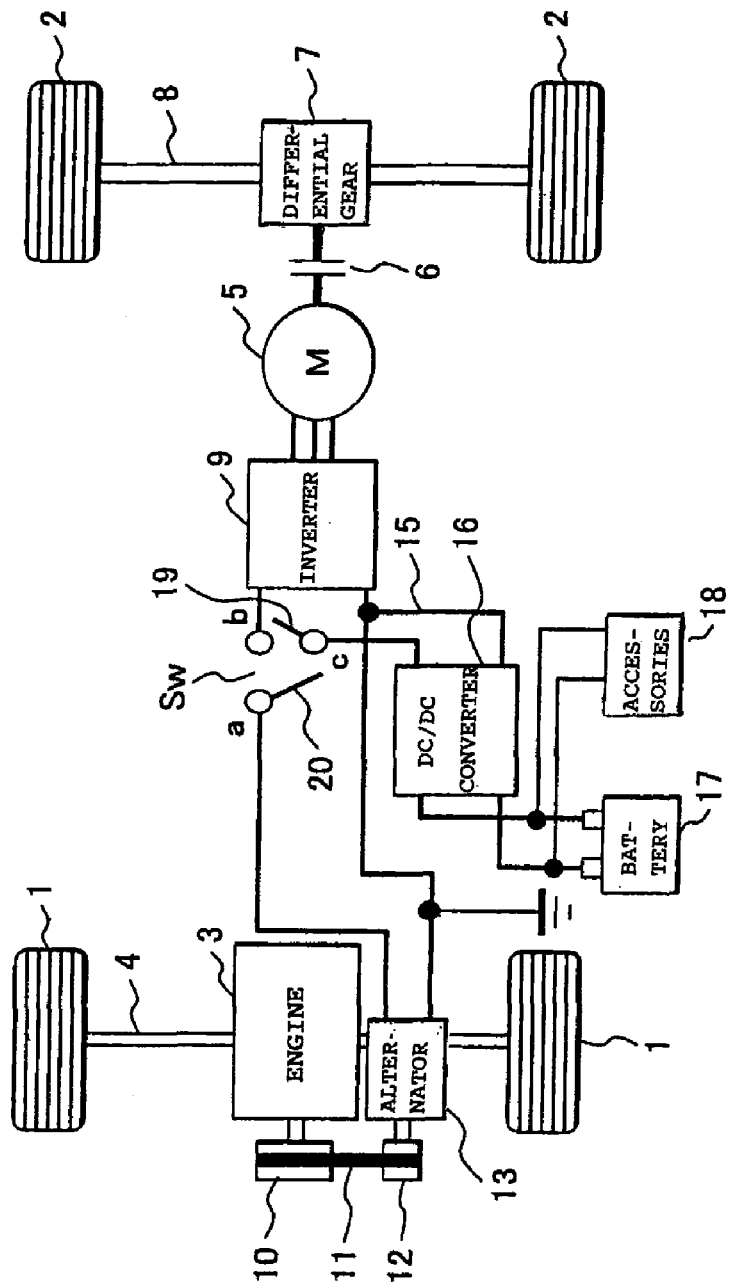
FIG. 1 is a configuration diagram of a vehicle drive system of a hybrid engine-motor type according to an embodiment of the present invention.

FIG. 1 is a configuration diagram of a vehicle drive system of a hybrid engine/motor type vehicle drive system to which an electric drive system for a vehicle according to an embodiment of the invention is applied.

For example, either front wheels 1 or rear wheels 2 (here, the front wheels is cited) are driven by an engine 3 (irrespective of the kind of the engine). The other wheels (in this case, rear wheels) are driven by a motor 4.

A power of the engine 3 is transmitted to a transmission (not shown) and a front-wheel axle 4 to drive a pair of front wheels 1.

A torque of the motor 5 is transmitted to a rear wheel axle 8 via a clutch 6 and a differential gear 7 to drive a pair of rear wheels 2.

The rear wheels 2 are driven by driving the motor 4 as necessary (drive conditions).

In the embodiment, a three phase alternating current motor (AC motor) driven by an inverter 9 is used as an example of the motor 5. A motor/generator for generating not only power (motor function) but also regenerative power (power generating function) is used as the motor 5. The motor (motor/generator) 5 takes the form of a motor/generator such as a Lundell motor, a brushless motor, or an induction machine. The regenerative power is controlled by controlling current flowing in a field coil of the motor (motor/generator) 5.

The inverter 9 may be a PWM scheme or PAM scheme. The inverter 9 executes a motor application voltage control and a frequency control to obtain a torque according to the load and the rotational speed according to a control instruction.

The power of the engine 3 is transmitted to a three-phase alternator (AC generator) 13 via pulleys 10 and 12 and a V belt 11. The alternator 13 serves as both of the drive power supply of the AC motor 5 and the power supply for accessories (general electrical equipment). Further the alternator 13 serves as the power supply for charging a battery (for example, 12V or 14V battery) 17 with the voltage level of the accessories.

The output voltage of the alternator 13 is variable, for example, 0 to 50 by controlling the field current. The AC output of the alternator 10 is converted to direct current by a rectifier (not shown). The DC output is supplied to the inverter 9, and re-converted to alternate current with voltage control and frequency control by the inverter 9. The resultant output is supplied to the motor 5.

The battery (electric power storage device) 17 is connected to a power line A between the motor 5 (inverter 9) and the alternator 13, via a power line B and a voltage step-up/step-down device (for example, DC-DC converter) 16.

The battery 17 is adapted to accessories (electric loads of general electrical equipments such as a starter, a plug, a lump, and an air conditioner) 18 of the vehicle and is set to the specification of 12V or 14V.

The voltage step-up/step-down circuit 16 has the function of stepping down the power supplied from the power line A between the alternator 13 and the AC motor 5 (inverter 9) to the battery 17, and the function of stepping up the voltage supplied from the battery 17 toward the power line A. The step-up and step-down functions of voltage can be switched by a control signal.

Figure 3:
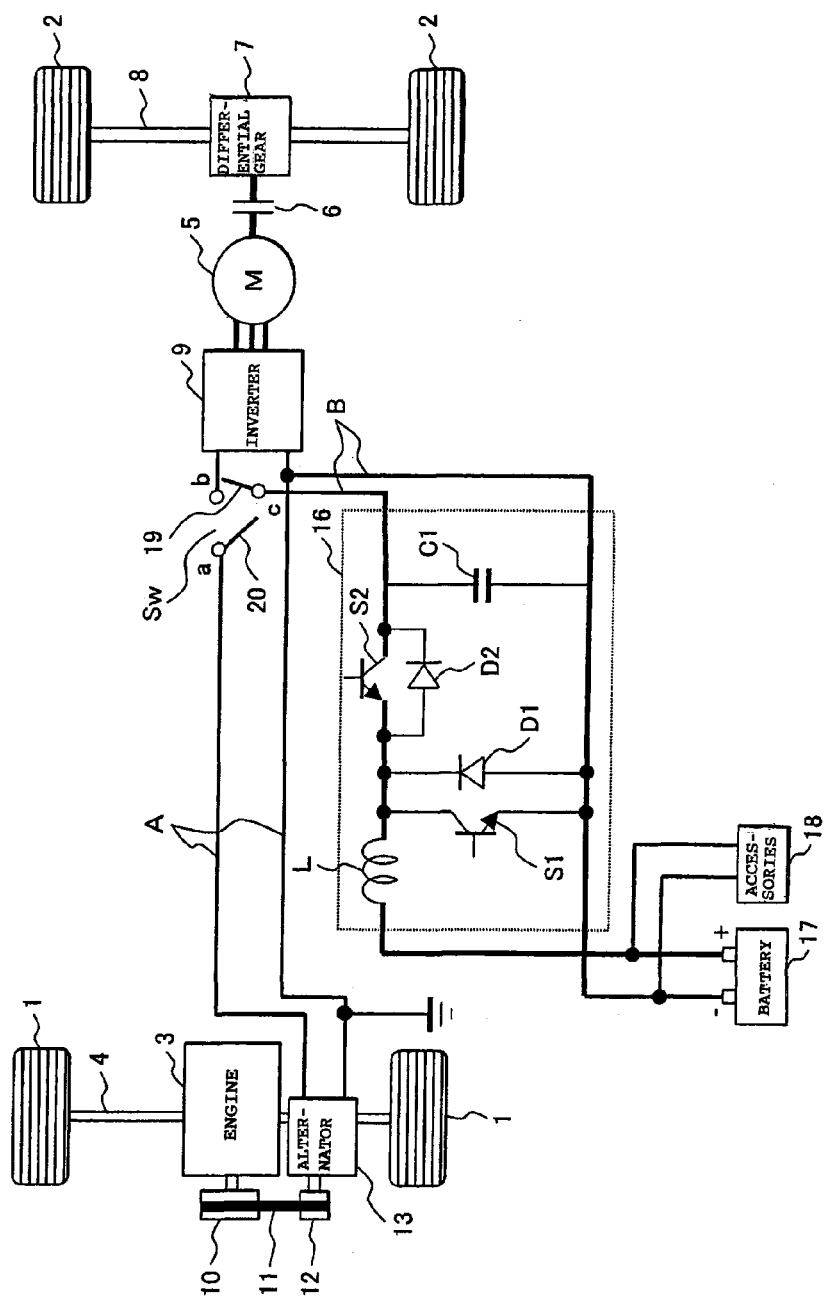
FIG. 3 is an explanatory diagram illustrating operations of the embodiment.

FIG. 3 shows a concrete circuit example of the voltage step-up/step-down circuit 16.

The voltage step-up/step-down circuit 16 has, for example, a choke coil (reactor) L, switching elements S1 and S2, bypass diodes D1 and D2, and a smoothing capacitor C1. The smoothing capacitor C1 is connected between a (+) line and a (−) line of a DC power line B. The switching element S2 and the reactor L are connected in series with the (+) line of the power line B. The diode D2 is connected in parallel with the switching element S2 and is in the forward direction from the battery 17 toward the power line A. The switching element S1 is connected between the (+) line and the (−) line of the power line B. The diode D1 is connected in parallel with the switching element S1 and in the opposite direction from the (+) line toward the (−) line of the power line B.

Turn-on and turn-off of the switching elements S1 and S2 is controlled by a not-shown control unit (control means).

Figure 2:
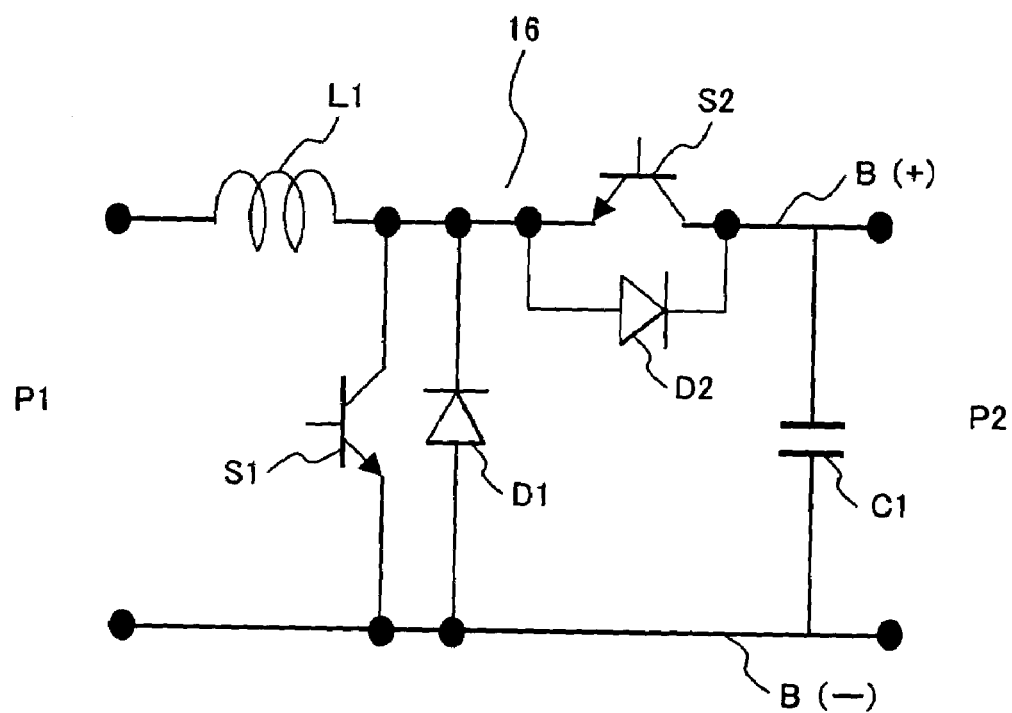
FIG. 2 is a circuit diagram of a voltage step-up/step-down device used in the embodiment.

The operation principle of the voltage step-up/step-down circuit 16 will be described with reference to FIG. 2.

The reference numeral P1 side is a battery side, and the P2 side is an inverter input side.

In the case of stepping-up the battery voltage (P1 side), the switching element S1 is turn-on/turn-off controlled. When the switching element S1 is turned on, the (+) and (−) lines of the power line B are short-circuited, and current suddenly flows. When the switching element S1 is turned off at that time point, a voltage (Ldi/dt) for continuously seeking to keep a current flowing through the reactor L1 is generated, and the voltage is charged to the capacitor C1 on the P2 side via the diode D2, thereby making the voltage on the P2 side higher than that on the P1 side. The voltage step-up control is performed by operating the switching element S1 under the PWM control in which the conduction ratio (duty) is changed.

In the case where the voltage on the inverter side (P2 side) is higher than that on the battery side (P1 side), the switching element S2 can be controlled by the conduction ratio of PWM cycles to step down the voltage on the P2 side. Thereby an average value of output voltages on the P2 side is controlled so as to become a battery charging voltage (for example, 12V), and the resultant voltage can be supplied to the P2 side.

Change-over switches (Sw) 19 and 20 for switching the power supply mode are provided to the (+) lines of the power lines A and B. Semiconductor devices (no-contact devices) are used as the change-over switches Sw. Operation modes set by the change-over switches Sw 19 and 20 will be described hereinbelow in relation with drive conditions of a vehicle with reference to FIGS. 4 to 11.

Figure 4:
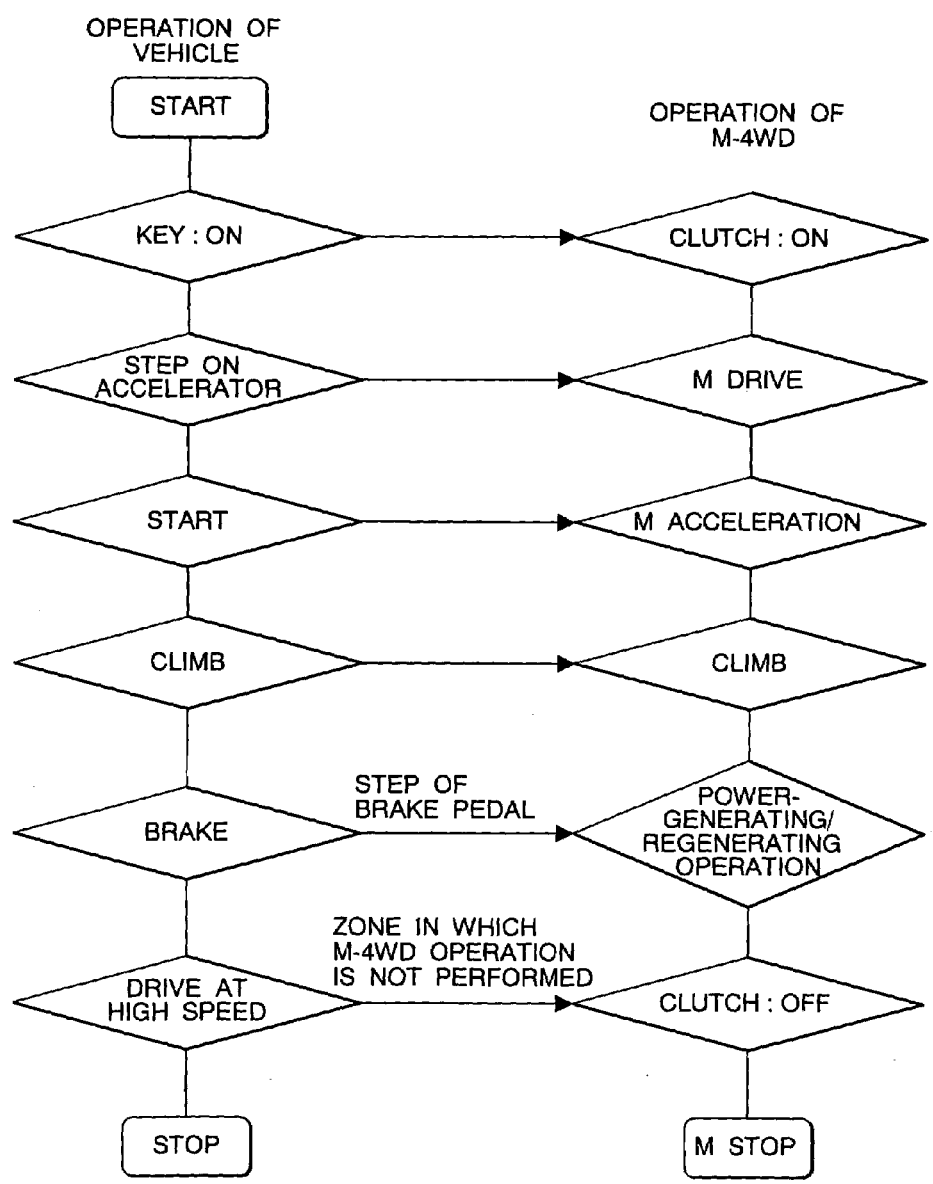
FIG. 4 is a flowchart showing the operations of the embodiment.

FIG. 4 is a flowchart showing the drive state of a vehicle and operations of a vehicle drive system in the case where the clutch 6 is provided. The arrows shown in FIGS. 6 to 11 indicate flows of current.

Figure 6:
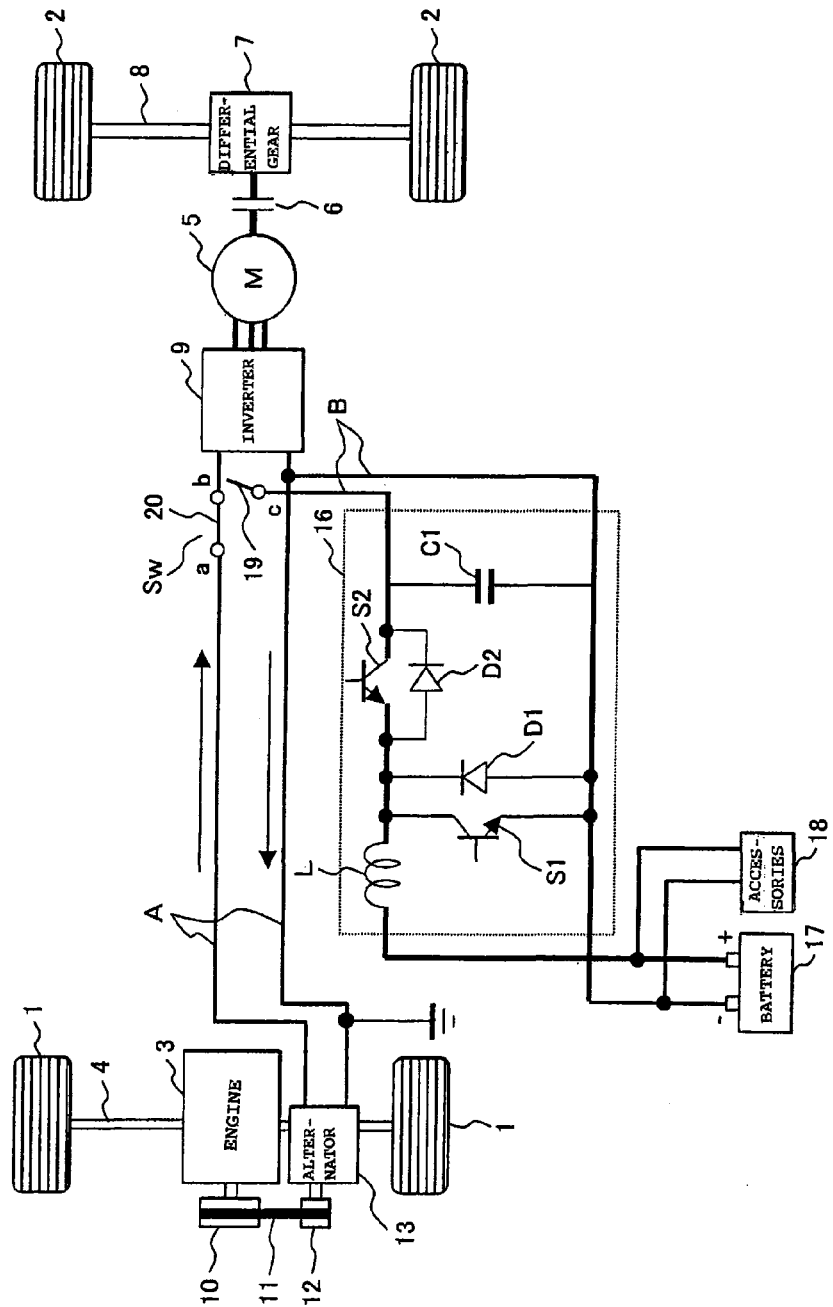
FIG. 6 is an explanatory diagram showing operations (four-wheel driving during times of starting, climbing, and high speed) of the embodiment.

When an engine key switch is turned on, the clutch 6 for transmitting motor power is turned on. When the driver depresses the accelerator, a starting operation mode is set. In this case, the motor for driving rear wheels enters a drive mode (that is, a vehicle four-wheel drive state in which the front wheels are driven by the engine and the rear wheels are driven electrically). In the case where a generation voltage for driving the motor 5 can be ensured only by the output power from the alternator 13, the change-over switch Sw operation shown in FIG. 6 is performed.

In this case, the switch 20 turns on (brings the line into conduction) between a (alternator 13) and b (inverter 9 and motor 5) on the power line A. The switch 19 turns off (opens) the line between b and c (on the power line B of the voltage step-up/step-down circuit 16 and the battery 17).

In this case, power is supplied to the inverter 9 and the AC motor 5 only by the alternator 13. The inverter 9 converts DC power to three-phase alternating-current power and supplies the three-phase alternating-current power to the AC motor 5 via a three-phase alternating-current cable.

Figure 7:
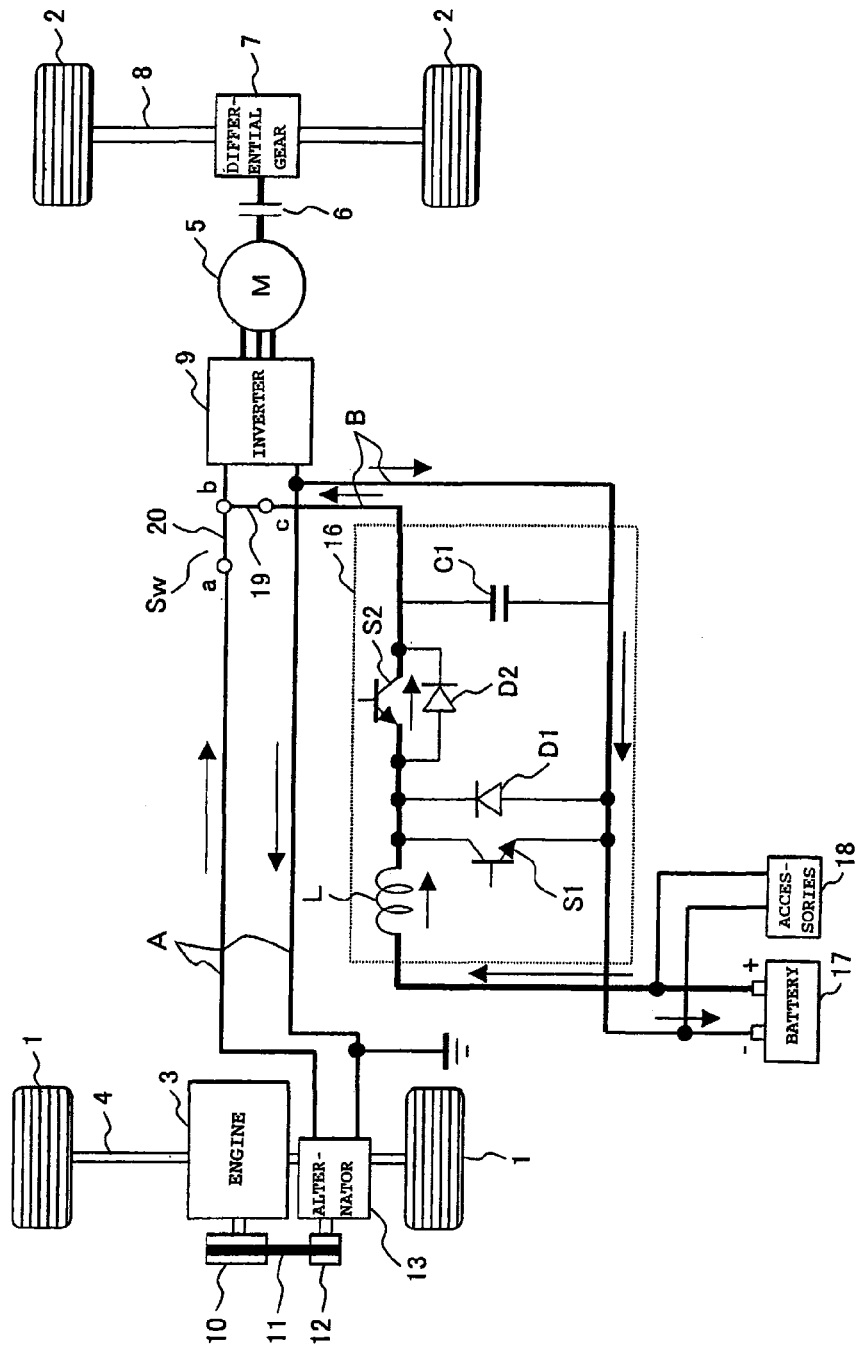
FIG. 7 is an explanatory diagram showing operations (four-wheel driving during times of starting, climbing, and high speed) of the embodiment.

When the drive power of the motor 5 cannot be ensured only by an output from the alternator 13 upon starting, the change-over switch Sw operation shown in FIG. 7 is performed.

In this case, the switch 20 turns on between a and b and between band c. The switching elements S1 and S2 of the voltage step-up/step-down circuit 16 are turn-on/off controlled, the power of the battery 17 is stepped up to a motor drive voltage, and the resultant voltage is supplied to the inverter 9.

In this case, both of the output from the alternator 13 and the step-up voltage from the battery 17 are the motor drive voltage. Both of the powers are supplied to the inverter 9 to drive the AC motor 5.

Figure 8:
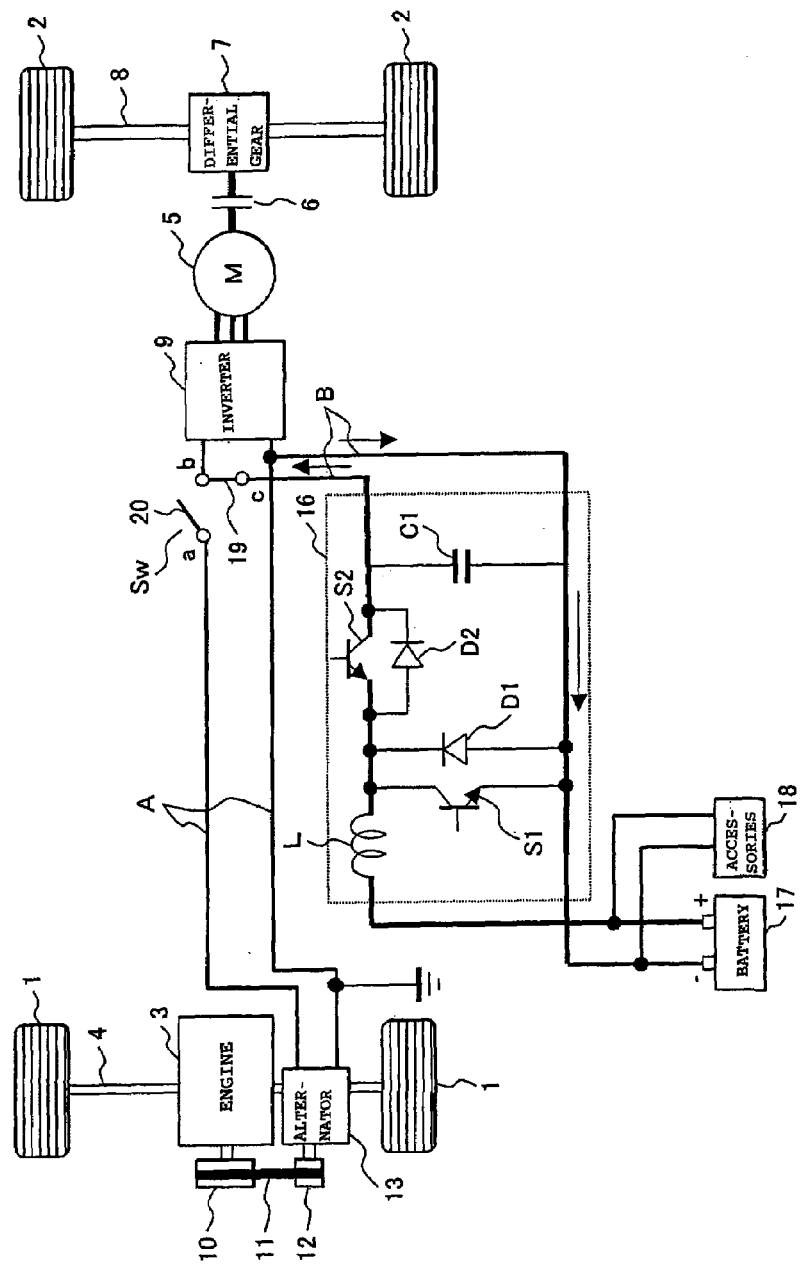
FIG. 8 is an explanatory diagram showing operations (four-wheel driving during times of starting, climbing, and high speed) of the embodiment.

In place of the switching operation of FIG. 7, upon starting, as shown in FIG. 8, it is also possible to turn off between a and b by the switch 20, turn on between b and c by the switch 19. Thereby, it is possible to step up the power of the battery 17, and supply the step-up power to the motor 5 in place of the generator 13.

After starting, in usual low/middle-speed drive, the motor 5 is not driven and two-wheel drive mode only by the engine is performed.

Figure 9:
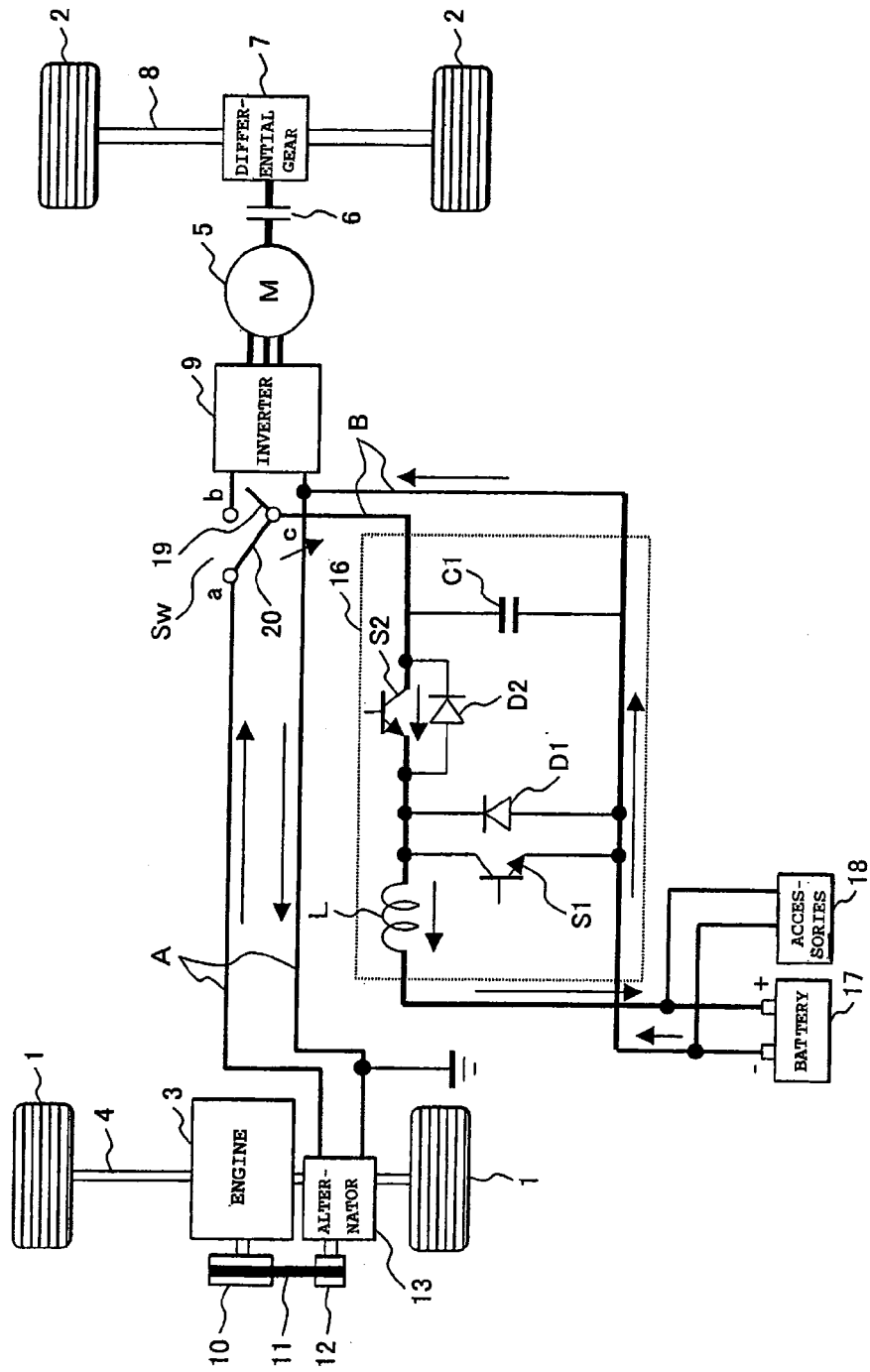
FIG. 9 is an explanatory diagram showing operations (two-wheel driving) of the embodiment.
Figure 10:
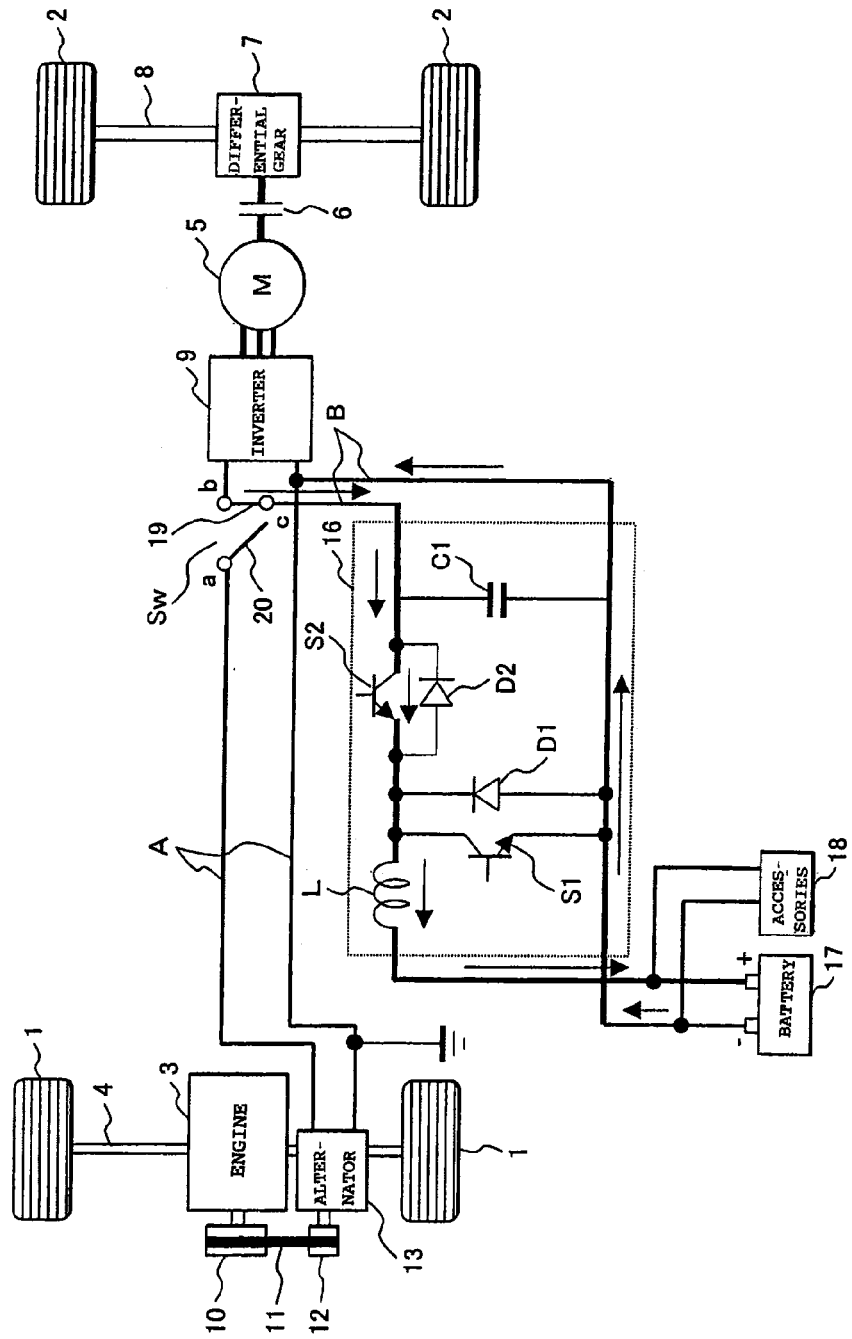
FIG. 10 is an explanatory diagram showing operation (regenerative braking) of the embodiment.

The switching operation of the change-over switches Sw in this case is shown in FIG. 9. The switch 20 turns on between a and c, and the switch 19 turns off between b and c.

In FIG. 8, the power of the alternator 13 is not supplied to the inverter 9 but is stepped down by the voltage step-up/step-down circuit 16 driven by on/off operation of the switching element S1. The resultant is supplied to the battery 17 and the accessories 18.

In FIG. 4, when the vehicle accelerates or performs climb drive, the vehicle drive system also enters an acceleration or climb mode (four-wheel drive mode).

In this case, a switching operation similar to that of FIG. 6 is performed, and the power is supplied from the alternator 13 to the inverter 19 to drive the motor 5. In the case such that a climb load is heavy, the switching similar to that of FIG. 7 may be performed in accordance with the climbing conditions.

Figure 5:
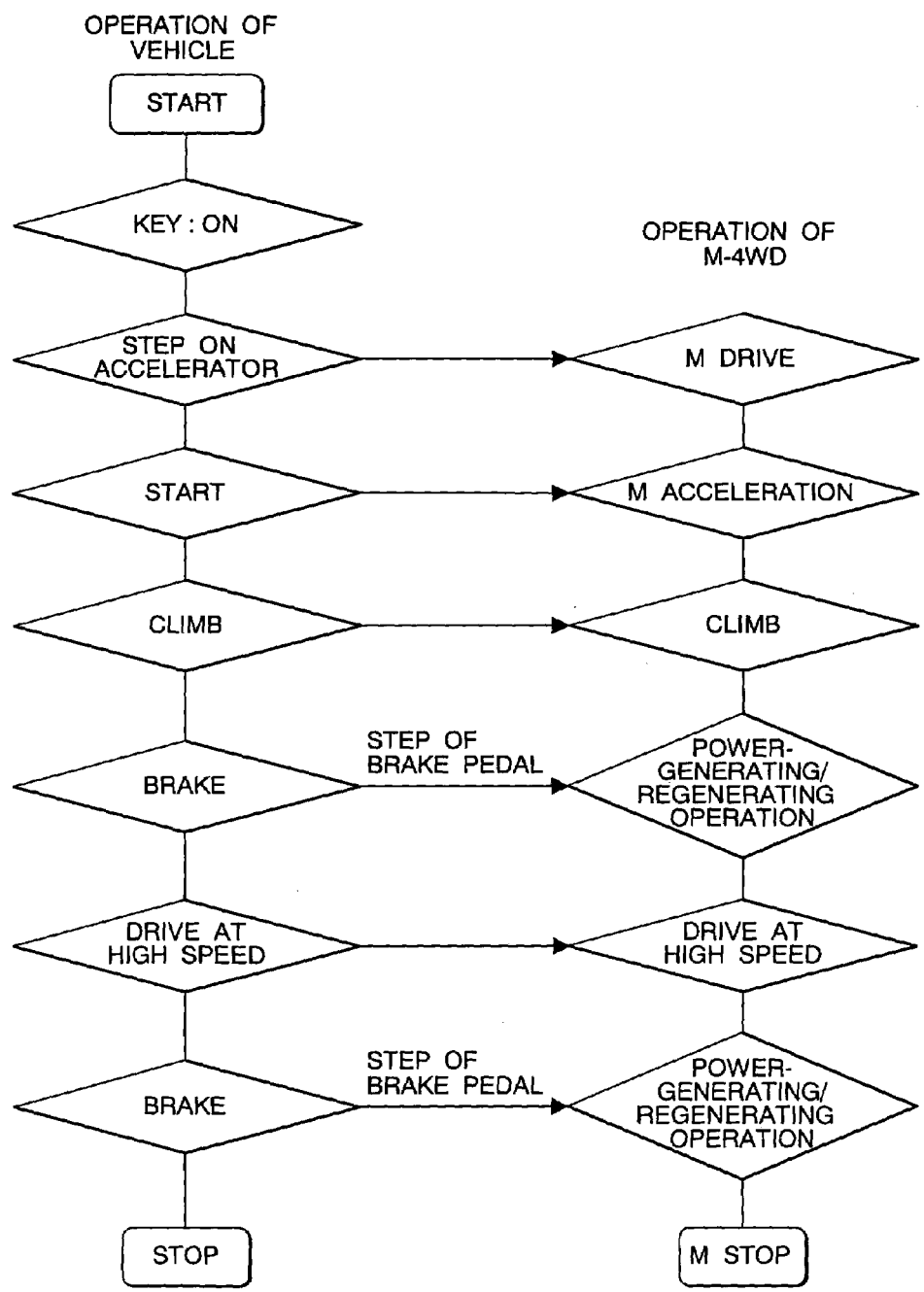
FIG. 5 is a flowchart showing the operations of the embodiment.

As shown in FIG. 5, when drive conditions in a pre-set high-speed drive mode are satisfied, the clutch 6 is turned off. At this time, the operation of the change-over switches Sw shown in FIG. 6 is performed. In this case, as described above, the switch 20 turns on between a and b, and the switch 19 turns off between b and c. By reducing the field current of the alternator 13, small power is supplied to the inverter 9. By reducing the field current, the motor 5 is operated in a small power state. By turning off the clutch 6, the load on the motor 5 can be reduced.

When the brake pedal is stepped on and the vehicle is in a brake state, the motor 5 enters a power generation mode by regenerative braking. The clutch 6 is in the on state. At this time, the switch 20 of the change-over switch Sw shown in FIG. 10 turns off between a and b, and the switch 19 turns on between b and c. The motor 5 serves as a generator, regenerative power (three-phase alternating-current power) is converted to direct current by the inverter 9. The DC power is steppe-down by performing on/off control on the switching element S2 in the voltage step-up/step-down circuit 15, and the resultant is supplied to the battery 17 and the load 18.

In the hybrid engine/motor type vehicle drive system having the above configuration, it is also possible to start the vehicle by driving the motor 5 upon starting and, after that, drive an ignition system without driving the starter to start the engine.

Figure 12:
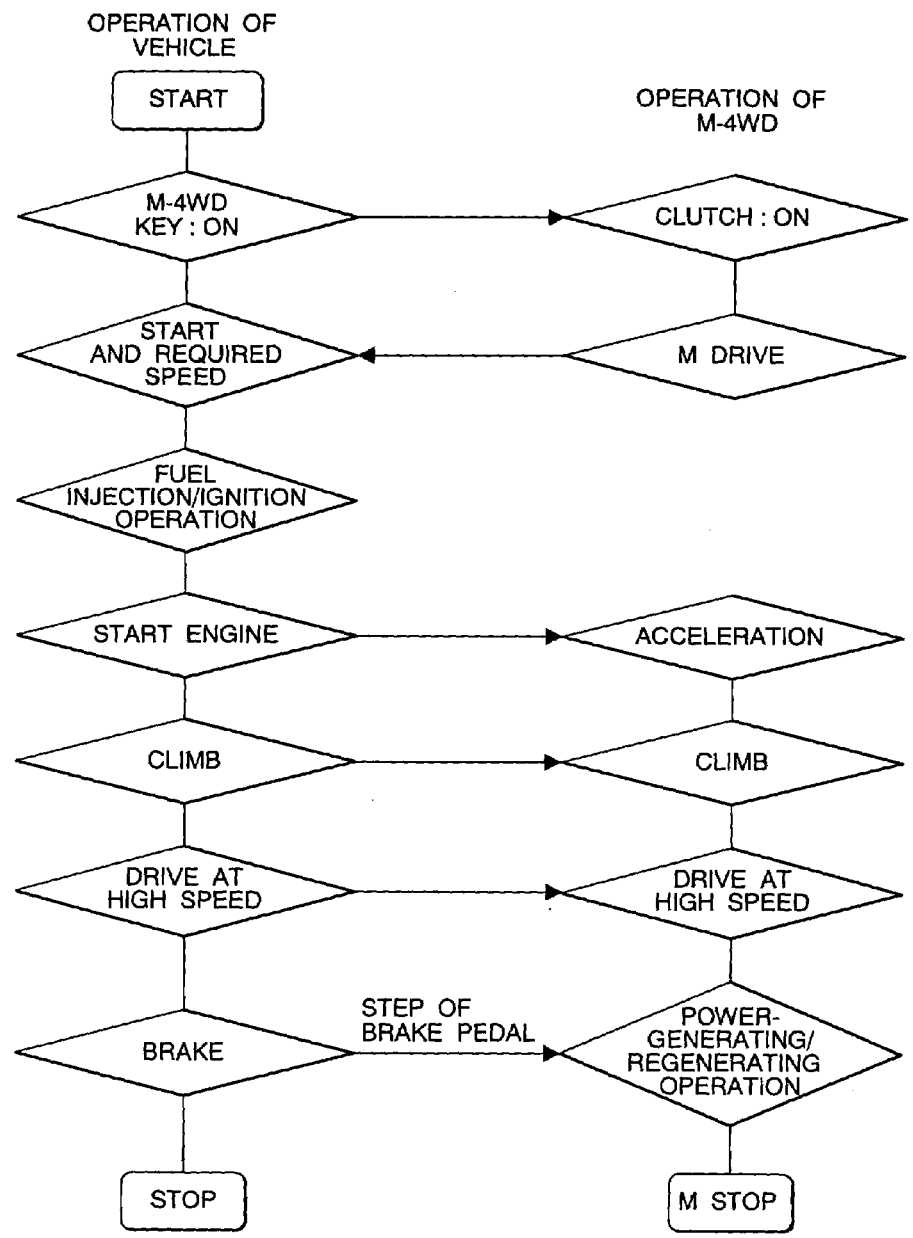
FIG. 12 is a flowchart showing another operation example of the embodiment.
Figure 13:
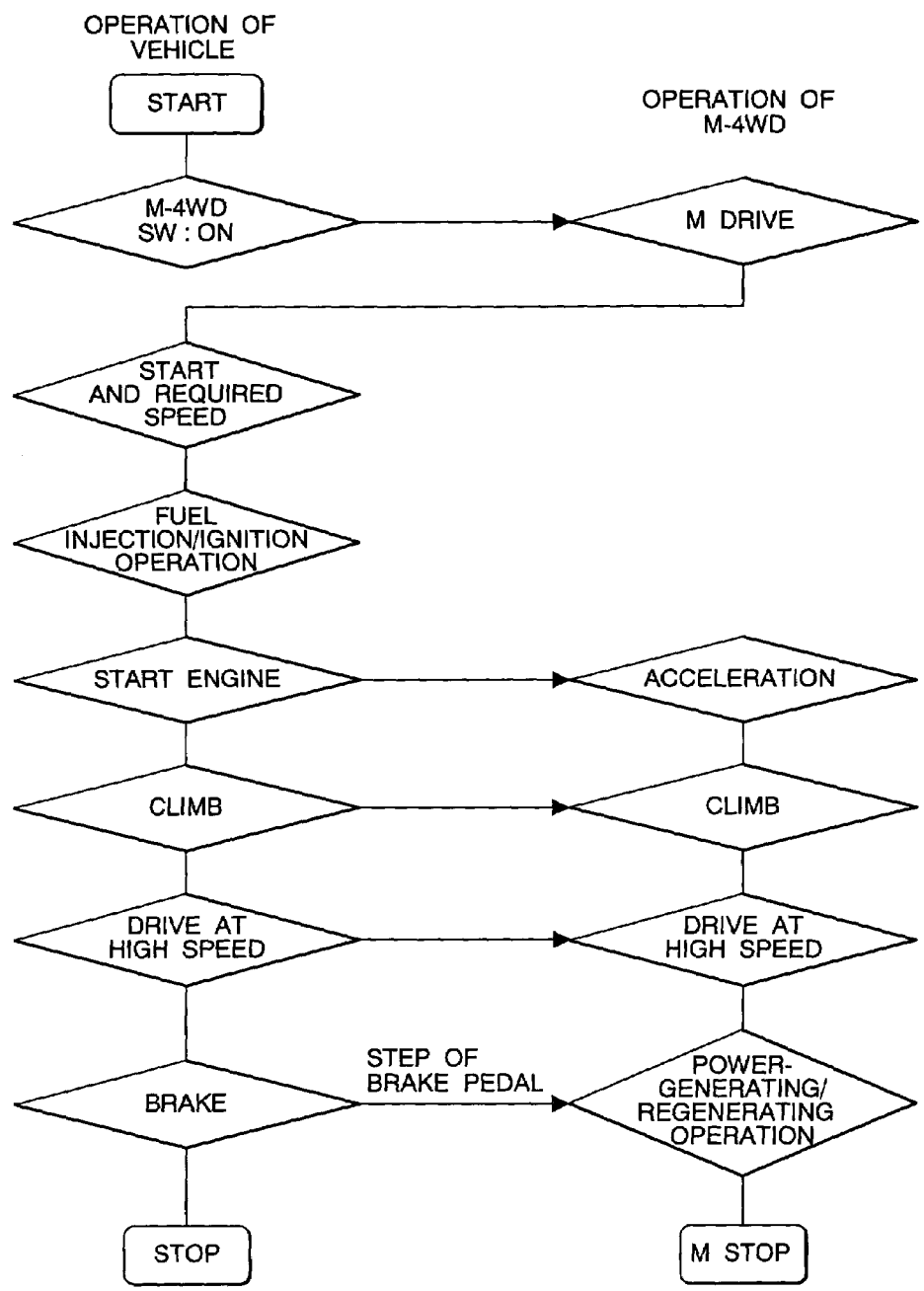
FIG. 13 is a flowchart showing another operation example of the embodiment.
Figure 14:
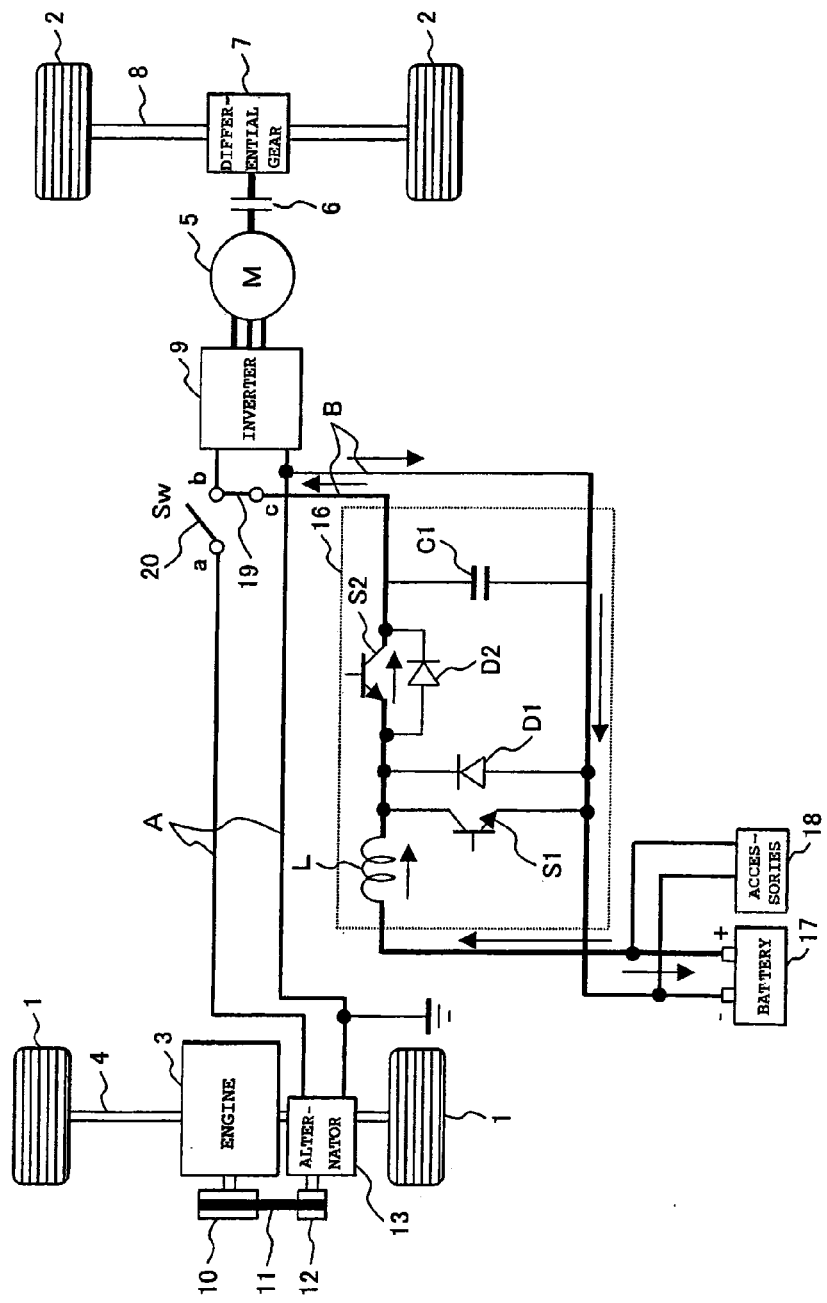
FIG. 14 is an explanatory diagram showing operations (start of engine after starting by the motor) of the embodiment.

FIGS. 12 to 14 show the flowcharts of the control and operating states of the switch 20 executing the control. FIGS. 12 and 14 show an example in which the clutch 6 is provided. FIG. 13 shows an example where no clutch is provided.

In the case of FIGS. 12 and 14, first, when a motor drive switch (M-4WD key) is turned on to start the vehicle, the clutch 6 is turned on. The switch 20 of the change-over switch Sw turns off between a and b, and the switch 19 turns on between b and c. By the operation, the power from the battery power supply 17 is stepped up to the motor drive voltage by the DC-DC converter 16, and the motor drive voltage is supplied to the motor 7 via the inverter 9 to drive the motor 7. After the vehicle starts by driving the motor, wheels rotate. The engine 7 rotates by the mechanical energy of wheels rotation. At required rotational speed of the engine, an engine fuel injection system and an ignition system are operated to start the engine.

After the engine starts, in the four-wheel drive state, not only the switch 19 but also the switch 20 are turned on (the switch between a and b, and the switch between b and c are turned on), so that the power is supplied from the alternator to the motor 5, and the power stepped up by the DC/DC converter 16 is supplied also from the battery 17 to the motor 5. That is, the operations in the case of acceleration, climbing, and high-speed drive are similar to those in FIGS. 4 and 5, and the engine and motor driving shown in FIGS. 7 and 8 is performed.

The braking operation is also similar to that of FIGS. 4 and 5. In the case of a non-four-wheel drive (two-wheel drive), engine driving shown in FIG. 9 is performed.

Also in the case where no clutch is provided as shown in FIG. 13, the basic operations are similar to those in FIGS. 12 and 14 except for the clutch.

According to the embodiment, the following effects are produced.

(1) A vehicle is driven by using not only the engine but also the motor as necessary during times of starting, climbing, high-speed drive, accelerating drive, and the like, thereby realizing improvement in fuel consumption and reduction in exhaust gas.

(2) In the hybrid engine/motor type vehicle drive system, one alternator (one generator) and one battery can be realized.

(3) In the case where power is insufficient during times of motoring, a battery output can be stepped up and the resultant power can be added to the vehicle drive motor. In such a manner, the output of the generator is stepped up particularly during times of starting or climbing. Thus, the power of the electric driving of the wheels can be increased.

(4) The energy during times of braking can be regenerated for the battery, so that the fuel consumption can be improved.

(5) In the case of employing a drive method of starting the vehicle by driving the motor and, after that, starting the engine, further improvement in fuel consumption and further reduction in exhaust gas can be realized.

Figure 11:
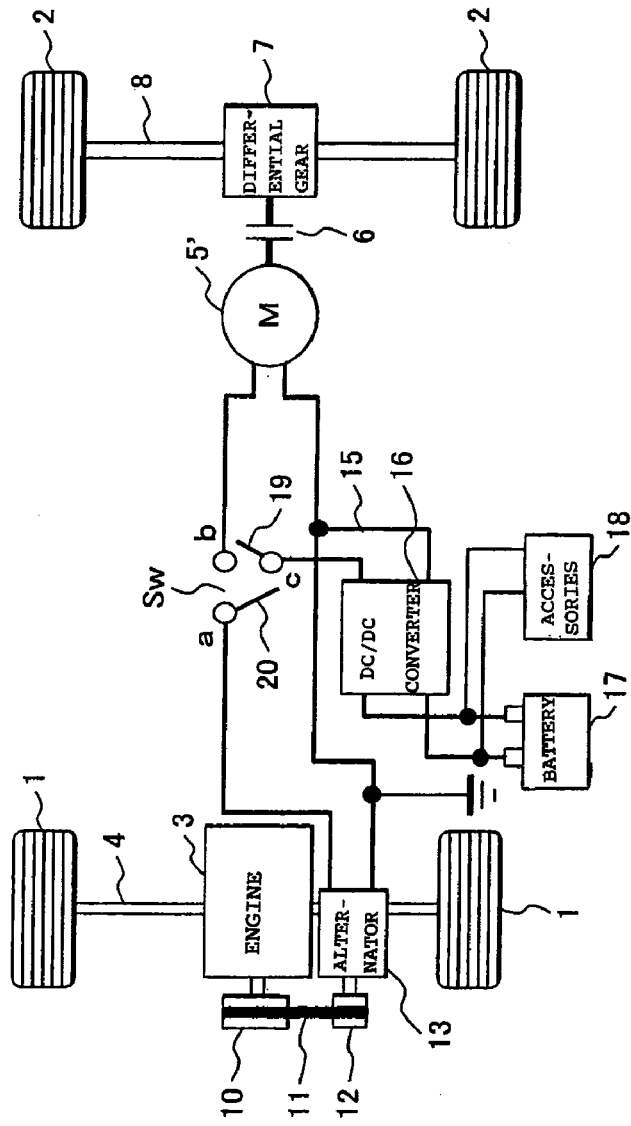
FIG. 11 is an explanatory diagram showing another embodiment of the present invention.

The invention is not limited to the foregoing embodiment. For example, the front wheels may be driven by the motor, and the rear wheels may be driven by the engine. In place of the AC motor, a direct current motor (DC motor) can be used. FIG. 11 shows an example in which a DC motor 5' is used as a vehicle drive motor. In FIG. 11, the output (rectified to direct current) from the alternator 13 and the step-up power from the battery 17 are supplied to the DC motor 5' to drive the same.

Alternately, it is also possible to step up only the output from the battery 17 and supply the resultant to the DC motor 5' in a manner similar to FIG. 8.

Figure 15:
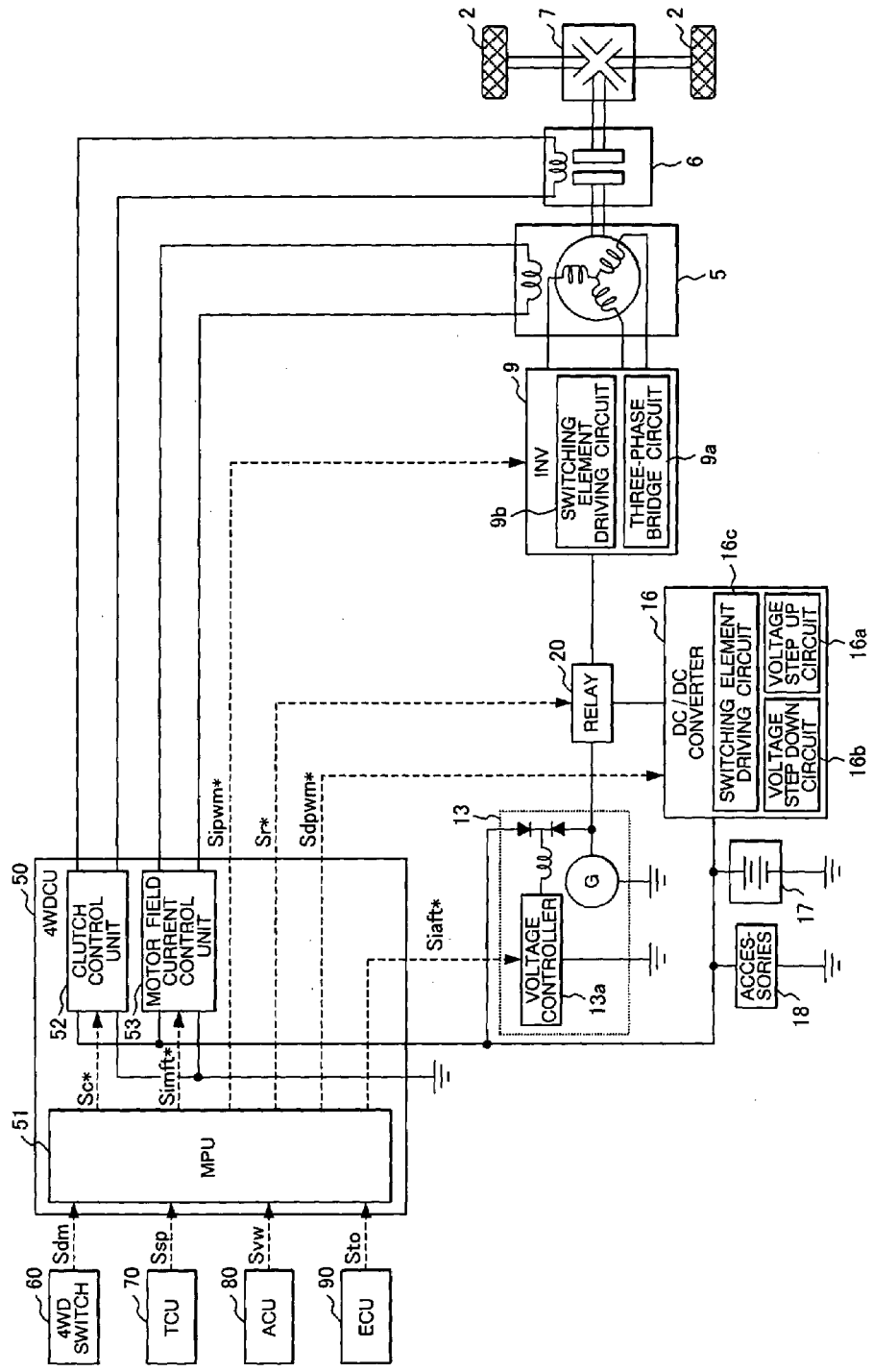
FIG. 15 is a diagram showing a configuration of an electric drive system for a vehicle of the embodiment including a 4WD control unit.
Figure 16:
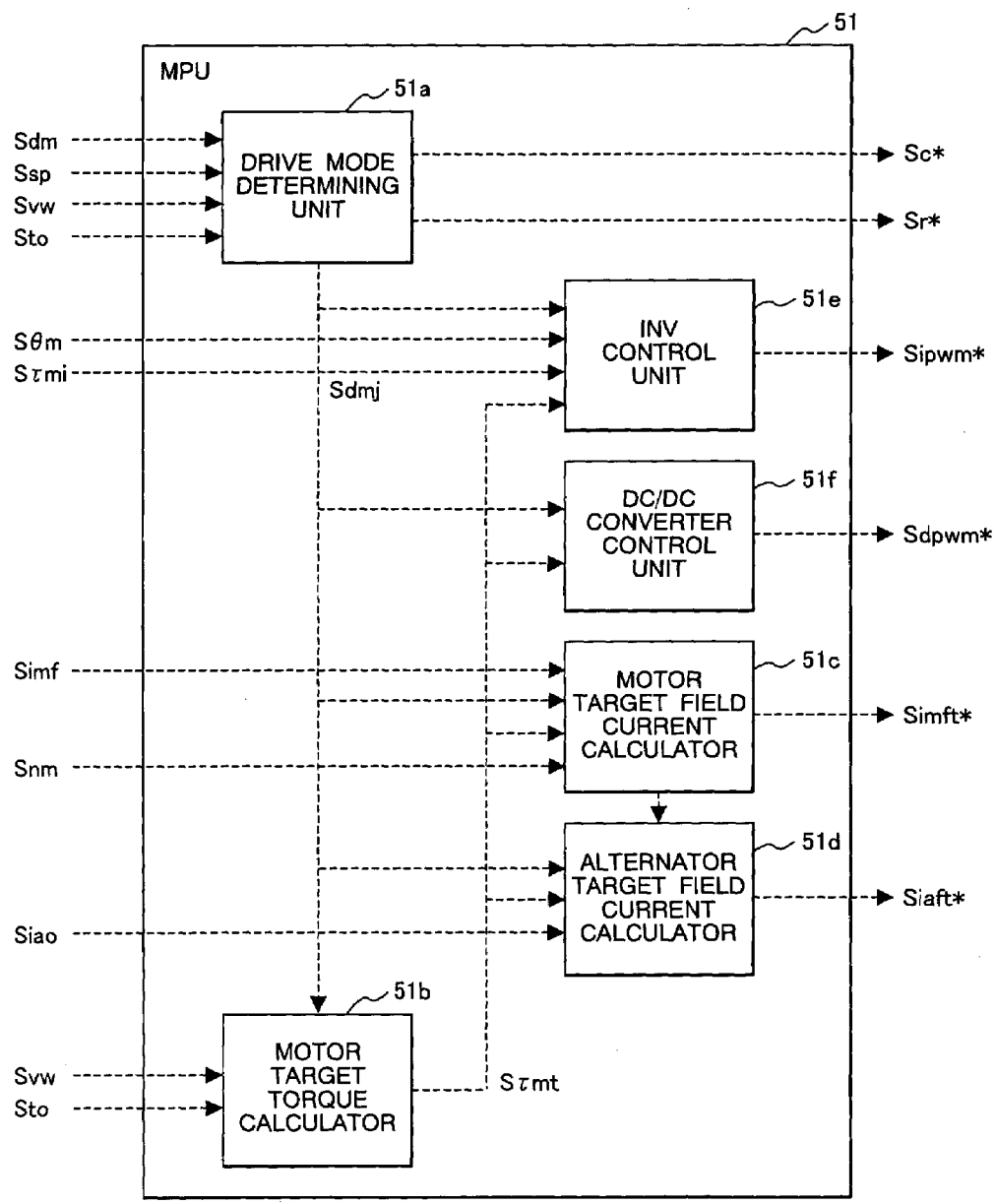
FIG. 16 is a block diagram showing a functional configuration of a microprocessor unit as a component of the 4WD control unit.
Figure 17:
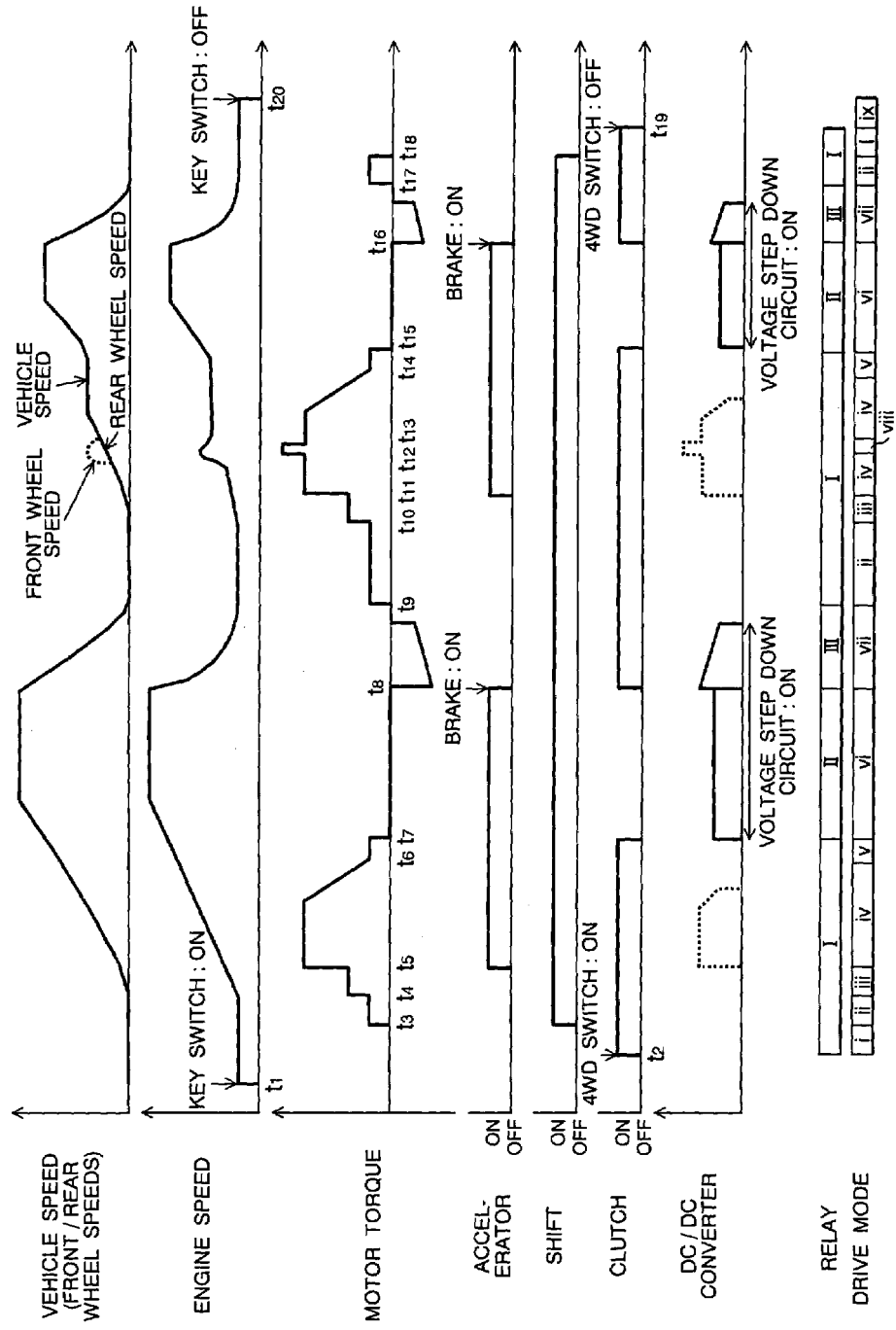
FIG. 17 is a time chart showing operation timings in a vehicle operation state of components of the electric drive system for a vehicle of the embodiment.

Further, the embodiment will be described in detail with reference to FIGS. 15 to 17. FIG. 15 shows a system configuration of the electric drive system for vehicle of the embodiment including a 4WD control unit. FIG. 16 shows a functional configuration of a microprocessor unit as a component of the 4WD control unit. FIG. 17 shows operation timings in a vehicle operation state of components of the electric drive system for vehicle of the embodiment.

The electric drive system for vehicle of the embodiment has a 4WD control unit 50 (hereinbelow, called "4WD CU 50") as the above-described control unit (control means). On the basis of a signal input from the outside, the 4WD CU 50 controls output of the motor 5, on/off of the clutch 6, output of the inverter 9, output of the alternator 13, output of the DC/DC converter 16, and on/off of the relay 20.

The 4WD CU 50 takes in various signals: a 4WD mode signal Sdm output from a 4WD switch (hereinbelow, called "4WD SW") 60, a shift position signal Ssp output from a transmission control unit (hereinbelow, called "TCU") 70, a wheel speed signal Svw output from an ABS control unit (hereinbelow, called "ACU") 80, and a throttle opening signal Sto output from an engine control unit (hereinbelow, called "ECU") 90. The 4WD CU 50 takes in various feedback signals: a motor rotational speed signal Smn, a motor field current signal Simf, an alternator output current signal Siao, and the like.

The 4WD SW 60 is a drive mode change-over switch provided at a driver's seat and is manually turned on/off by the driver when the driver wishes to switch the drive mode of the vehicle from a 2WD mode to a 4WD mode or from the 4WD mode to the 2WD mode.

The 4WD CU 50 has a microprocessor unit (hereinbelow, called "MPU") 51, a clutch control unit 52, and a motor field current control unit 53. In addition, the 4WD CU 50 has a memory for storing information, an interface circuit for inputting/outputting signals, and the like. In the embodiment, the memory, the interface circuit, and the like are not shown.

The MPU 51 executes a computing process for outputting a control instruction signal of components necessary for four-wheel drive on the basis of the above-described various input signals, and outputs the control instruction signals obtained by the computing process to the components, or to drive circuits and control circuits of the components mounted in the 4WD CU 50. Concretely, the MPU 51 outputs a clutch control instruction signal Sc* to the clutch control unit 52, outputs a motor target field current control instruction signal Simft* to the motor field current control unit 53, outputs an inverter-drive PWM control instruction signal Sipwm* to the inverter 9, outputs an alternator target field current control instruction signal Siaft* to the alternator 13, outputs a PWM control instruction signal Sdpwm* for driving DC/DC converter to the DC/DC converter 16, and outputs a relay control instruction signal Sr* to the relay 20.

The clutch control unit 52 is used as a drive circuit of the clutch 6. The clutch 6 is an electromagnetic driven type clutch. The clutch control unit 52 functions as a voltage controller that receives the clutch control instruction signal Sc* output from the MPU 51 and controls a voltage applied to an exciting coil of the clutch 6. The exciting coil of the clutch 6 generates an electromagnetic force that drives a driving part of a mechanical clutch mechanism.

The motor field current control unit 53 is a control circuit which controls a current passage amount and a current passage direction of the field current flowing in a field winding of the motor 5. The motor field current control unit 53 receives the motor target field current control instruction signal Simft* output from the MPU 51, and controls the current passage amount and the current passage direction of the field current flowing in the field winding of the motor 5. Concretely, the motor field current control unit 53 is comprised of: an H bridge circuit (not shown) using four MOSFETs (MOS field effect transistors) electrically connected in an H bridge shape; and a switching element driving circuit (not shown) for driving each of the four MOSFETs. The motor target field current control instruction signal Simft* output from the MPU 51 is input to the switching element driving circuit. The switching element driving circuit produces drive signals for making the four MOSFETs perform on/off operation on the basis of the motor target field current control instruction signal Simft*. Each drive signal is input to the gate terminal of a corresponding MOSFET. Thereby, each of the four MOSFETs performs on/off operation to control the field current flowing in the field winding of the motor 5.

The inverter 9 controls driving of the motor 5 by controlling power supplied to the motor 5. The inverter functions as a converter which receives the inverter-drive PWM control instruction signal Sipwm* output from the MPU 51, converts DC current output from the alternator 13 or DC/DC converter 16 to three-phase alternating-current power, and supplies the three-phase alternating-current power to the electric armature winding of the motor 5. Concretely, the inverter 9 is configured by a converter circuit in which six MOSFETs are electrically connected in a bridge shape. The inverter 9 is comprised of: a three-phase bridge circuit 9a for converting an input direct current power to three-phase alternating current power by on/off operation of each of the six MOSFETs; and a switching element driving circuit 9b for driving each of the six MOSFETs. The inverter-drive PWM control instruction signal Sipwm* output from the MPU 51 is input to the switching element driving circuit 9b. The switching element driving circuit 9b produces drive signals for making the six MOSFETs perform on/off operation on the basis of the input PWM control instruction signal Sipwm* for driving inverter. Each drive signal is input to the gate terminal of a corresponding MOSFET. By the drive signals, each of the six MOSFETs performs on/off operation so that the DC power input to the inverter 9 is converted to three-phase AC power.

The DC/DC converter 16 controls the DC power supplied from the alternator 13 or inverter 9 to the battery 17 and, as necessary, controls the DC power supplied from the battery 17 to the inverter 9. The DC/DC converter 16 receives the DC/DC converter-drive PWM control instruction signal Sdpwm* output from the MPU 51. According to the signal Sdpwm*, the DC/DC converter 16 steps down the DC power supplied from the alternator 13 or inverter 9 to predetermined DC power, and supplies the predetermined DC power to the battery 17. Further the DC/DC converter 16, as necessary, steps up the DC power supplied from the battery 17 to the inverter 9 to predetermined DC power, and supplies the predetermined DC power to the inverter 9. Concretely, the DC/DC converter 16 is comprised of: a voltage step-up circuit 16a and a voltage step-down circuit 16b that are configured by switching elements such as transistors or MOSFETs; and a switching element driving circuit 16c for driving the switching elements of the voltage step-up circuit 16a and the voltage step-down circuit 16b. The DC/DC converter-drive PWM control instruction signal Sdpwm* output from the MPU 51 is input to the switching element driving circuit 16c. The switching element driving circuit 16c produces drive signals for making switching elements perform on/off operation on the basis of the DC/DC converter-drive PWM control instruction signal Sdpwm*. Each drive signal is input to a corresponding switching element. By the drive signals, the switching elements perform the on/off operation to step up or step down the DC power input to the DC/DC converter 16.

The relay 20 is comprised of a switching circuit (not shown) and a semiconductor element driving circuit (not shown). The switching circuit switches electric connection among the inverter 9, alternator 13, and DC/DC converter 16 and is comprised of a plurality of semiconductor elements (no-contact elements) as described above. The semiconductor element driving circuit is provided to operate the plurality of semiconductor elements in the switching circuit. A relay control instruction signal Sr* output from the MPU 51 is input to the semiconductor element driving circuit. The semiconductor element driving circuit produces drive signals for operating respective the semiconductor elements on the basis of the input relay control instruction signal Sr*. Each drive signal is input to a corresponding semiconductor element to make each of the semiconductor elements operate. In such a manner, electric connection among the inverter 9, alternator 13, and DC/DC converter 16 is switched.

The functional configuration of the MPU 51 will now be described in detail with reference to FIG. 16.

The MPU 51 is a microprocessing unit comprising a single semiconductor chip to execute a four-wheel drive control program, produce control instruction signals of respective components on the basis of input information.

The functional configuration of the MPU 51 will be concretely described. The MPU 51 has a drive mode determining unit 51a, a motor target torque calculating unit 51b, a motor target field current calculating unit 51c, an alternator target field current calculating unit 51d, an inverter control unit 51e, and a DC/DC converter control unit 51f.

When the vehicle is in the 4WD mode, the drive mode determining unit 51a determines various drive modes of the 4WD to output a drive mode determination signal Sdmj. The drive mode determining unit 51a outputs the clutch control instruction signal Sc* and the relay control instruction signal Sr* in accordance with the determined drive mode. The drive mode determining unit 51a takes in the 4WD mode signal Sdm, throttle opening signal Sto, wheel speed signal Svw, and shift position signal Ssp are input. The wheel speed signal Svw includes various wheel speed signals such as a left front wheel speed signal Svflw, a right front wheel speed signal Svfrw, a left rear wheel speed signal Svrlw, and a right rear wheel speed signal Svrrw.

The drive mode determining unit 51a makes condition determinations (1) to (6) for determining the drive mode on the basis of an input signal. The condition determinations (1) to (6) are as follows.

Condition Determination (1): Drive Mode Determination

The drive mode determining unit 51a determines a drive mode selected by the driver in accordance with the input 4WD mode signal Sdm. In this case, the drive mode determining unit 51a determines the drive mode selected by the driver on the basis of whether the 4WD mode signal Sdm is input or not. In the case where the 4WD mode signal Sdm is input (the 4WD SW 60 is on), the drive mode determining unit 51a determines that the drive mode selected by the diver is the 4WD mode. In the case where the 4WD mode signal Sdm is not input (the 4WD SW 60 is off), the drive mode determining unit 51a determines that the drive mode selected by the driver is the 2WD mode.

Condition Determination (2): Accelerator On/Off Determination

The drive mode determining unit 51a determines a depressing state of the accelerator (on/off state of the accelerator) by the driver in accordance with the input slot opening signal Sto. In this case, the drive mode determining unit 51a determines the depressing state of the accelerator (on/off state of the accelerator) by comparison between the ratio of the throttle opening (the ratio of the real throttle opening to full throttle) and a predetermined throttle opening ratio To1 (for example, 2%) which is preliminarily set. When the ratio of a throttle opening To input via the throttle opening signal Sto is less than the throttle opening ratio To1, the drive mode determining unit 51a determines that the driver does not depress the accelerator (off state of the accelerator). When the ratio of the throttle opening To input via the throttle opening signal Sto is equal to or higher than the throttle opening ratio To1, the drive mode determining unit 51a determines that the driver depresses the accelerator (on state of the accelerator).

Condition Determination (3): Shift On/Off Determination

The drive mode determining unit 51a determines the on/off state of a shifter in accordance with the shift position signal Ssp supplied. In this case, whether the shift is on or off is determined depending on whether the shift position Sp input via the shift position signal Ssp lies in a drive range or not. In the case where the shift position Sp lies in the drive range, the drive mode determining unit 51a determines that the shift is on. In the other cases, the drive mode determining unit 51a determines that the shift is off.

Condition Determination (4): Wheel Speed Determination

The drive mode determining unit 51*a* determines a wheel speed Vv in accordance with the input left front wheel speed signal Svflw, right front wheel speed signal Svfrw, left rear wheel speed signal Svrlw, and right rear wheel speed signal Svrrw. In this case, the drive mode determining unit 51*a* obtains an average front wheel speed from an average of left front wheel speed Vflw input via the left front wheel speed signal Svflw and right front wheel speed Vfrw input via the right front wheel speed signal Svfrw; the unit 51*a* obtains an average rear wheel speed from an average of the left rear wheel speed Vrlw input via the left rear wheel speed signal Svrlw and the right rear wheel speed Vrrw input via the right rear wheel speed signal Svrrw. In addition, the drive mode determining unit 51*a* obtains the wheel speed Vw from an average of the obtained average front wheel speed and average rear wheel speed, and determines the vehicle speed Vv from the obtained wheel speed Vw. In the case where the obtained wheel speed Vw is 0 km/h, the drive mode determining unit 51*a* determines that the vehicle speed Vv is 0 km/h. In the case where the obtained wheel speed Vw is a predetermined wheel speed Vw1 (for example, 20 km/h) or higher, the drive mode determining unit 51*a* determines that the vehicle speed Vv is equal to or higher than the predetermined wheel speed Vw1. Further, in the case where the obtained wheel speed Vw lies between 0 km/h them, specifically, is larger than 0 km/h and smaller than the predetermined wheel speed Vw1, the drive mode determining unit 51*a* determines that the wheel speed Vv is larger than 0 km/h and smaller than the predetermined wheel speed Vw1. Further, in the case where the obtained wheel speed Vw is larger than a predetermined wheel speed Vw2, that is, the minimum speed at which regeneration is possible (speed larger than 0 km/h and smaller than the predetermined wheel speed Vw1), the drive mode determining unit 51*a* determines that the vehicle speed Vv is equal to or larger than the wheel speed Vw2.

Condition Determination (5): Slip Determination

The drive mode determining unit 51*a* determines whether the wheels slip or not (the presence or absence of slip) on the basis of the input left front wheel speed signal Svflw, right front wheel speed signal Svfrw, left rear wheel speed signal Svrlw, and right rear wheel speed signal Svrrw. In this case, a wheel speed difference ΔVw is obtained from the difference between the average front wheel speed and the average rear wheel speed computed as described above, and whether wheels slip or not (the presence or absence of slip) is determined on the basis of the obtained wheel speed difference ΔVw. In the case where the obtained wheel speed difference ΔVw is equal to or smaller than a predetermined wheel speed difference Awl (for example, 5 km/h), the drive mode determining unit 51*a* determines that the wheels do not slip (absence of slip). In the case where the obtained wheel speed difference ΔVw exceeds the predetermined wheel speed difference ΔVw1, the drive mode determining unit 51*a* determines that the wheels slip (presence of slip).

Condition Determination (6): On/Off Determination of Clutch

The drive mode determining unit 51*a* stores the clutch control instruction Sc* output to the clutch control unit 52, and recognizes the on/off state of the clutch 6. Therefore, the drive mode determining unit 51*a* determines the on/off state of the clutch 6 in accordance with the stored clutch control instruction signal Sc*. In the case where the stored clutch control instruction signal Sc* is a signal related to the on state of the clutch 6, the drive mode determining unit 51*a* determines that the clutch 6 is in the on state. In the case where the stored clutch control instruction signal Sc* is a signal related to the off state of the clutch 6, the drive mode determining unit 51*a* determines that the clutch 6 is in the off state.

On the basis of the results of the condition determinations (1) to (6), the drive mode determining unit 51*a* determines the 4WD drive mode. The 4WD drive mode includes modes i to ix. The relations between the 4WD drive modes i to ix and results of the condition determinations (1) to (6) corresponding to the 4WD drive modes i to ix, respectively, are as follows.

Drive Mode i: 4WD Preparation Mode

The 4WD SW 60 is on, the vehicle speed is 0 km/h, there is no slip, the accelerator is off, the shift is off, and the clutch is on.

Drive Mode ii: 4WD Start Standby Mode

The 4WD SW 60 is on, the vehicle speed is 0 km/h, there is no slip, the accelerator is off, the shift is on, and the clutch is on.

Drive Mode iii: 4WD Creep Mode

The 4WD SW 60 is on, the vehicle speed is larger than 0 km/h and smaller than Vw1, there is no slip, the accelerator is off, the shift is on, and the clutch is on.

Drive Mode iv: 4WD Normal Drive Control Mode

The 4WD SW 60 is on, the vehicle speed is larger than 0 km/h and smaller than Vw1, there is no slip, the accelerator is on, the shift is on, and the clutch is on.

Drive Mode v: 4WD Control Stop Mode

The 4WD SW 60 is on, the vehicle speed is equal to or larger than Vw1, there is no slip, the accelerator is on, the shift is on, and the clutch is on.

Drive Mode vi: 4WD Drive Standby Mode

The 4WD SW 60 is on, the vehicle speed is equal to larger than Vw1, there is no slip, the accelerator is on, the shift is on, and the clutch is off.

Drive Mode vii: 4WD Regenerative Mode

The 4WD SW 60 is on, the vehicle speed is larger than Vw2, there is no slip, the accelerator is off, the shift is on, and the clutch is on.

Drive Mode viii: 4WD Slip Drive Control Mode

The 4WD SW 60 is on, the vehicle speed is larger than 0 km/h and smaller than Vw1, there is slip, the accelerator is on, the shift is on, and the clutch is on.

Drive Mode ix: 4WD Stop Mode

The 4WD SW 60 is off, the vehicle speed is 0 km/h, there is no slip, the accelerator is off, the shift is off, and the clutch is off.

The drive mode determining unit 51*a* determines the 4WD drive mode and, as a result, outputs the signal related to the determined drive mode as the drive mode determination signal Sdmj to the motor target torque calculating unit 51*b*. The drive mode determination signal Sdmj is input to each of the motor target field current calculating unit 51*c*, alternator target field current calculating unit 51*d*, inverter control unit 51*e*, and DC/DC converter control unit 51*f*. Further, the drive mode determining unit 51*a* outputs the clutch control instruction signal Sc* for controlling the on/off state of the clutch 6 to the clutch control unit 52, and outputs the relay control instruction signal Sr* for controlling connection of the relay 20 to a relay control unit 51*g*.

The 4WD drive mode is used on precondition that the engine 3 has started by turn-on of the key switch.

In the case where the driver turns off the 4WD SW 60 or in the case where the driver turns off the key switch while setting the 4WD SW 60 in the on state and the power supply of the 4WD SW 60 is turned off, results of the condition determinations (1) to (6) of the drive mode determining unit 51a are reset to the initial state. That is, the 4WD SW 60 is off, the accelerator is turned off, the shift is turned off, the clutch is turned off, the vehicle speed is 0 km/h, and there is no slip.

Further, in the case where the driver turns off the key switch once in a state where the 4WD SW 60 is on, and turns on the key switch again, at this time point, the power supply of the 4WD SW 60 is turned on. Consequently, at the time point the driver turns on the key switch, the 4WD SW 60 is also turned on.

The motor target torque calculating unit 51b determines or calculates a motor target torque τmt according to any of the drive modes i to ix on the basis of the input signal, and outputs a signal related to the determined or calculated motor target torque τmt as a motor target torque signal Sτmt. The motor target torque calculating unit 51b takes in the throttle opening signal Sto, wheel speed signal Svw, and drive mode determination signal Sdmj. The wheel speed signal Svw is similar to the wheel speed signal Svw that is input to the drive mode determining unit 51a and includes various wheel speed signals.

As the motor target torque τmt, a predetermined motor target torque or a motor target torque according to the vehicle speed or wheel speed difference is set for each of the drive modes i to ix. The relations between the drive modes i to ix and the motor target torques τmt0 to τmt6 are as follows.

The motor target torque calculating unit 51b determines the on/off state of the accelerator in a manner similar to the drive mode determining unit 51a in accordance with the ratio of the real throttle opening to full throttle. The throttle opening is input via the throttle opening signal St0. The motor target torque calculating unit 51b calculates the vehicle speed and the wheel speed difference in a manner similar to the drive mode determining unit 51a in accordance with the left front wheel speed Vflw input via the left front wheel speed signal Svflw, right front wheel speed Vfrw input via the right front wheel speed signal Svfrw, left rear wheel speed Vrlw input via the left rear wheel speed signal Svrlw, and right rear wheel speed Vrrw input via the right rear wheel speed signal Svrrw.

Drive Mode i: Motor Target Torque τmt0

The motor target torque τmt0 is 0 Nm.

Drive Mode ii: Motor Target Torque τmt1

The motor target torque τmt1 is a predetermined toque and is, for example, 0.5 Nm.

Drive Mode iii: Motor Target Torque τmt2

The motor target torque τmt2 is a predetermined torque, is a torque larger than the motor target torque τmt1 and is, for example, 1.0 Nm.

Drive Mode iv: Motor target Torque τmt3

The motor target torque τmt3 is calculated according to the vehicle speed Vv from a characteristic map indicative of the relation between the vehicle speed Vv and the motor target torque τmt3 when the accelerator is turned on.

The characteristic map shows characteristics such that the motor target torque τmt3 becomes the maximum motor target torque τmt3max (for example, 4.5 Nm) when the vehicle speed lies in a range, for example, from 0 km/h to 5 km/h. In a range where the vehicle speed is larger than 5 km/h and is equal to or less than 20 km/h, the motor target torque τmt3 linearly decreases from the maximum motor target torque τmt3max to the minimum motor target torque τmt3min (for example, 0.5 Nm) as the vehicle speed Vv increases. The characteristic map is preset on the basis of specifications of the vehicle, characteristics of the motor 5, and the like, and is stored in a memory or the like. The other characteristic maps are similarly preset and similarly stored in a memory or the like.

Drive Mode V: Motor Target Torque τmt4

The motor target torque τmt4 is a predetermined torque and is, for example, 0.5 Nm.

Drive Mode vi: Motor Target Torque τmt0

The motor target torque τmt0 is 0 Nm.

Drive Mode vii: Motor Target Torque τmt5

The motor target torque τmt5 is calculated according to the vehicle speed Vv from the characteristic map indicative of the relation between the vehicle speed Vv and the motor target torque τmt5 when the accelerator becomes off, and is a negative torque.

The characteristic map shows a characteristic such that the motor target torque τmt5 increases to the maximum motor target torque τmt5max as the vehicle speed Vv increases from Vw2.

Drive Mode viii: Motor Target Torque τmt6

The motor target torque τmt6 is calculated according to the vehicle speed difference ΔVw from a characteristic map showing the relation between the wheel speed difference ΔVw and the motor target torque τmt6 when the wheel speed difference ΔVw exceeds a predetermined wheel speed difference ΔVw1.

The characteristic map shows a characteristic such that the motor target torque τm6 gradually increases from 0 Nm as the wheel speed difference ΔVw increases from ΔVw1, and becomes the maximum motor target torque τm6max (for example, 10 Nm) at a predetermined wheel speed difference ΔVw2 (for example, 7 km/h).

Drive Mode ix: Motor Target Torque τmt0

The motor target torque τmt0 is 0 Nm.

The motor target torque calculating unit 51b outputs the motor target torque τm according to the drive mode, as the motor target torque signal Sτm, to each of the motor target field current calculating unit 51c, alternator target field current calculating unit 51d, inverter control unit 51e, and DC/DC converter control unit 51f.

The motor target field current calculating unit 51c calculates a motor target field current Imft for controlling the current flowing in the field winding of the motor 5, on the basis of input-signals described later. A signal related to the calculated motor target field current Imft is output as the motor target field current control instruction signal Simft*. The input signals to be input to the motor target field current calculating unit 51c are a motor target torque signal Sτmt, motor rotational speed signal Snm, and motor field current signal Simf. In the motor target field current calculating unit 51c, the motor target field current Imft is calculated according to the motor rotational speed Nm input via the motor rotational speed signal Snm and the motor target torque τmt input via the motor target torque signal Sτmt, on the basis of the characteristic map showing the relation among the motor rotational speed Nm, motor target field current Imft, and motor target torque τmt. Further, in the motor target field current calculating unit 51c, the difference between the calculated motor target field current Imft and the motor field current Imf input via the motor field current signal SImf is calculated, and a signal related to the motor target field current Imft is output as the motor target field current instruction signal Simft*. The motor target field current instruction signal Simft* is input to the motor field current control unit 53.

Although the case of inputting the motor rotational speed signal Snm to the motor target field current calculating unit 51c has been described in the embodiment, alternately, the rotational speed of the motor may be calculated from wheel speed signals of both of the rear wheels, and the calculated rotational speed may be input to the calculating unit 51c.

The alternator target field current calculating unit 51d calculates an alternator target field current Iaft for controlling the current flowing in the field winding of the alternator 13, on the basis of the input signals described later. A signal related to the calculated alternator target field current Iaft is output as an alternator target field current control instruction signal Siaft*. The input signals to be input to the alternator target field current calculating unit 51d are the motor target torque signal Sτmt, motor target field current signal Simft, and alternator output current signal Siao. In the alternator target field current calculating unit 51d, the alternator target output current Iaot is calculated according to the motor target torque τmt input via the motor target torque signal Sτmt and the motor target field current Imft input via the motor target field current signal Simft, on the basis of the characteristic map showing the relation among the motor target torque τmt, motor target field current Imft, and alternator target output current Iaot. Further, in the alternator target field current calculating unit 51d, the difference between the calculated alternator target output current Iaot and the alternator output current Iao input via the alternator output current signal Siao is calculated. Further, in the alternator target field current calculating unit 51d, an alternator target field current Iaft according to the alternator target output current Iaot obtained by the difference is calculated, on the basis of the characteristic map showing the relation among the alternator target field current Iaft and the alternator target output current Iaot. And a signal related to the calculated alternator target field current Iaft is output as the alternator target field current control instruction signal Siaft*. The alternator target field current control instruction signal Siaft* is input to a voltage controller 13a of the alternator 13.

The inverter control unit 51e outputs the inverter drive PWM control instruction signal Sipwm* for controlling power supplied from the inverter 9 to an armature winding in the motor 5 on the basis of the following input signal. The input signals to be input to the inverter control unit 51e are the motor target torque signal Sτmt, motor rotor magnetic pole position signal Sθm, and motor input current signal Sima. In the inverter control unit 51e, a d-axis current instruction value Id* and a q-axis current instruction value Iq* according to the motor target torque τmt input via the motor target torque signal Sτmt are calculated, on the basis of a characteristic map showing the relation between the motor target torque mt and the d-axis current instruction value Id*, and a characteristic map showing the relation between the motor target torque mt and the q-axis current instruction value Iq*. Further, in the inverter control unit 51e, a d-axis current Id and a q-axis current Iq are obtained by two-phase converting the motor input current Ima input via the motor input current signal Sima, on the basis of the motor rotor magnetic pole position θm input via the motor rotor magnetic pole position signal Sθm. Further, in the inverter control unit 51e, the difference between the d-axis current Id and the d-axis current instruction value Id*, and the difference between the q-axis current Iq and the q-axis current instruction value Iq*, are calculated. And, a d-axis voltage instruction value Vd* and a q-axis voltage instruction value Vq* are calculated on the basis of the those calculated differences. Further, in the inverter control unit 51e, three-phase AC voltage instruction values Vu*, Vv*, and Vw* are obtained by three-phase converting the d-axis voltage instruction value Vd* and the q-axis voltage instruction value Vq*, on the basis of the motor rotor magnetic pole position θm input via the motor rotor magnetic pole position signal Sθm. The inverter control unit 51e outputs the inverter-drive PWM control instruction signal Sipwm* on the basis of three-phase AC voltage instruction values Vu*, Vv*, and Vw*. The inverter-drive PWM control instruction signal Sipwm* is input to the inverter 9.

The DC/DC converter control unit 51f outputs the DC/DC converter-drive PWM control instruction signal Sdpwm* on the basis of an input signal described later. The signal Sdpwm* is used for stepping down the power supplied from the alternator 13 or inverter 9 to the battery 17 by the DC/DC converter 16. As necessary, the DC/DC converter control unit 51f outputs the DC/DC converter-PWM control instruction signal Sdpwm*. The signal Sdpwm* is used for stepping-up the power supplied from the battery 17 to the inverter 9 by the DC/DC converter 16 on the basis of an input signal described later. The motor target torque signal Sτm as the input signal is input to the DC/DC converter control unit 51f. In the DC/DC converter control unit 51f, an output voltage instruction value Vo* is calculated according to the motor target torque τmt input via the motor target torque signal Sτmt, on the basis of a characteristic map showing the relation between the motor target torque τmt and the output voltage instruction value Vo*. The control unit 51f outputs the DC/DC converter-drive PWM control instruction signal Sdpwm* on the basis of the output voltage instruction value Vo*. The DC/DC converter-drive PWM control instruction signal Sdpwm* is input to the DC/DC converter 16.

The operations of the components of the electric drive system for a vehicle of the embodiment will now be described in detail with reference to FIG. 17. The operations of the components of the electric drive system for a vehicle will be described with lapse of time hereinbelow.

(1) Time t1

The key switch is turned on. Thereby, an air-flow rate and a fuel amount to be supplied to the engine 3, start-operation of the engine 3 by the startor, ignition by each ignition plug, and the like are controlled, on the basis of various control instruction signals output from the ECU 90. At this time point, the drive mode of the vehicle is the 2WD mode.

(2) Time t2

The 4WD SW60 is turned on. At this time point, the drive mode of the vehicle switches from the 2WD mode to the 4WD mode.

In the embodiment, each of the determined drive mode, the connection mode of the relay 20, the state of the clutch 6, the state of the accelerator, the state of the shift, the operation of the 4WD CU 50, the operation of the motor 5, the operation of the inverter 9, the operation of the alternator 13, and the operation of the DC/DC converter 16 will be described.

Drive mode: drive mode i

Relay 20: connection mode I (electric connection between the inverter 9 and the alternator 13)

Clutch 6: on

Accelerator: off

Shift: off

4WD CU 50;

The 4WD CU 50 controls so that a process of adjusting looseness of the clutch 6 is performed in order of (1) turn-on of the power supply of a control system, (2) engagement of the clutch 6, (3) start of field control of the motor 5, (4)

setting of the relay 20 to the connection mode I, (5) start of field control of the alternator, (6) start of the PWM control of the inverter 9.

The 4WD CU 50 outputs the relay control instruction signal Sr* necessary for setting the relay 20 into the connection mode I, the alternator target field current control instruction signal Siaft* related to the alternator target field current Iaft necessary to output the motor target torque τmt for adjustment of looseness of the clutch, and the inverter-drive PWM control instruction signal Sipmw* necessary to output the motor target torque τmt for adjustment of looseness of the clutch. In this drive mode, driving of the DC/DC converter 16 is unnecessary, so that the 4WD CU 50 does not output the PWM control instruction signal Sdpwm* for driving the DC/DC converter.

The 4WD CU 50 controls the voltage of the power supplied from the battery 17 so that the clutch 6 engages on the basis of the clutch control instruction signal Sc* necessary to bring the clutch 6 into engagement, and supplies the voltage to the exciting coil of the clutch 6. Further, the 4WD CU 50 controls the current of the power supplied from the battery 17 to the motor 5, on the basis of the motor target field current control instruction signal Simft* related to the motor target field current Imft necessary to output the motor target torque τmt for adjusting looseness of the clutch, and supplies the controlled current to the field winding of the motor 5.

Alternator 13;

The alternator 13 controls the field current (current of the power supplied from the battery 17 or current of the power obtained by itself) supplied to the field winding, on the basis of the alternator target field current control instruction signal Siaft*, so as to output alternator output power necessary to output the motor target torque τmt for adjustment of looseness of the clutch.

Inverter 9;

The inverter 9 controls the turn-on/off operations of the switching elements of the three-phase bridge circuit 9a, on the basis of the inverter-drive PWM control instruction signal Sipmw*, so as to output the motor input power necessary to output the motor target torque mt for adjustment of looseness of the clutch.

DC/DC converter 16;

The DC/DC converter 16 does not operate in this drive mode.

Motor 5;

The motor input power controlled by the inverter 9 is supplied to the armature winding of the motor 5. The field current controlled by the 4WD CU 50 is supplied to the field winding of the motor 5. As a result, the motor 5 drives and outputs a motor torque necessary to adjust looseness of the clutch 6. The motor torque is a torque necessary for rotating the mechanism on the motor side of the engaging mechanism of the clutch 6. The motor 5 outputs a motor torque necessary for adjustment of looseness of the clutch 6 for predetermined time.

The motor torque output from the motor 5 is transmitted to the motor-side mechanism of the engaging mechanism of the clutch 6. Thereby, the mechanism on the motor side of the engaging mechanism of the clutch 6 rotates, thereby adjusting engagement with a mechanism on a differential gear side. As the adjustment of looseness of the clutch 6 is performed before starting of the vehicle as described above in the embodiment, a shock caused by looseness of the clutch 6 at the start of the vehicle can be suppressed.

Although the case where the driver turns on the 4WD SW 60 after start of the engine 3 has been described in the embodiment, there is also a case that the driver turns on the 4WD SW 60 before start of the engine 3. In this case, at the time point the driver turns on the key switch to start the engine 3, the 4 WD SW 60 is turned on.

(3) Time t3

The shift is turned on. By the turn-on, the vehicle becomes ready to start.

Drive mode: drive mode ii
Relay 20: connection mode II
Clutch 6: on
Accelerator: off
Shift: on
4WD CU 50;

The 4WD CU 50 outputs the following signals: the relay control instruction signal Sr* necessary for setting continuously the relay 20 into the connection mode I; the alternator target field current control instruction signal Siaft* related to the alternator target field current Iaft necessary to output the motor target torque τmt1; and the inverter-drive PWM control instruction signal Sipmw* necessary to output the motor target torque τmt1. Also in this drive mode, the DC/DC converter-drive PWM control instruction signal Sdpwm* is not output.

The 4WD CU 50 controls the voltage of the power supplied from the battery 17 so that the clutch 6 continuously engages, on the basis of the clutch control instruction signal Sc* necessary to bring the clutch 6 into engagement, and supplies the voltage to the exciting coil of the clutch 6. Further, the 4WD CU 50 controls the current of the power supplied from the battery 17 to the motor 5, on the basis of the motor target field current control instruction signal Simft* related to the motor target field current Imft necessary to output the motor target torque τmt for adjusting looseness of the clutch. The controlled current is supplied to the field winding of the motor 5.

Alternator 13;

The alternator 13 controls the field current supplied to the field winding, on the basis of the alternator target field current control instruction signal Siaft*, so as to output alternator output power necessary to output the motor target torque τmt1.

Inverter 9;

The inverter 9 controls the turn on/off operations of the switching elements of the three-phase bridge circuit 9a, on the basis of the inverter-drive PWM control instruction signal Sipmw*, so as to output the motor input power necessary to output the motor target torque τmt1.

DC/DC converter 16;

The DC/DC converter 16 does not operate in this drive mode.

motor 5;

The motor input power controlled by the inverter 9 is supplied to the armature winding of the motor 5. The field current controlled by the 4WD CU 50 is supplied to the field winding of the motor 5. As a result, the motor 5 drives and outputs the motor torque τm1. The motor torque τm1 is a torque which is insufficient to rotate the rear wheels 2. The motor outputs the predetermined motor torque τm1 at the time point when the shift is turned on, and continuously outputs the motor torque τm1 until time t4 at which the brake pedal-depressing of the brake is released.

The motor torque τm1 output from the motor 5 is transmitted to the rear wheels 2 via the clutch 6 and the differential gear 7. At this time, the motor 5 does not actually rotate but is stationary in a state where a driving force is generated. As described above, in the embodiment, the predetermined motor torque τm1 is output from the motor 5 to the rear wheels 2 in the 4WD start standby mode, so that starting of the vehicle can be immediately responded. For example, backward movement of the vehicle on a hill or the like can be suppressed.

(4) Time t4

The brake is released. The vehicle starts on a flat dry (high μ) road by a creep torque of the engine 3 and a creep torque of the motor 5.
Drive mode: drive mode iii
Relay 20: connection mode I
Clutch 6: on
Accelerator: off
Shift: on
4WD CU 50;

The 4WD CU 50 outputs the following signals: the relay control instruction signal Sr* necessary to continuously set the relay 20 into the connection mode I; the alternator target field current control instruction signal Siaft* related to the alternator target field current Iaft necessary to output a motor target torque τmt2; and the inverter-drive PWM control instruction signal Sipmw* necessary to output the motor target torque τmt2. In the drive mode, the DC/DC converter-drive PWM control instruction signal Sdpwm* is not output.

The 4WD CU 50 controls the voltage of the power supplied from the battery 17 so that the clutch 6 continuously engages, on the basis of the clutch control instruction signal Sc* necessary to bring the clutch 6 into engagement. The controlled voltage is supplied to the exciting coil of the clutch 6. Further, the 4WD CU 50 controls the current of the power supplied from the battery 17 to the motor 5, on the basis of the motor target field current control instruction signal Simft* related to the motor target field current Imft necessary to output the motor target torque τmt2 for adjusting looseness of the clutch. The controlled current is supplied to the field winding of the motor 5.
Alternator 13;

The alternator 13 controls the field current supplied to the field winding, on the basis of the alternator target field current control instruction signal Siaft*, so as to output alternator output power necessary to output the motor target torque τmt2.
Inverter 9;

The inverter 9 controls the on/off operation of the switching elements of the three-phase bridge circuit 9a, on the basis of the inverter-drive PWM control instruction signal Sipmw*, so as to output the motor input power necessary to output the motor target torque τmt2.
DC/DC converter 16;

The DC/DC converter 16 does not operate in the drive mode.
Motor 5;

The motor input power controlled by the inverter 9 is supplied to the armature winding of the motor 5. The field current controlled by the 4WD CU 50 is supplied to the field winding of the motor 5. As a result, the motor 5 drives and outputs the motor torque τm2. The motor torque τm2 is a predetermined torque which assists creep torque of the engine 3. The motor 5 outputs the predetermined motor torque τm2 at the time point when the brake pedal-depressing is released, and continuously outputs the motor torque τm2 until time t5 at which the accelerator is pressed down on.

The motor torque τm2 from the motor 5 is transmitted to the rear wheels 2 via the clutch 6 and the differential gear 7 to rotate the rear wheels 2. As described above, in the embodiment, the creep torque of the engine 3 is assisted, so that the load on the engine 3 can be reduced, and the invention make possible to improve the fuel consumption of the engine 3.

(5) Time t5;

The accelerator is pressed down on. The vehicle is accelerated on a flat dry (high μ) road by the torque of the engine 3 and the torque of the motor 5.
Drive mode: drive mode iv
Relay 20: connection mode I
Clutch 6: on
Accelerator: on
Shift: on
4WD CU 50;

The 4WD CU 50 outputs the following signals: the relay control instruction signal Sr* necessary to continuously set the relay 20 into the connection mode I; the alternator target field current control instruction signal Siaft* related to the alternator target field current Iaft necessary to output a motor target torque τmt3; and the inverter-drive PWM control instruction signal Sipmw* necessary to output the motor target torque τmt3. In the drive mode, the DC/DC converter-drive PWM control instruction signal Sdpwm* is not output.

The 4WD CU 50 controls the voltage of the power supplied from the battery 17 so that the clutch 6 continuously engages, on the basis of the clutch control instruction signal Sc* necessary to bring the clutch 6 into engagement. The controlled voltage is supplied to the exciting coil of the clutch 6. Further, the 4WD CU 50 controls the current of the power supplied from the battery 17 to the motor 5, on the basis of the motor target field current control instruction signal Simft* related to the motor target field current Imft necessary to output the motor target torque τmt3 for adjusting looseness of the clutch. The controlled current is supplied to the field winding of the motor 5.
Alternator 13;

The alternator 13 controls the field current supplied to the field winding, on the basis of the alternator target field current control instruction signal Siaft*, so as to output alternator output power necessary to output the motor target torque τmt3.
Inverter 9;

The inverter 9 controls the on/off operation of the switching elements of the three-phase bridge circuit 9a, on the basis of the inverter-drive PWM control instruction signal Sipmw*, so as to output the motor input power necessary to output the motor target torque τmt3.
DC/DC converter 16;

The DC/DC converter 16 does not operate in the drive mode.
Motor 5;

The motor input power controlled by the inverter 9 is supplied to the armature winding of the motor 5. The field current controlled by the 4WD CU 50 is supplied to the field winding of the motor 5. As a result, the motor 5 drives and outputs the motor torque τm3. The motor torque τm3 changes, according to the vehicle speed Vv, so as to become large when the vehicle speed Vv is low and to decrease as the vehicle speed Vv increases. The motor 5 outputs the motor torque τm3 at the time point when the accelerator is pressed down on, and continuously outputs the motor torque τm3 according to the vehicle speed Vv until time t5 at which the vehicle speed Vv becomes equal to or higher than a predetermined wheel speed Vw1.

The motor torque τm3 from the motor 5 is transmitted to the rear wheels 2 via the clutch 6 and the differential gear 7 to rotate the rear wheels 2. As described above, in the embodiment, the torque of the engine 3 is assisted, so that the load on the engine 3 can be reduced, and the invention can make possible to improve the fuel consumption of the engine 3. In the embodiment, acceleration performance at the time of accelerated driving of the vehicle can be improved by assistance of the motor 5.

In the embodiment, the motor input power supplied to the motor 5 via the inverter 9 is controlled by the field control of the alternator 13. However, there is a case that a torque larger than the torque of the motor 5 obtained by the field control of the alternator 13 is necessary. In particular, a heavy weight vehicle and a vehicle whose exhaust amount is large require a torque larger than that for a light weight vehicle and a vehicle whose exhaust amount is small. In such a case, in the embodiment the DC/DC converter 16 is operated to increase the power supplied from the battery 17. The increased power can be supplied together with the output power of the alternator 13 to the inverter 9. In this case, the inverter 9, alternator 13, and DC/DC converter 16 are electrically connected via the relay 20; the on/off operation of the switching element of the voltage step-up circuit 16*a* is controlled, on the basis of the DC/DC converter-drive PWM control instruction signal Sdpwm*, so as to output a DC/DC converter output power necessary to output the motor target torque τmt3. By the operation, both of the output power of the alternator 13 and the output power from the battery 17 stepped up by the DC/DC converter can be supplied to the inverter 9. Therefore, the motor input power supplied to the motor 5 increases, and the motor torque output from the motor 5 increases. The operation of the DC/DC converter 16 in this case is as shown by dotted lines.

(6) Time t6;

The vehicle speed Vv becomes Vw1 or higher. The vehicle is accelerated on a flat dry (high μ) road by the torque of the engine 3.

Drive mode: drive mode v
Relay 20: connection mode I
Clutch 6: on
Accelerator: on
Shift: on
4WD CU 50;

The 4WD CU 50 outputs the following signals: the relay control instruction signal Sr* necessary to continuously set the relay 20 into the connection mode I; the alternator target field current control instruction signal Siaft* related to the alternator target field current Iaft necessary to output a motor target torque τmt4; and the inverter-drive PWM control instruction signal Sipmw* necessary to output the motor target torque τmt4. In the drive mode, the DC/DC converter-drive PWM control instruction signal Sdpwm* is not output.

The 4WD CU 50 controls the voltage of the power supplied from the battery 17 so that the clutch 6 continuously engages, on the basis of the clutch control instruction signal Sc* necessary to bring the clutch 6 into engagement. The controlled voltage is supplied to the exciting coil of the clutch 6. Further, the 4WD CU 50 controls the current of the power supplied from the battery 17 to the motor 5, on the basis of the motor target field current control instruction signal Simft* related to the motor target field current Imft necessary to output the motor target torque τmt4 for adjusting looseness of the clutch. The controlled current is supplied to the field winding of the motor 5.

Alternator 13;

The alternator 13 controls the field current supplied to the field winding, on the basis of the alternator target field current control instruction signal Siaft*, so as to output alternator output power necessary to output the motor target torque τmt4.

Inverter 9;

The inverter 9 controls the on/off operation of the switching elements of the three-phase bridge circuit 9*a*, on the basis of the inverter-drive PWM control instruction signal Sipmw*, so as to output the motor input power necessary to output the motor target torque τmt4.

DC/DC converter 16;

The DC/DC converter 16 does not operate in the drive mode.

motor 5;

The motor input power controlled by the inverter 9 is supplied to the armature winding of the motor 5. The field current controlled by the 4WD CU 50 is supplied to the field winding of the motor 5. As a result, the motor 5 drives and outputs the motor torque τm4. The motor torque τm4 is a predetermined torque for assisting the torque of the engine 3. The motor 5 outputs the motor torque τm4 at the time point the vehicle speed Vv becomes equal to or higher than the predetermined wheel speed Vw1, continuously outputs the motor torque τm4 for predetermined time (until the time t7) and, after that, stops outputting the motor torque τm4.

The motor torque τm4 from the motor 5 is transmitted to the rear wheels 2 via the clutch 6 and the differential gear 7 to rotate the rear wheels 2. As described above, in the embodiment, the motor torque from the motor 5 is held at the predetermined motor torque for predetermined time when the torque assist stops and, after that, the motor torque from the motor 5 is set to 0 Nm. Consequently, drop of the torque caused by stopping the motor torque-output of the motor 5, at the time of the accelerated driving of the vehicle, can be suppressed.

(7) Time t7;

After the 4WD control stop mode continues for a predetermined time and, the clutch 6 is disengaged. The vehicle is accelerated on a flat dry (high μ) road by the torque of the engine 3.

Drive mode: drive mode vi
Relay 20: connection mode II (electric connection between the alternator 13 and the DC/DC converter 16)
Clutch 6: off
Accelerator: on
Shift: on
4WD CU 50;

The 4WD CU 50 outputs the following signals: the relay control instruction signal Sr* necessary to continuously set the relay 20 into the connection mode II; the alternator target field current control instruction signal Siaft* related to the alternator target field current Iaft necessary to output a predetermined alternator output power, and the DC/DC converter-drive PWM control instruction signal Sdpmw* necessary to step down the alternator output power. The 4WD CU 50 stops supply of the power from the battery 17 to the exciting coil of the clutch 6 so that the clutch 6 disengages, on the basis of the clutch control instruction signal Sc* necessary to bring the clutch 6 into disengagement. Since driving of the motor 5 is unnecessary in the drive mode, the 4WD CU 50 does not output the motor target field current control instruction signal Simft* and the inverter-drive PWM control instruction signal Sipmw*.

Alternator 13;

The alternator 13 controls the field current supplied to the field winding, on the basis of the alternator target field current control instruction signal Siaft*, so as to output a predetermined alternator output power, for example, power of 42V.

Inverter 9;

The inverter 9 does not operate in the drive mode.

DC/DC converter 16;

The DC/DC converter 16 controls the on/off operation of the switching element of the voltage step-down circuit 16b, on the basis of the DC/DC converter-drive PWM control instruction signal Sdpwm*, so as to step down the alternator output power to a predetermined power, for example, power of 14V (charging voltage of the battery 17).

Motor 5;

The motor 5 does not operate in the drive mode.

(8) Time t8;

The accelerator is released, the brake is depressed, and the clutch 6 is brought into engagement. The vehicle is decelerated on a flat dry (high μ) road.

drive mode: drive mode vii
relay 20: connection mode III (electric connection between the inverter 9 and the DC/DC converter 16)
clutch 6: on
accelerator: off
shift: on

4WD CU 50;

The 4WD CU 50 outputs the following signals: the relay control instruction signal Sr* necessary for setting continuously the relay 20 into the connection mode III, the inverter-drive PWM control instruction signal Sipwm* necessary to control the generated power from the motor 5, and the DC/DC converter-drive PWM control instruction signal Sdpwm* necessary to step down the inverter output power. In the drive mode, driving of the alternator 13 is unnecessary, so that the 4WD CU 50 does not output the alternator target field current control instruction signal Siaft*.

The 4WD CU 50 controls the voltage of the power supplied from the battery 17 so that the clutch 6 engages, on the basis of the clutch control instruction signal Sc* necessary to bring the clutch 6 into engagement, and supplies the voltage to the exciting coil of the clutch 6. Further, the 4WD CU 50 controls the current of the power supplied from the battery 17 to the motor 5, on the basis of the motor target field current control instruction signal Simft* related to the motor target field current Imft necessary to operate the motor 5 as a generator. The controlled current is supplied to the field winding of the motor 5.

Alternator 13;

The alternator 13 does not operate in the drive mode.

inverter 9;

The inverter 9 controls the on/off operation of the switching elements of the three-phase bridge circuit 9a, on the basis of the inverter-drive PWM control instruction signal Sipmw*, to control the generation power of the motor 5.

DC/DC converter 16;

The DC/DC converter 16 controls the on/off operation of the switching element of the voltage step-down circuit 16b, on the basis of the DC/DC converter-drive PWM control instruction signal Sdpwm*, so as to step down the inverter output power to power with a predetermined voltage, for example, the power of 14V as the charging voltage of the battery 17.

Motor 5;

The rotation driving force of the rear wheel 2 is transmitted to the motor 5 via the differential gear 7 and the clutch 6. The field current controlled by the 4WD CU 50 is supplied to the field winding of the motor 5. Consequently, the motor 5 operates as a generator and generated power is obtained from the armature winding. The motor 5 operates as a generator at the time point the accelerator is released, and stops generating operation when the vehicle speed Vv becomes equal to or lower than the wheel speed Vw2.

The generated power obtained from the motor 5 is converted to DC power by the inverter 9. The converted inverter-output power is stepped down to power with a predetermined voltage, for example, the power voltage of 14 v as the charging voltage of the battery 17, by the DC/DC converter 16. The resultant voltage is supplied to the battery 17. As described above, in the embodiment, the regenerative energy of the vehicle is collected, so that the energy efficiency of the vehicle can be improved.

(9) Time t9;

The vehicle speed Vv becomes 0 km/h and the vehicle stops. The drive mode becomes the 4WD start standby mode and the vehicle maintains to be ready to start. Since the operation is similar to that in (3) time t3, detailed description will be omitted.

(10) Time t10;

The brake is released. The drive mode becomes the 4WD creep mode and the vehicle starts on a flat low-μ road with the creep torque of the engine 3 and the creep torque of the motor 5. Since the operation is similar to that in (4) time t4, detailed description will be omitted.

(11) Time t11;

The accelerator is pressed down on. The drive mode becomes the 4WD normal drive control mode, and the vehicle is accelerated on a low-μ road of a hill with the torque of the engine 3 and the torque of the motor 5. Since the operation is similar to that in (5) time t5, detailed description will be omitted.

(12) Time t12;

During the accelerated drive on the low-μ road of a hill, a wheel speed difference between the front and rear wheels, that is, slip occurs. The case where the front wheels 1 slip will be described as an example.

Drive mode: drive mode viii
Relay 20: connection mode I
Clutch 6: on
Accelerator: on
Shift: on

4WD CU 50;

The 4WD CU 50 outputs the following signals: the relay control instruction signal Sr* necessary for setting continuously the relay 20 into the connection mode I; the alternator target field current control instruction signal Siaft* related to the alternator target field current Iaft necessary to output the motor target torque τmt6; and the inverter-drive PWM control instruction signal Sipwm* necessary to output the motor target torque τmt6. Also In the drive mode, the DC/DC converter-drive PWM control instruction signal Sdpwm* is not output.

The 4WD CU 50 controls the voltage of the power supplied from the battery 17 so that the clutch 6 continuously engages, on the basis of the clutch control instruction signal Sc* necessary to bring the clutch 6 into engagement, and supplies the voltage to the exciting coil of the clutch 6. Further, the 4WD CU 50 controls the current of the power supplied from the battery 17 to the motor 5, on the basis of the motor target field current control instruction signal Simft* related to the motor target field current Imft necessary to output the motor target torque τmt6 for adjusting looseness of the clutch. The controlled current is supplied to the field winding of the motor 5.

Alternator 13;

The alternator 13 controls field current to be supplied to the field winding, on the basis of the alternator target field current control instruction signal Siaft*, so as to output alternator output power necessary to output the motor target torque τmt6.

Inverter 9;

The inverter 9 controls the on/off operation of the switching elements of the three-phase bridge circuit 9a, on the basis of the inverter-drive PWM control instruction signal Sipmw*, so as to output the motor input power necessary to output the motor target torque τmt6.

DC/DC converter 16;

The DC/DC converter 16 does not operate in the drive mode.

Motor 5;

The motor input power controlled by the inverter 9 is supplied to the armature winding of the motor 5. The field current controlled by the 4WD CU 50 is supplied to the field winding of the motor 5. Consequently, the motor 5 drives and outputs the motor torque τm6. The motor torque τm6 changes according to the wheel speed difference ΔVw. That is, the motor torque τm6 gradually increases from 0 Nm as the wheel speed difference ΔVw increases from the predetermined wheel speed difference ΔVw1. The maximum motor torque τm6max is output at the predetermined wheel speed difference ΔVw2. The maximum motor torque τm6max is set to be larger than the maximum motor torque τm3max of the 4WD normal travel control mode. The motor outputs the motor torque τm6 at the time point when the wheel speed difference ΔVw exceeds the wheel speed difference ΔVw1. The motor outputs the motor torque τm6 according to the wheel speed difference ΔVw until the wheel speed difference ΔVw becomes equal to or less than the wheel speed difference ΔVw1.

The motor torque τm6 from the motor 5 is transmitted to the rear wheels 2 via the clutch 6 and the differential gear 7 to rotate the rear wheels 2. As described above, in the embodiment, when slip occurs, the motor torque larger than that in the normal drive mode is output to make the slip converge.

Thus, the drive performance particularly on a low-μ road can be improved.

In the embodiment, in a manner similar to the above-described (5) time t5, the DC/DC converter 16 is operated, and the power supplied from the battery 17 is stepped up. By supplying both of the resultant power and the output power of the alternator 13 to the inverter 9, a larger motor torque can be output and the drive performance of the vehicle can be further improved. The operation of the DC/DC converter 16 is also shown by dotted line.

(13) Time t13;

The slip is converged and the drive mode becomes again the 4WD normal drive control mode. Since the operation here is similar to that of the above-described (5) time t5, the detailed description will be omitted.

(14) Time t14;

The vehicle speed Vv becomes Vw1 or higher. The drive mode becomes the 4WD stop control mode, and the vehicle is accelerated on the low-μ road in a hill by the torque of the engine 3. Since the operation is similar to that of (6) time t6, the detailed description will be omitted.

(15) Time t15;

After the 4WD control stop mode continues for predetermined time, the clutch 6 is turned off, and the drive mode becomes the 4WD drive stand-by mode. The vehicle climbed up the low-μ road in the hill, and is accelerated on a flat dry (high-μ) road by the torque of the engine 3. Since the operation is similar to that of (7) time t7, the detailed description will be omitted.

(16) Time t16;

The accelerator is released, the brake is depressed, and the clutch 6 is brought into engagement. The drive mode becomes the 4WD regenerative mode, and the vehicle is decelerated on a flat dry (high-μ) road. Since the operation is similar to that of (8) time t8, the detailed description will be omitted.

(17) Time t17;

The vehicle speed becomes 0 km/h and the vehicle stops. The drive mode becomes the 4WD start standby mode, and the vehicle maintains to be ready to start. Since the operation is similar to that of (3) time t3, the detailed description will be omotted.

(18) Time t18;

The shift is turned off, the drive mode becomes the 4WD preparation mode, and the clutch 6 is brought into engagement.

(19) Time t19;

The 4WD SW 60 is turned off. The drive mode becomes the 4WD stop mode, the clutch 6 is disengaged, and a 4WD control system power supply is turned off. At this time point, the drive mode of the vehicle changes from the 2WD mode to the 4WD mode.

(20) Time t20;

The key switch is turned off, thereby stopping the engine 3.

Second Embodiment

A second embodiment of the invention will be described with reference to FIGS. 18 to 21.

Figure 18:
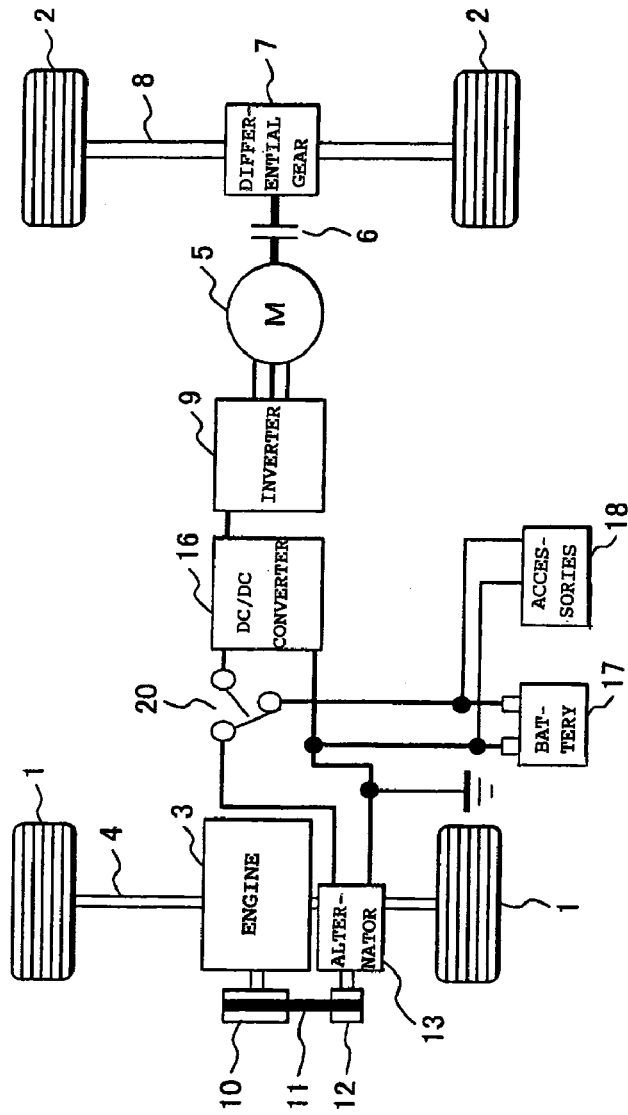
FIG. 18 is a configuration diagram showing the configuration of a hybrid engine-motor type vehicle drive system to which the electric drive system for a vehicle according to a second embodiment of the invention is applied.
Figure 19:
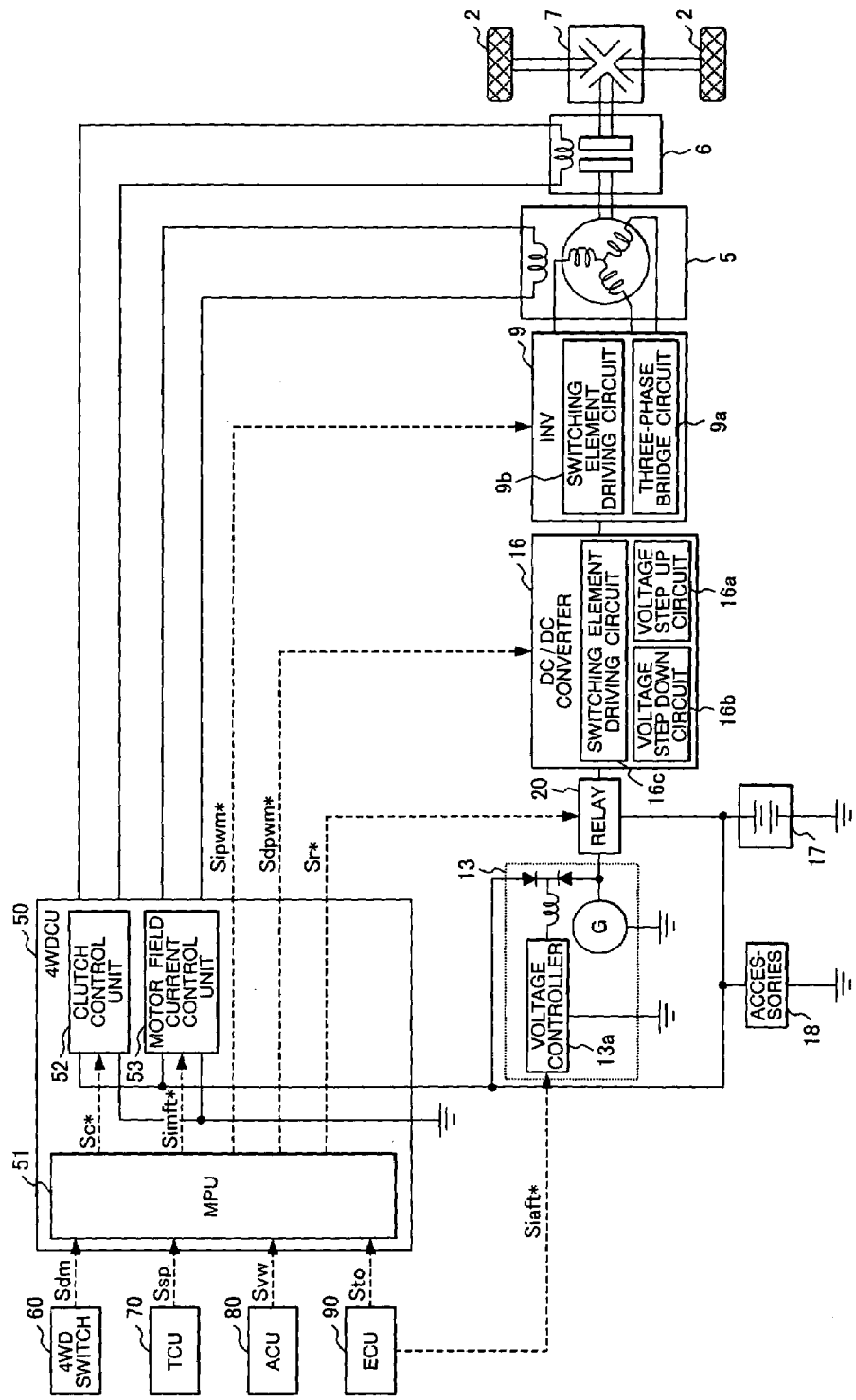
FIG. 19 is a diagram showing the configuration of an electric drive system for vehicle of the embodiment including a 4WD control unit.
Figure 20:
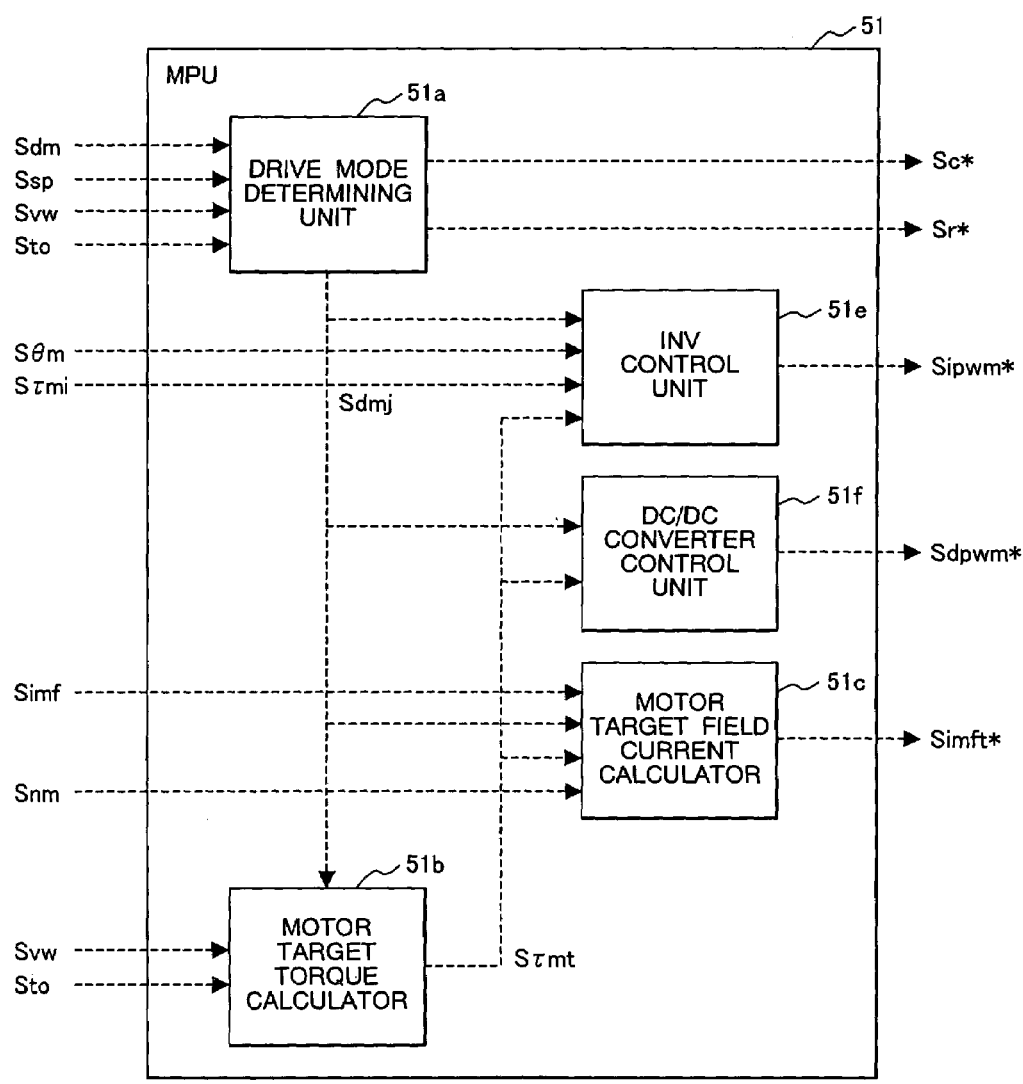
FIG. 20 is a block diagram showing a functional configuration of a microprocessor unit as a component of the 4WD control unit.
Figure 21:
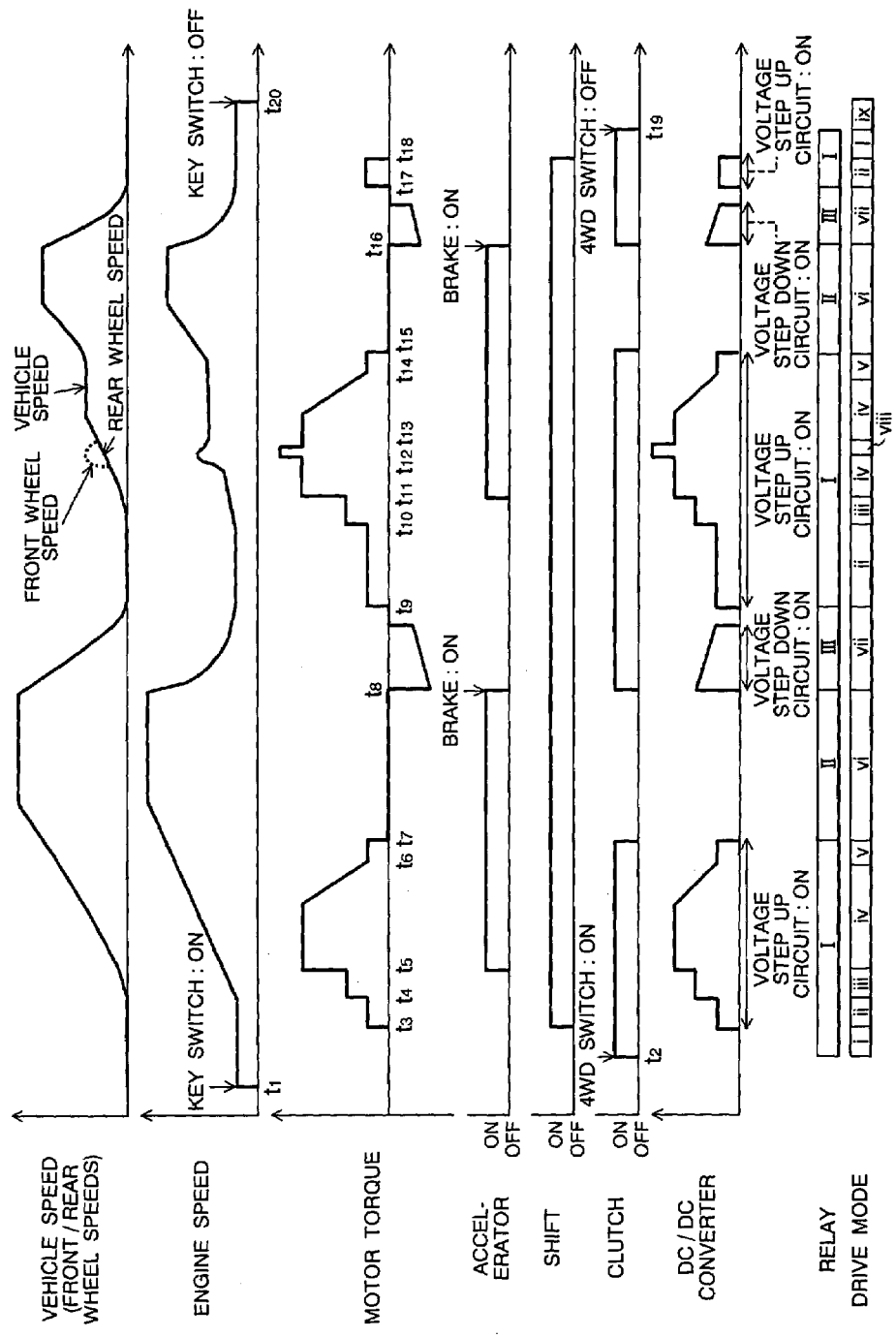
FIG. 21 is a time chart showing operation timings in a vehicle operation state of components of the electric drive system for a vehicle of the embodiment.

FIG. 18 shows a hybrid engine-motor type vehicle drive system to which the vehicle electric drive system according to the second embodiment of the invention is applied. FIG. 19 shows the system configuration of the vehicle electric drive system of the second embodiment including a 4WD control unit. FIG. 20 shows a functional configuration of a microprocessor unit as a component of the 4WD control unit. FIG. 21 shows operation timings in a vehicle operating state of components of the vehicle electric drive system of the second embodiment.

In the second embodiment, the DC/DC converter 16 is disposed in a position different from that in the first embodiment, that is, between the inverter 9 and the relay 20. In the second embodiment, as the alternator 13, a conventional alternator for charging accessories is used. The alternator 13 is controlled by the ECU 90 and outputs the power of 14 v as the charging voltage of the battery 17. Therefore, in the second embodiment, the power of 14 v output from the alternator 13 or the power of discharge voltage 12 v discharged from the battery 17 is stepped up by the DC/DC converter 16 and the resultant is supplied to the inverter 9. In the embodiment, the power from the inverter 9 is stepped down by the DC/DC converter 16 and the resultant is supplied to the battery 17. Further, in the embodiment, the alternator 13 is controlled by the ECU 90, so that the MPU 51 does not have the alternator target field current calculating unit. Since the other configuration and its function and operation are substantially the same as those of the foregoing embodiment, the detailed description will be omitted.

The operations of the components of the vehicle electric drive system of the second embodiment will now be described in detail with reference to FIG. 21. The operations of the components will be described hereinbelow with lapse of time.

(1) Time t1

The key switch is turned on. By the turn-on, on the basis of a control instruction signal output from the ECU 90, an air amount and a fuel amount supplied to the engine 3, starting drive of the engine 3 with the starter, ignition with an ignition plug, and the like are controlled, thereby starting the engine 3. At this time point, the drive mode of the vehicle is the 2WD mode.

(2) Time t2

The 4WD SW 60 is turned on. At this time point, the drive mode of the vehicle switches from the 2WD mode to the 4WD mode.

In the embodiment, each of the determined drive mode, the connection mode of the relay 20, the state of the clutch 6, the state of the accelerator, the state of the shift, the operation of the 4WD CU 50, the operation of the motor 5, the operation of the inverter 9, and the operation of the DC/DC converter 16 will be described.

Drive mode: drive mode i

Relay 20: connection mode I (electric connection between the alternator 13 and the DC/DC converter 16)

Clutch 6: on

Accelerator: off

Shift: off

4WD CU 50;

The 4WD CU 50 controls so that a process of adjusting looseness of the clutch 6 is performed in order of (1) turn-on of the power of a control system, (2) engagement of the clutch 6, (3) start of field control of the motor 5, (4) setting of the relay 20 to the connection mode I, (5) start of the PWM control of the alternator by the DC/DC converter 16, and (6) start of the PWM control of the inverter 9.

The 4WD CU 50 outputs the following signals: the relay control instruction signal Sr* necessary for setting the relay 20 into the connection mode I, the PWM DC/DC converter-drive control instruction signal Sdpwm* necessary to output the motor target torque τmt for adjustment of looseness of the clutch, and the inverter-drive PWM control instruction signal Sipmw* necessary to output the motor target torque τmt for adjustment of looseness of the clutch.

The 4WD CU 50 controls the voltage of the power supplied from the battery 17 so that the clutch 6 engages, on the basis of the clutch control instruction signal Sc* necessary to bring the clutch 6 into engagement, and supplies the voltage to the exciting coil of the clutch 6. Further, the 4WD CU 50 controls the current of the power supplied from the battery 17 to the motor 5, on the basis of the motor target field current control instruction signal Simft* related to the motor target field current Imft necessary to output the motor target torque τmt for adjusting looseness of the clutch 6. The controlled current is supplied to the field winding of the motor 5.

DC/DC converter 16;

The DC/DC converter 16 controls the on/off operation of the switching element of the voltage step-up circuit 16a, on the basis of the DC/DC converter-drive PWM control instruction signal Sdpwm* so as to output an inverter input power necessary to output the motor target torque τmt for adjusting looseness of the clutch.

Inverter 9;

The inverter 9 controls the on/off operation of the switching elements of the three-phase bridge circuit 9a, on the basis of the PWM control instruction signal Sipmw* for driving the inverter, so as to output the motor input power necessary to output the motor target torque τmt for adjustment of looseness of the clutch.

Motor 5;

The motor input power controlled by the inverter 9 is supplied to the armature winding of the motor 5. The field current controlled by the 4WD CU 50 is supplied to the field winding of the motor 5. As a result, the motor 5 drives and outputs a motor torque necessary to adjust looseness of the clutch 6. The motor torque is a torque necessary for rotating the mechanism on the motor side of the engaging mechanism of the clutch 6. The motor 5 outputs a motor torque necessary for adjustment of looseness of the clutch 6 for predetermined time.

The motor torque from the motor 5 is transmitted to the motor-side mechanism of the engaging mechanism of the clutch 6. By the motor torque, the mechanism on the motor side of the engaging mechanism of the clutch 6 rotates, thereby adjusting engagement with a mechanism on a differential gear side. As described above, in the second embodiment, the adjustment of looseness of the clutch 6 is performed before starting of the vehicle, so that a shock caused by looseness of the clutch 6 at the start of the vehicle can be suppressed.

Although the case where the driver turns on the 4WD SW 60 after start of the engine 3 has been described in the embodiment, there is also a case that the driver turns on the 4WD SW 60 before start of the engine 3. In this case, at the time point the driver turns on the key switch to start the engine 3, the 4 WD SW 60 is turned on.

(3) Time t3

The shift is turned on. By the turn-on, the vehicle becomes ready to start.

Drive mode: drive mode ii

Relay 20: connection mode I

Clutch 6: on

Accelerator: off

Shift: on

4WD CU 50;

The 4WD CU 50 outputs the following signals: the relay control instruction signal Sr* necessary for setting continuously the relay 20 into the connection mode I; the DC/DC converter-drive PWM control instruction signal Sdpwm* necessary to output the motor target torque τmt1, and the inverter-drive PWM control instruction signal Sipmw* necessary to output the motor target torque τmt1.

The 4WD CU 50 controls the voltage of the power supplied from the battery 17 so that the clutch 6 continuously engages, on the basis of the clutch control instruction signal Sc* necessary to bring the clutch 6 into engagement, and supplies the voltage to the exciting coil of the clutch 6. Further, the 4WD CU 50 controls the current of the power supplied from the battery 17 to the motor 5, on the basis of the motor target field current control instruction signal Simft* related to the motor target field current Imf t necessary to output the motor target torque τmt1 for adjusting looseness of the clutch. The controlled current is supplied to the field winding of the motor 5.

DC/DC converter 16;

The DC/DC converter 16 controls the on/off operation of the switching elements of the voltage step-up circuit 16*a*, on the basis of the DC/DC converter-drive PWM control instruction signal Sdpwm*, so as to output inverter input power necessary to output the motor target torque τmt1.

Inverter 9;

The inverter 9 controls the on/off operation of the switching elements of the three-phase bridge circuit 9*a*, on the inverter-drive on the basis of the PWM control instruction signal Sipmw*, so as to output the motor input power necessary to output the motor target torque τmt1.

Motor 5;

The motor input power controlled by the inverter 9 is supplied to the armature winding of the motor 5. The field currents controlled by the 4WD CU 50 are supplied to the field winding of the motor 5. As a result, the motor 5 drives and outputs the motor torque τm1. The motor torque τm1 is a torque which is insufficient to drive the rear wheels 2. The motor 5 outputs the predetermined motor torque τm1 at the time point when the shift is turned on, and continuously outputs the motor torque τm1 until time t4 at which step-on of the brake is canceled.

The motor torque τm1 from the motor 5 is transmitted to the rear wheels 2 via the clutch 6 and the differential gear 7. At this time, the motor 5 does not actually rotate but is stationary in a state where a driving force is produced. As described above, in the second embodiment, the predetermined motor torque τm1 is output from the motor 5 to the rear wheels 2 in the 4WD start standby mode, so that starting of the vehicle can be immediately responded. For example, backward movement of the vehicle on a hill or the like can be suppressed.

(4) Time t4

The brake is released. The vehicle starts on a flat dry (high μ) road with a creep torque of the engine 3 and a creep torque of the motor 5.

Drive mode: drive mode iii
Relay 20: connection mode I
Clutch 6: on
Accelerator: off
Shift: on
4WD CU 50;

The 4WD CU 50 outputs the following signals: the relay control instruction signal Sr* necessary for continuously setting the relay 20 into the connection mode I; the DC/DC converter-drive PWM control instruction signal Spdwm* necessary to output the motor target torque τmt2; and the inverter-drive PWM control instruction signal Sipmw* necessary to output the motor target torque τmt2.

The 4WD CU 50 controls the voltage of the power supplied from the battery 17 so that the clutch 6 continuously engages, on the basis of the clutch control instruction signal Sc* necessary to bring the clutch 6 into engagement. The controlled voltage are supplied to the exciting coil of the clutch 6. Further, the 4WD CU 50 controls the current of the power supplied from the battery 17 to the motor 5, on the basis of the motor target field current control instruction signal Simft* related to the motor target field current Imft necessary to output the motor target torque mt2 for adjusting looseness of the clutch. The controlled current is supplied to the field winding of the motor 5.

DC/DC converter 16;

The DC/DC converter 16 controls the on/off operation of the switching elements of the voltage step-up circuit 16*a*, on the basis of the PWM control instruction signal Sdpwm* for driving the DC/DC converter, so as to output inverter input power necessary to output the motor target torque τmt2.

Inverter 9;

The inverter 9 controls the on/off operation of the switching elements of the three-phase bridge circuit 9*a*, on the basis of the PWM control instruction signal Sipmw* for driving the inverter, so as to output the motor input power necessary to output the motor target torque τmt2.

Motor 5;

The motor input power controlled by the inverter 9 is supplied to the armature winding of the motor 5. The field current controlled by the 4WD CU 50 is supplied to the field winding of the motor 5. As a result, the motor 5 drives and outputs the motor torque τm2. The motor torque τm2 is a predetermined torque which assists the creep torque of the engine 3. The motor 5 outputs the predetermined motor torque τm2 at the time point when the brake-depressing is released, and continuously outputs the motor torque τm2 until time t5 at which the accelerator is pressed down on.

The motor torque τm2 from the motor 5 is transmitted to the rear wheels 2 via the clutch 6 and the differential gear 7 to rotate the rear wheels 2. As described above, in the second embodiment, the creep torque of the engine 3 is assisted, so that the load on the engine 3 can be reduced, and the invention can make possible to improve the fuel consumption of the engine 3.

(5) Time t5;

The accelerator is pressed down on. The vehicle is accelerated on a flat dry (high μ) road by the torque of the engine 3 and the torque of the motor 5.

Drive mode: drive mode iv
Relay 20: connection mode I
Clutch 6: on
Accelerator: on
Shift: on
4WD CU 50;

The 4WD CU 50 outputs the following signals: the relay control instruction signal Sr* necessary for continuously setting the relay 20 into the connection mode I; the DC/DC converter-drive PWM control instruction signal Sdpwm* necessary to output a motor target torque τmt3; and the inverter-drive PWM control instruction signal Sipmw* necessary to output the motor target torque τmt3.

The 4WD CU 50 controls the voltage of the power supplied from the battery 17 so that the clutch 6 continuously engages, on the basis of the clutch control instruction signal Sc* necessary to bring the clutch 6 into engagement. The controlled voltage is supplied to the exciting coil of the clutch 6. Further, the 4WD CU 50 controls the current of the power supplied from the battery 17 to the motor 5, on the basis of the motor target field current control instruction signal Simft* related to the motor target field current Imf t necessary to output the motor target torque τmt3 for adjusting looseness of the clutch. The controlled current is supplied to the field winding of the motor 5.

DC/DC converter 16;

The DC/DC converter 16 controls the on/off operation of the switching elements of the voltage step-up circuit 16*a*, on the basis of the DC/DC converter-drive PWM control instruction signal Sdpwm*, so as to output inverter input power necessary to output the motor target torque τmt3.

Inverter 9;

The inverter 9 controls the on/off operation of the switching elements of the three-phase bridge circuit 9a, on the basis of the PWM control instruction signal Sipmw* for driving the inverter, so as to output the motor input power necessary to output the motor target torque τmt3.

Motor 5;

The motor input power controlled by the inverter 9 is supplied to the armature winding of the motor 5. The field current controlled by the 4WD CU 50 is supplied to the field winding of the motor 5. As a result, the motor 5 drives and outputs the motor torque τm3. The motor torque τm3 changes, according to the vehicle speed Vv, to become large when the vehicle speed Vv is low, and to decrease as the vehicle speed Vv increases. The motor 5 outputs the motor torque τm3 at the time point when the accelerator is pressed down on, and continuously outputs the motor torque τm3, according to the vehicle speed Vv, until time t6 at which the vehicle speed Vv becomes equal to or higher than a predetermined wheel speed Vw1.

The motor torque τm3 output from the motor 5 is transmitted to the rear wheels 2 via the clutch 6 and the differential gear 7 to rotate the rear wheels 2. As described above, in the embodiment, the torque of the engine 3 is assisted, so that the load on the engine 3 can be reduced, and the invention can make possible to improve the fuel consumption of the engine 3. In the embodiment, acceleration performance at the time of accelerated driving of the vehicle can be improved by assistance of the motor 5.

(6) Time t6;

The vehicle speed Vv becomes Vw1 or higher. The vehicle is accelerated on a flat dry (high μ) road by the torque of the engine 3.

Drive mode: drive mode v
Relay 20: connection mode I
Clutch 6: on
Accelerator: on
Shift: on
4WD CU 50;

The 4WD CU 50 outputs the following signals: the relay control instruction signal Sr* necessary for continuously setting the relay 20 into the connection mode I; the DC/DC converter-drive PWM control instruction signal Sdpwm* necessary to output a motor target torque τmt4; and the inverter-drive PWM control instruction signal Sipmw* necessary to output the motor target torque τmt4.

The 4WD CU 50 controls the voltage of the power supplied from the battery 17 so that the clutch 6 continuously engages, on the basis of the clutch control instruction signal Sc* necessary to bring the clutch 6 into engagement, and supplies the voltage to the exciting coil of the clutch 6. Further, the 4WD CU 50 controls the current of the power supplied from the battery 17 to the motor 5, on the basis of the motor target field current control instruction signal Simft* related to the motor target field current Imft necessary to output the motor target torque τmt4 for adjusting looseness of the clutch. The controlled current is supplied to the field winding of the motor 5.

DC/DC converter 16;

The DC/DC converter 16 controls the on/off operation of the switching elements of the voltage step-up circuit 16a, on the basis of the inverter-drive PWM control instruction signal Sdpwm*, so as to output inverter input power necessary to output the motor target torque τmt4.

Inverter 9;

The inverter 9 controls the on/off operation of the switching elements of the three-phase bridge circuit 9a, on the basis of the PWM control instruction signal Sipmw* for driving the inverter, so as to output the motor input power necessary to output the motor target torque τmt4.

Motor 5;

The motor input power controlled by the inverter 9 is supplied to the armature winding of the motor 5. The field current controlled by the 4WD CU 50 is supplied to the field winding of the motor 5. As a result, the motor 5 drives and outputs the motor torque τm4. The motor torque τm4 is a predetermined torque for assisting the torque of the engine 3. The motor 5 outputs the motor torque τm4 at the time point when the vehicle speed Vv becomes equal to or higher than the predetermined wheel speed Vw1. The motor torque τm4 continuously outputs and, after predetermined time, stops outputting the motor torque τm4.

The motor torque τm4 from the motor 5 is transmitted to the rear wheels 2 via the clutch 6 and the differential gear 7 to rotate the rear wheels 2. As described above, in the embodiment, the motor torque from the motor 5 is held at the predetermined value for predetermined time when the torque assist stops and, after that, the motor torque output from the motor 5 is set to 0 Nm. Consequently, drop of the torque caused by stopping output of the motor torque of the motor 5 at the time of the accelerated driving of the vehicle can be suppressed.

(7) Time t7;

The 4WD control stop mode continues for a predetermined time and, after that, the clutch 6 is disengaged. The vehicle is accelerated on a flat dry (high μ) road by the torque of the engine 3.

Drive mode: drive mode vi
Relay 20: connection mode II (electric connection between the alternator 13 and the battery 17)
Clutch 6: off
Accelerator: on
Shift: on
4WD CU 50;

The 4WD CU 50 outputs the relay control instruction signal Sr* necessary for setting the relay 20 into the connection mode II. The 4WD CU 50 stops supply of the power from the battery 17 to the exciting coil of the clutch 6 so that the clutch 6 disengages, on the basis of the clutch control instruction signal Sc* necessary to bring the clutch 6 into disengagement. Since the driving of the motor 5 is unnecessary in the drive mode, the 4WD CU 50 does not output the inverter-drive PWM control instruction signal Sipmw*, the DC/DC converter-drive PWM control instruction signal Sdpwm*, and the motor target field current control instruction signal Simft*.

DC/DC converter 16;

The DC/DC converter 16 does not operate in the drive mode.

Inverter 9;

The inverter 9 does not operate in this drive mode.

motor 5;

The motor 5 does not operate in this drive mode.

(8) Time t8;

The accelerator is released, the brake is depressed, and the clutch 6 is brought into engagement. The vehicle is decelerated on a flat dry (high μ) road.

Drive mode: drive mode vii
Relay 20: connection mode III (electric connection between the DC/DC converter 16 and the battery 17)
Clutch 6: on
Accelerator: off
Shift: on
4WD CU 50;

The 4WD CU 50 outputs the following signals: the relay control instruction signal Sr* necessary for continuously setting the relay 20 into the connection mode III; the inverter-drive PWM control instruction signal Sipwm* necessary to control the generated power that is output from the motor 5; and the DC/DC converter-drive PWM control instruction signal Sdpwm* necessary to step down the inverter output power.

The 4WD CU 50 controls the voltage of the power supplied from the battery 17 so that the clutch 6 engages, on the basis of the clutch control instruction signal Sc* necessary to bring the clutch 6 into engagement, and supplies the voltage to the exciting coil of the clutch 6. Further, the 4WD CU 50 controls the current of the power supplied from the battery 17 to the motor 5, on the basis of the motor target field current control instruction signal Simft* related to the motor target field current Imft necessary to operate the motor 5 as a generator.

The controlled current is supplied to the field winding of the motor 5.

DC/DC converter 16;

The DC/DC converter 16 controls the on/off operation of the switching element of the voltage step-down circuit 16b, on the basis of the DC/DC converter-drive PWM control instruction signal Sdpwm*, so as to step down the inverter output power to power with a predetermined voltage, for example, the power of 14V as the charging voltage of the battery 17.

Inverter 9;

The inverter 9 controls the on/off operation of the switching elements of the three-phase bridge circuit 9a, on the basis of the inverter-drive PWM control instruction signal Sipmw*, to control the generation power of the motor 5.

Motor 5;

The force of rotating the rear wheels 2 is transmitted to the motor 5 via the differential gear 7 and the clutch 6. The field current controlled by the 4WD CU 50 is supplied to the field winding of the motor 5. Consequently, the motor 5 operates as a generator and generated power is obtained from the armature winding. The motor 5 operates as a generator at the time point when the accelerator is released, and stops generating power when the vehicle speed Vv becomes equal to or lower than the wheel speed Vw2.

The generated power obtained from the motor 5 is converted to DC power by the inverter 9. The converted inverter output power is stepped down to power with a predetermined voltage, for example, the power of 14 v as the charging voltage of the battery 17 by the DC/DC converter 16, and the resultant voltage is supplied to the battery 17. As described above, in the embodiment, the regenerative energy of the vehicle is collected, so that the energy efficiency of the vehicle can be improved.

(9) Time t9;

The vehicle speed Vv becomes 0 km/h and the vehicle stops. The drive mode becomes the 4WD start standby mode and the vehicle maintains to be ready to start. Since the operation is similar to that in (3) time t3, detailed description will be omitted.

(10) Time t10;

The brake is released. The drive mode becomes the 4WD creep mode, and the vehicle starts on a flat low-μ road by the creep torque of the engine 3 and the creep torque of the motor 5. Since the operation is similar to that in (4) time t4, detailed description will be omitted.

(11) Time t11;

The accelerator is pressed down on. The drive mode becomes the 4WD normal drive control mode, and the vehicle is accelerated on a low-μ road of a hill by the torque of the engine 3 and the torque of the motor 5. Since the operation is similar to that in (5) time t5, detailed description will be omitted.

(12) Time t12;

During accelerated drive on the low-μ road of a hill, a wheel speed difference between the front and rear wheels, that is, slip occurs. The case where the front wheels 1 slip will be described as an example.

Drive mode: drive mode viii
Relay 20: connection mode I
Clutch 6: on
Accelerator: on
Shift: on
4WD CU 50;

The 4WD CU 50 outputs the following signals: the relay control instruction signal Sr* necessary for continuously setting the relay 20 into the connection mode I; the DC/DC converter-drive PWM control instruction signal Sdpwm* necessary to output the motor target torque τmt6; and the inverter-drive PWM control instruction signal Sipwm* necessary to output the motor target torque τmt6.

The 4WD CU 50 controls the voltage of the power supplied from the battery 17 so that the clutch 6 continuously engages, on the basis of the clutch control instruction signal Sc* necessary to bring the clutch 6 into engagement, and supplies the voltage to the exciting coil of the clutch 6. Further, the 4WD CU 50 controls the current of the power supplied from the battery 17 to the motor 5, on the basis of the motor target field current control instruction signal Simft* related to the motor target field current Imf t necessary to output the motor target torque τmt6 for adjusting looseness of the clutch. The controlled current is supplied to the field winding of the motor 5.

DC/DC converter 16;

The DC/DC converter 16 controls the on/off operation of the switching element of the voltage increase circuit 16a, on the basis of the DC/DC converter-drive PWM control instruction signal Sdpwm*, so as to output the inverter output power necessary to output the motor target torque τmt6.

Inverter 9;

The inverter 9 controls the operation of the three-phase bridge circuit 9a, on the basis of the PWM control instruction signal Sipmw* for driving the inverter, so as to output the motor input power necessary to output the motor target torque τmt6.

Motor 5;

The motor input power controlled by the inverter 9 is supplied to the armature winding of the motor 5. The field current controlled by the 4WD CU 50 is supplied to the field winding of the motor 5. Consequently, the motor 5 drives and outputs the motor torque τm6. The motor torque τm6 changes, according to the wheel speed difference ΔVw, so as to gradually increases from 0 Nm as the wheel speed difference ΔVw increases from the predetermined wheel speed difference ΔVw1. The maximum motor torque τm6max is output at the predetermined wheel speed difference ΔVw2. The maximum motor torque τm6max is set to be larger than the maximum motor torque τm3max of the 4WD normal travel control mode. The motor 5 outputs the motor torque τm6 at the time point when the wheel speed difference ΔVw exceeds the wheel speed difference ΔVw1, and outputs the motor torque τm6 according to the wheel speed difference ΔVw until the wheel speed difference ΔVw becomes equal to or less than the wheel speed difference ΔVw1.

The motor torque τm6 from the motor 5 is transmitted to the rear wheels 2 via the clutch 6 and the differential gear 7 to rotate the rear wheels 2. As described above, in the embodiment, when slip occurs, the motor torque larger than that in the normal drive mode is output to make the slip converge. Thus, the drive performance of the vehicle, particularly, the drive performance on a low-μ road can be improved.

(13) time t13;

The slip converges and the drive mode becomes again the 4WD normal drive control mode. Since the operation here is similar to that of (5) time t5, the detailed description will be omitted.

(14) Time t14;

The vehicle speed Vv becomes Vw1 or higher. The drive mode becomes the 4WD stop control mode, and the vehicle is accelerated on the low-μ road in a hill by the torque of the engine 3. Since the operation is similar to that of (6) time t6, the detailed description will be omitted.

(15) Time t15;

After the 4WD control stop mode continues for predetermined time, the clutch 6 is turned off, and the drive mode becomes the 4WD drive stand-by mode. The vehicle climbed up the low-μ road in the hill, and is accelerated on a flat dry (high-μ) road by the torque of the engine 3. Since the operation is similar to that of (7) time t7, the detailed description will be omitted.

(16) Time t16;

The accelerator is released, the brake is depressed on, and the clutch 6 is brought into engagement. The drive mode becomes the 4WD regenerative mode, and the vehicle decelerates on a flat dry (high-μ) road. Since the operation is similar to that of (8) time t8, the detailed description will be omitted.

(17) Time t17;

The vehicle speed Vv becomes 0 km/h and the vehicle stops. The drive mode becomes the 4WD start standby mode, and the vehicle maintains to be ready to start. Since the operation is similar to that of (3) time t3, the detailed description will be omitted.

(18) Time t18;

The shift is turned off, the drive mode becomes the 4WD preparation mode, and the clutch 6 is brought into engagement.

(19) Time t19;

The 4WD SW 60 is turned off. The drive mode becomes the 4WD stop mode, the clutch 6 is disengaged, and a 4WD control system power supply is turned off. At this time point, the drive mode of the vehicle changes from the 2WD mode to the 4WD mode.

(20) Time t20;

The key switch is turned off, thereby stopping the engine 3.

Third Embodiment

Figure 22:
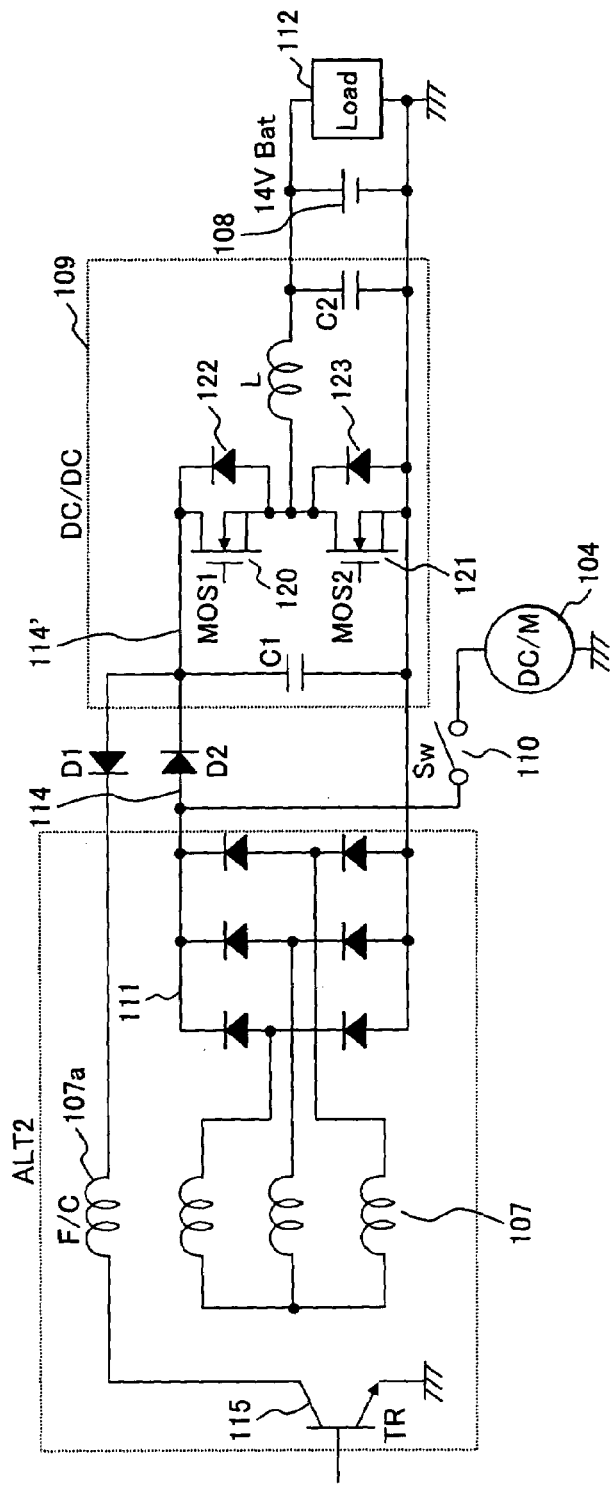
FIG. 22 is a circuit diagram of a vehicle electric drive system according to a third embodiment of the invention.
Figure 23:
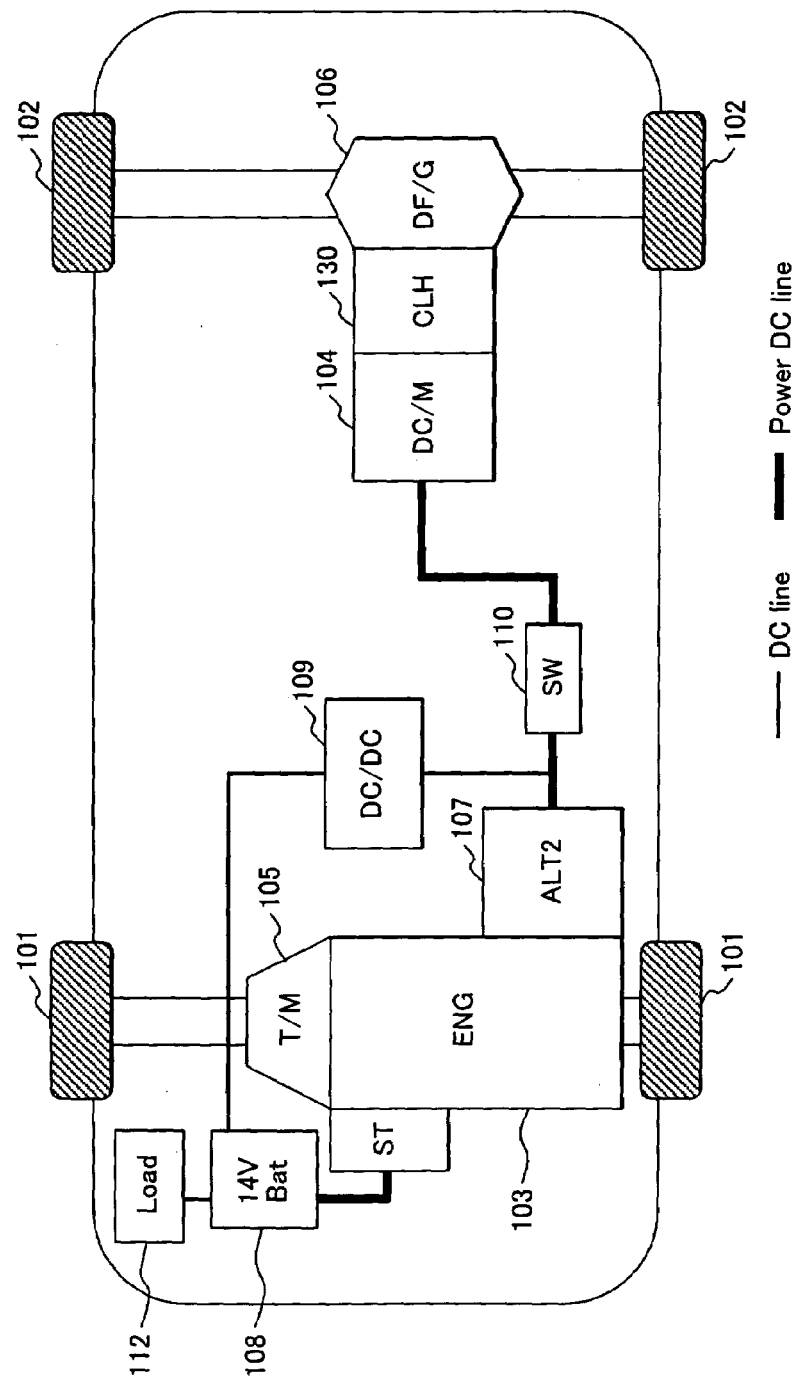
FIG. 23 is a schematic diagram of a hybrid engine-motor type four-wheel drive system to which the third embodiment is applied.

FIG. 22 is a circuit diagram of a vehicle electric drive system according to an embodiment of the invention. FIG. 23 is a schematic diagram of a Hybrid engine-motor type four-wheel drive system to which the vehicle electric drive system is applied.

First, the outline of the hybrid engine-motor type four-wheel drive system will be described with reference to FIG. 23.

It is assumed that either the front wheels 101 or rear wheels 102 (in this case, front wheels) are driven by an engine 103 (the engine may be any kind) and the other wheels (in this case, rear wheels) are driven by a motor 104.

That is, the engine 103 transmits its power to a transmission 105 and the front wheel-axle to drive the pair of front wheels 1. The motor (DC motor) 104 transmits its power to the rear wheel-axle via a clutch 130 and a differential gear 106 to drive the rear wheels 102.

The rear wheels 102 are driven by driving the motor 104 as necessary (according to drive conditions). In the embodiment, a DC motor is used as the motor 104.

The power of the engine 103 is transmitted to an alternator (AC generator) 107 via a pulley and a V belt. An output voltage of the alternator 107 is varied from 0 to 50V or higher by field current control. The alternator 107 serves as the drive power supply of the motor 4 and the power supply of accessories (general electric equipment) and also serves as the power supply for charging a battery (for example, 12V or 14V battery) 108 for accessories. To make the alternator 107 serve as power supply for a plurality of uses, a DC-DC converter 109 having the function peculiar to the invention is provided. The DC-DC converter will be described later.

As shown in FIG. 22, three-phase power of the alternator 107 is converted to direct current by a rectifier 111 and the drive power is supplied to the DC motor 104 via a switch 110 as necessary (that is, according to vehicle drive conditions).

The rectifier 111 (output section) of the alternator 107 and the battery 108 are electrically connected to each other via the voltage step-up/step-down device 109 having the function of stepping up voltage and the function of stepping down the voltage. In this case, the function of the voltage step-up/step-down device is incorporated in the DC-DC converter.

The DC-DC converter 109 has a choke coil L, a smoothing capacitor C2, first and second switching elements 120 and 121, and an output capacitor C1. The output capacitor C1 has the function of charging voltage of 50V or higher in capacitance.

The first and second switching elements 120 and 121 are configured by semiconductor power switch elements (semiconductor power transistors). As an example, MOS transistors are used here.

The first and second switching elements 120 and 121 are connected to each other in series and are connected in parallel with the output capacitor C1. The first switching element 120 is positioned between the choke coil L and a field winding 107a of the alternator 107. The second switching element 121 is disposed in an LC circuit configured by the choke coil L and the smoothing capacitor C2.

The switching elements 120 and 121 are connected in parallel with bypass diodes 122 and 123, and an end on the output side of the choke coil L is connected to a midpoint between the switching elements 120 and 121. The other end of the choke coil L is connected with the capacitor C2 and the battery 108, and the capacitor C2 and the battery 108 are connected in parallel. An accessory (14V electric load) 112 is connected to the battery 108.

A diode D2, which is in an opposite direction when viewed from an output portion 114' side of the DC-DC converter toward an alternator side, is connected between an output portion (that is, the power line of the output capacitor Cl) 114' of the DC-DC converter 109 and the output portion (rectifier) 111 of the alternator 7. One end of the field winding 107a of the alternator 107 is connected to the power line 114' of the DC-DC converter 9 via the diode D1, and the other end of the field winding 107a is connected to a field current control element 115 for adjusting generator voltage. The field current control element 115 is, for example, an NPN transistor. The collector side of thereof is connected to one end of the field winding 107a. The emitter side of thereof is connected to the earth. The base (gate) thereof takes in an instruction signal for obtaining predetermined power from a not-shown control unit.

The armature winding of the motor 104 is connected between the rectifier 111 and the diode 112 on the current line of the alternator 7, via the motor switch element 110. The field coil 104a of the motor 104 is supplied with the field current from the battery 108 or alternator 107 (rectifier 111). The motor field current can flow in any of the forward and reverse directions by a not-shown current direction-switching circuit. By the forward/reverse-switching of the motor field current, the forward/reverse rotations of the motor 4 can be switched in correspondence with forward/reverse travel of the vehicle.

Operation modes of the electric drive system for a vehicle according to the third embodiment will be described with reference to FIG. 22.

(1) Vehicle Starting Mode

In this case, a control is performed so that the motor switch 110 is turned on, the first switching element 120 is turned off, and the second switching element 121 is repeatedly turned on and off (a control circuit is not shown). By such a control, when the second switching element 121 is on, current sharply flows into the chock coil L. When the switching element 121 is turned off at that time point, a voltage (Ldi/dt) that keeps on flowing current to L is generated, the electric energy is discharged toward the output capacitor C1 via the bypass diode 122. By the repletion of the process, the output capacitor C1 is increased. Consequently, high voltage (for example, 50V) is applied to the field coil 107a via the diode D1, and sufficient field current can be passed through the field coil 107a (separate excitation mode). As a result, an output of the alternator 107 increases and sufficient drive power can be supplied to the motor 104. In the case of the mode (1), for example, the front wheels or rear wheels are driven by the engine, and the other wheels are driven by the motor 104, thereby obtaining a four-wheel drive state. Step-up of voltage is controlled by making the switching element S1 operate under PWM control and, at that time, a duty factor (duty) is changed.

(2) Normal Drive Mode of Drive Only by Engine, That is, So-Called Two-Wheel Drive Mode In this case, the motor switch 110 is off, the first switching element 120 is on, and the second switching element 121 is off. In this case, the DC-DC converter 109 does not perform a step-up operation and a step-down operation voltage. In such a sense, the DC-DC converter 109 is in the off state. The output line 114' of the DC-DC converter 109 becomes an accessory voltage level (14V) by the field current control of the alternator 107. The voltage is applied to the field winding 107a of the alternator 107, and an output of the alternator 107 becomes 14V. The output of the alternator 107 becomes an exciting power of the field winding 107a of itself (self excitation mode). The output of the alternator 107 is supplied to the battery 108 for accessories or the accessories 112 via the first switch 120.

In the mode (2), the motor is in the off state, and the two-wheel drive mode by an internal combustion engine is set. (3) In the case where vehicle is in high load operation such as during times of going up a hill or the like, and/or electric load on the accessories 112 is high In this case, the motor switch 110 is on, the first switching element 120 is repeatedly turned on and off, and the second switching element 121 is off. In a state where the engine speed is high like in the climbing mode, the alternator 107 is in a self excitation mode, and output voltage of the alternator 107 is applied to the field winding 107a. In this case, the output voltage of the alternator 107 becomes higher (for example, about 40V) than that in the normal drive mode by the field current control, and the alternator 107 is in a high output state and can sufficiently drive the motor 104. By turning on/off the first switch 120, the switching element S2 is controlled by the conduction ratio of PWM cycles to decrease the alternator output so that an average value of output voltages becomes a battery charging voltage (14V), and the resultant voltage can be supplied to the battery 108 and the accessories 112. In the case of the mode (3), four-wheel drive similar to (1) is performed. Even if the electric load on the accessories 112 is high, the 14V power adapted to the electric load can be supplied via the DC-DC converter 109 by using the alternator 104 as the power supply.

As obvious also from FIG. 22, when the first switch 120 in the DC-DC converter 109 is off, the motor switch 110 is always in the on state. In such a manner, while reducing the capacity of the output capacitor C1 as much as possible, the power elements such as the capacitor C1, diodes D1 and D2, rectifier 11, and switching element 120 are protected.

Specifically, if the motor switch 110 is left in the off state when the first switch 120 of the DC-DC converter 109 is off, the output of the alternator 107 cannot escape, and the voltage of the capacitor C1 rises abnormally (the alternator output voltage jumps up by the energy of $LI^2/2$). As a result, the above-described power elements are destroyed. In the embodiment, when the first switching element 120 is off, the alternator output is consumed by turn-on of the motor switch 110. Consequently, the above-described trouble can be prevented.

Figure 24:
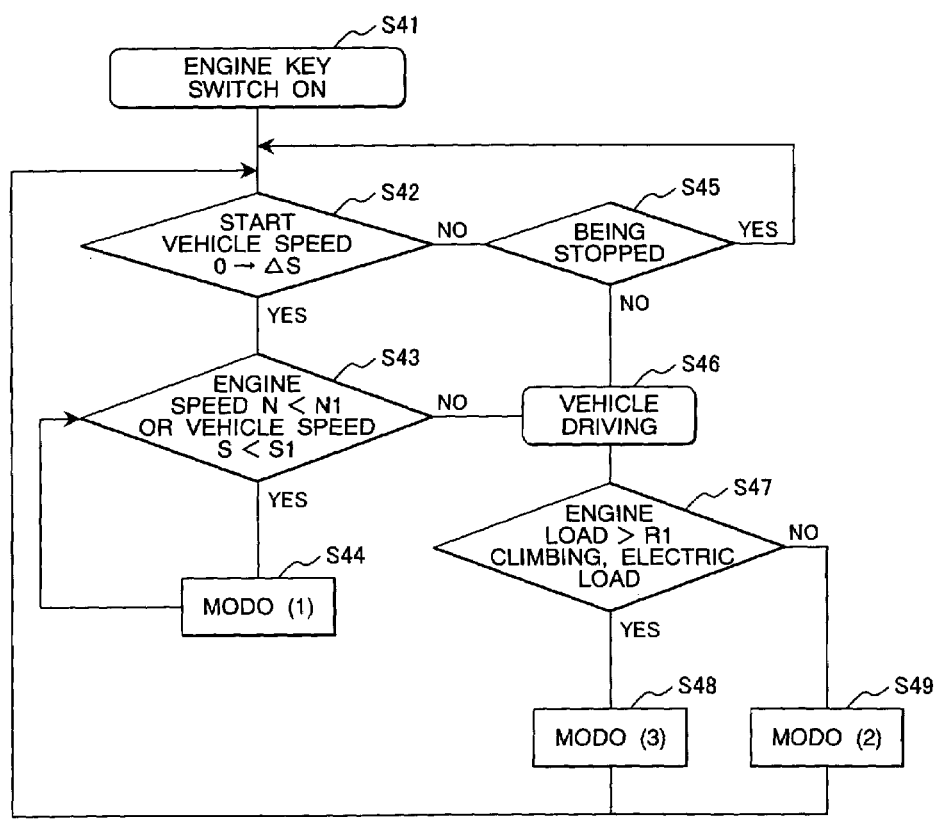
FIG. 24 is a flowchart showing an operation state of the third embodiment.

FIG. 24 shows the flowchart of a control unit (not shown) in the case of executing the modes (1) to (3).

After start of the engine (step 41), whether the vehicle is in a start state or not is detected by a change of the vehicle speed from 0 to ΔS (step 42). When the vehicle enters the start state, whether vehicle speed S is equal to or lower than predetermined low speed S1 (for example, 20 km/hour) or not or whether engine speed N is equal to or lower than predetermined rotational speed N1 or not is monitored. When the vehicle speed S is S1 or lower or when the engine speed N is N1 or lower, the mode (1) is executed (step 44). When S<S1 or N<N1, it is determined that the vehicle drives normally (step 46).

In the case where the vehicle is driving, whether the vehicle is going up a hill or not and/or the electric load is heavy or not (engine load>R1) is determined on the basis of vehicle speed, throttle speed, engine speed, electric load switch, and the like. If YES, the mode (3) is executed (steps 47 and 48). If NO, the mode (2) is executed as normal drive (step 49).

According to the embodiments, the following effects are produced.

(1) A hybrid engine-motor type vehicle drive system having one alternator (one generator) and one battery can be realized.
(2) By stepping up the output of the generator upon starting or going up a hill (climbing), the power of the electric driving of the vehicle can be stepped up.
(3) The power generator and the battery are connected to each other via the DC-DC converter. When the switching element of the DC-DC converter is off, the motor switch is connected. Thus, abnormal rise of the generator output can be prevented, and the capacity of the output capacitor can be reduced accordingly.
(4) Since the stepped up output of the DC-DC converter is not influenced by the generator output (during times of low output), an electric device of this kind can be realized.
(5) As the generator for driving the motor can be switched between the self excitation mode and the separate excitation mode in accordance with the driving conditions, the optimum field current for the vehicle driving motor can be always provided for the generator.

Furthermore, by combining the configurations described in the third embodiment and the configuration described in the foregoing embodiments, a more effective electric drive system for a vehicle can be provided.

INDUSTRIAL APPLICABILITY

According to the invention, a vehicle electric drive system and hybrid an engine-motor type vehicle drive system realizing simplification and miniaturization of electric parts and, moreover, capable of contributing to cost reduction while maintaining performances can be provided.

The invention claimed is:

1. An electric drive system for a vehicle, comprising:
a generator driven with an engine for driving a vehicle;
a vehicle-mounted battery used for accessories; and
an electric motor for driving a vehicle,
wherein said electric drive system is configured so that at least one of an output voltage of said generator and an output voltage of said battery can be stepped up to a motor-drive voltage to drive said electric motor.

2. Hybrid engine/motor type four-wheel drive system for driving either front wheels or rear wheels by an engine, and driving the other wheels by said electric drive system for a vehicle according to claim 1 as necessary.

3. An electric drive system for a vehicle, comprising:
a generator driven by an engine for driving a vehicle;
a vehicle-mounted battery used for accessories; and
an electric motor for driving a vehicle,
wherein a power supply for said electric motor is comprised of:
said generator capable of outputting a motor-drive voltage for driving said electric motor by driving of said engine without a need for a dedicated motor-drive battery; and
said vehicle-mounted battery for accessories capable of outputting said motor-drive voltage via a voltage step-up device.

4. An electric drive system for a vehicle, comprising:
a generator driven by an engine for driving a vehicle;
a vehicle-mounted battery used for accessories; and
an electric motor for driving a vehicle,
wherein said electric drive system is configured so that said vehicle-mounted battery is connected to a power line between said generator and said electric motor via a voltage step-up device, and a motor-drive power can be supplied to said electric motor by at least one of an output of said generator and an stepped up output of the vehicle-mounted battery.

5. An electric drive system for a vehicle in which some wheels are driven with an engine and others are driven with an electric motor, comprising:
a battery for accessories mounted on a vehicle; and
a generator driven by power of said engine, and serving as both of a drive power supply for said electric motor and a power supply for said accessories,
wherein said electric motor and said generator are connected with said battery via a voltage step-up/step-down device, and
said voltage step-up/step-down device has the following function:
a function of stepping up power of said battery to supply said electric motor with the stepped up power in accordance with drive conditions; and
a function of stepping down power of said generator to supply said battery and accessories with the stepped down power.

6. The electric drive system for a vehicle according to claim 5, wherein said voltage step-up/step-down device has the function of stepping up power of said battery to supply said electric motor with the stepped up power together with power output from said generator.

7. An electric drive system for a vehicle in which some wheels are driven with an engine and others are driven with an electric motor,
wherein said electric motor is a motor/generator that drives with the supply of power from a generator driven by said engine or from an electric power storage device, during times of motoring, and generates regenerative power during times of regeneration,
a power line between said electric motor and said electric power storage device is provided with a voltage step-up/step-down circuit, and
said voltage step-up/step-down circuit is configured, according to vehicle conditions, to step up electric energy supplied as motor-drive power from said electric power storage device to said electric motor during times of motoring, and to step down regenerative power generated by said electric motor during times of regeneration to supply said electric power storage device with the stepped down power.

8. The electric drive system for a vehicle according to claim 7, wherein said voltage step-up/step-down circuit comprises:
a choke coil and a capacitor for stepping up a voltage; and
a semiconductor power element and a diode for switching operation of stepping up/stepping down the voltage in correspondence with motoring/regeneration of said motor by an instruction from a control unit,
wherein said stepped up voltage or said stepped down voltage is controlled by performing a duty control on said semiconductor power element, and
said electric power storage device is a battery used for accessories including a lamp load of the vehicle or a capacitor having capacity of accumulating voltage smaller than a motor-drive voltage for driving said electric motor.

9. The electric drive system for a vehicle according to claim 7, wherein the electric power storage device is connected to a power line between said electric motor for driving wheels and said generator as a drive power supply of said motor via said voltage step-up/step-down circuit, a control unit is also provided, which executes at least the following modes:
a mode of supplying power of said electric power storage device stepped up by said voltage step-up/step-down circuit and power of said generator to said motor;
a mode of stepping down power generated in said electric motor during times of regenerative braking of said electric motor by said voltage step-up/step-down circuit to supply said electric power storage device with the stepped down power, and
a mode of stepping down power of said generator by said voltage step-up/step-down circuit to supply said electric power storage device with the stepped down power during times other than said motoring and regenerative braking modes, and
said electric power storage device also functions as a battery of general accessories of the vehicle.

10. The electric drive system for a vehicle according to claim 7, wherein said electric power storage device is connected with a power line between said electric motor for driving wheels and said generator as a power supply of the motor via said voltage step-up/step-down circuit, and
a change-over switch Sw for switching connection among said generator, said electric power storage device, and said electric motor is provided between a power line A between said electric motor and said generator, and a power line B connecting said power line A and said electric power storage device.

11. The electric drive system for a vehicle according to claim 7, wherein said electric motor is an AC motor or a DC motor controlled by an inverter.

12. An electric drive system for a vehicle in which some wheels are driven with an engine and others are driven with an electric motor,
wherein said electric motor is a motor/generator that drives with the supply of power from a generator driven by said engine or from an electric power storage device, during times of motoring, and generates regenerative power during times of regeneration,
said electric power storage device is one having a voltage level of accessories including a light load of the vehicle, and connected with a power line between said electric motor for driving wheels and said generator as a power supply of said motor via a voltage step-up/step-down circuit, and
said voltage step-up/step-down circuit has a circuit configuration capable of switching the following voltage step-up operation and step down operation by a control signal: voltage step-down operation from a power line between said generator and electric motor toward said electric power storage device, and voltage step-up operation from said electric power storage device toward a power line between said generator and electric motor,
and has a switching control means for executing the following modes:
a mode of supplying power of said electric power storage device stepped up by said voltage step-up/step-down circuit and power of said generator to said electric motor;
a mode of stepping down power generated in said electric motor during times of regenerative braking of said electric motor by said voltage step-up/step-down circuit to supply said electric power storage device with the stepped down power, and
a mode of stepping down power of said generator by said voltage step-up/step-down circuit to supply said electric power storage device with the stepped down power during times other than said motoring and regenerative braking modes.

13. Hybrid engine/motor type vehicle drive system comprising an engine and an electric motor for driving wheels,
wherein said vehicle drive system is configured so that said electric motor is driven by a battery to start a vehicle at the time of starting the vehicle, after that, rotational torque of said electric motor is transmitted to said engine, and an ignition system is operated without a need for making a starter operate, thereby starting the engine.

14. An electric drive system for a vehicle in which some wheels are driven with an engine and others are driven with an electric motor, comprising:
a vehicle-mounted battery mounted on said vehicle; and
a generator driven by power of said engine, and serving as both of a drive power supply for said electric motor and a power supply for accessories,
wherein said generator has both of a self excitation function and a separate excitation function, and
said the electric drive system is configured to switch between a self excitation mode and a separate excitation mode in accordance with drive conditions of said vehicle, in the separate excitation mode of said generator, to step up the power from said battery to supply a field winding of said generator with the stepped up power, and to drive said electric motor by generator output obtained by the stepped up power of said battery.

15. The electric drive system for a vehicle according to claim 14, wherein in the self excitation mode of said generator, when driving of said electric motor is requested and output voltage of said generator is at a voltage level of driving said electric motor, field current is passed to the field winding of said generator by an output of said generator, and the output of said generator is stepped down to a voltage level of accessories and used as a power supply of said accessories and said battery.

16. The electric drive system for a vehicle according to claim 14, wherein said electric motor drives with power supplied from said generator at the starting of the vehicle, said generator at this time is driven in said separate excitation mode and, when speed becomes predetermined speed or engine speed after starting, said generator is switched to the self excitation mode and functions as a power supply of accessories.

17. The electric drive system for a vehicle according to claim 14, wherein said electric motor drives with power supplied from said generator at the starting of the vehicle, said generator at this time is driven in said separate excitation mode, when speed of the vehicle becomes predetermined speed or engine speed after starting, said generator is switched to the self excitation mode and functions as a power supply of accessories,
said electric motor drives with power supplied from said generator when the vehicle enters a hill climbing state, an output of said generator at this time is in said self excitation mode in which filed winding voltage necessary to drive said motor is obtained, and the power of said generator is stepped down and supplied to said battery and accessories.

18. An electric drive system for a vehicle in which some wheels are driven with an engine and others are driven with an electric motor, comprising:
a vehicle-mounted battery mounted on said vehicle and having an accessory voltage level serving as a power supply of accessories; and a generator driven by power of said engine, and serving as both of a drive power supply for said electric motor and a power supply of said accessories, wherein said motor is a DC motor, and said generator and said battery are electrically connected to each other via a voltage step-up/step-down device, and said voltage step-up/step-down device has a function of stepping up power voltage of said battery to supply a field winding of said generator with the stepped up field current, and a function of supplying power output from said generator as it is or stepping down the power output from said generator to supply said battery and said accessories with the stepped down voltage in accordance with a driving conditions of the vehicle.

19. The electric drive system for a vehicle according to claim 18, further comprising a circuit device for maintaining output voltage of said voltage step-up/step-down device without being influenced by output voltage of said generator between an output portion of said voltage step-up/step-down device and an output portion of said generator.

20. The electric drive system for a vehicle according to claim 19, wherein said circuit device is a diode which is provided in an opposite direction when viewed from the output portion of said voltage step-up/step-down device to the output portion of said generator.

21. The electric drive system for a vehicle according to claim 18, wherein said electric drive system is configured so that said electric motor drives with power supplied from said generator at the time of starting, voltage of said battery is stepped up by said voltage step-up/step-down device to supply a field winding of said generator with the stepped up power at the time of starting, when speed of the vehicle becomes predetermined speed or engine speed after starting, said generator is switched to the self excitation mode, output of said generator is supplied as it is to said battery and said accessories via said voltage step-up/step-down device, said electric motor drives with power supplied from said generator when said vehicle enters a hill climbing state, an output of said generator at this time is in said self excitation mode in which filed winding voltage necessary to drive said motor is obtained, and the power of said generator is stepped up by said voltage step-up/step-down device to supplied said battery and accessories with the stepped down power.

22. The electric drive system for a vehicle according to claim 18, wherein said voltage step-up/step-down device has a choke coil, a smoothing capacitor, first and second switching elements, and an output capacitor, said first and second switching elements are connected in series and connected in parallel with said output capacitor, said first switching element is positioned between said choke coil and the field winding of said generator, said second switching element is in an LC circuit constructed by said choke coil and the smoothing capacitor, each of said first and second switching elements is connected in parallel with a bypass diode, said choke coil is connected to a power line connecting said first and second switching elements, and a switching element for motor, which is turned on/off by an instruction signal, is provided between said generator and armature winding of said electric motor.

23. The electric drive system for a vehicle according to claim 22, wherein said switching element for said electric motor is always in the on state when said first switch is off.

24. The electric drive system for a vehicle according to claim 23, wherein a mode of driving said electric motor is set at the time of starting of the vehicle and, at this time, said switch for motor is on, said first switching element is off, and said second switching element is repeatedly turned on/off.

25. The electric drive system for a vehicle according to claim 22, wherein in a mode in which said electric motor does not drive, said switch for motor is off, said first switching element is on, and said second switching element is off.

26. The electric drive system for a vehicle according to claim 22, wherein when the vehicle climbs and/or load on said battery is the maximum, said switch for motor is on, said first switching element is repeatedly turned on/off, and said second switching element is off.

27. An electric drive system for a hybrid engine/motor type vehicle in which either front wheels or rear wheels are driven with an engine and the other wheels of them are driven with an electric motor, comprising:

a generator driven by said engine to generate electric power for driving said electric motor;

a vehicle-mounted electric power storage device that outputs electric power at voltage levels used for accessories of the vehicle and that is capable of storing electric power from said generator by stepping down the electric power with a voltage step-down circuit;

a voltage step-up/step-down circuit that is combined with a voltage step-up circuit and said voltage step-down circuit and that is electrically connected to said electric power storage device and an electric power line between said generator and said electric motor;

a switching circuit switch-selectable one among at least a first circuit for supplying electric power from said generator to said electric motor by connecting electrically between said generator and said electric motor, a second circuit for stepping up electric power from said electric power storage device and supplying the stepped-up electric power to said electric motor by connecting electrically between said electric power storage device and said electric motor via said voltage step-up circuit, and a third circuit for stepping down electric power from said generator and supplying the stepped-down electric power to said electric power storage device by connecting electrically between said generator and said electric power storage device via said voltage step-down circuit.

28. The electric drive system for a hybrid engine/motor type vehicle according to claim 27, wherein an output voltage of said generator can be controlled variably by field current control.

29. An electric drive system for a hybrid engine/motor type vehicle in which either front wheels or rear wheels are driven with an engine and the other wheels of them are driven with a DC motor, comprising:

a rectifier-equipped alternator that is driven by said engine to generate electric power for driving said DC motor;

a vehicle-mounted electric power storage device that outputs electric power at voltage levels used for accessories of the vehicle and that is capable of storing electric power from said alternator by stepping down the electric power with a voltage step-down circuit;

a DC-DC converter that is combined with a voltage step-up circuit and said voltage step-down circuit and that is electrically connected to said electric power storage device and an electric power line between said rectifier of said alternator and said DC motor;

a switching circuit switch-selectable one among at least a first circuit for supplying electric power from said alternator to said DC motor via said rectifier by connecting electrically between said rectifier of said alternator and said DC motor, a second circuit for stepping up electric power from said electric power storage device and supplying the stepped-up electric power to said DC motor by connecting electrically between said electric power storage device and said DC motor via said voltage step-up circuit, and a third circuit for stepping down electric power from said alternator and supplying the stepped-down electric power to said electric power storage device by connecting electrically between said rectifier of said alternator and said electric power storage device via said voltage step-down circuit.

30. The electric drive system for a hybrid engine/motor type vehicle according to claim 29, wherein an output voltage of said alternator can be controlled variably by field current control.

31. An electric drive system for a hybrid engine/motor type vehicle in which either front wheels or rear wheels are driven with an engine and the other wheels of them are driven with an AC motor, comprising:

an alternator which is driven by said engine to generate electric power for driving said AC motor;

a vehicle-mounted electric power storage device which outputs at voltage levels used for accessories of the vehicle and that is capable of storing electric power from said alternator by stepping down the electric power with a voltage step-down circuit;

a DC-DC converter that is combined with a voltage step-up circuit and said voltage step-down circuit and that is electrically connected to said electric power storage device and an electric power line between a rectifier of said alternator and an inverter for said AC motor;

a switching circuit switch-selectable one among at least a first circuit for supplying electric power from said alternator to said AC motor via said inverter by connecting electrically between said rectifier of alternator and said inverter, a second circuit for stepping up electric power from said electric power storage device and supplying the stepped-up electric power to said AC motor by connecting electrically between said electric power storage device and said inverter via said voltage step-up circuit, and a third circuit for stepping down electric power from said alternator and supplying the stepped-down electric power to said electric power storage device by connecting electrically between said rectifier of said alternator and said electric power storage device via said voltage step-down circuit.

32. The electric drive system for a hybrid engine/motor type vehicle according to claim 31, wherein an output voltage of said alternator can be controlled variably by field current control.

* * * * *